(12) United States Patent
Bertini et al.

(10) Patent No.: US 11,060,754 B2
(45) Date of Patent: Jul. 13, 2021

(54) VENTILATION SYSTEM FOR MANHOLE VAULT

(71) Applicant: Novinium, Inc., Federal Way, WA (US)

(72) Inventors: Glen J. Bertini, Tacoma, WA (US);
Donald R. Songras, Kent, WA (US);
Mark Newton, Federal Way, WA (US);
James Steele, Federal Way, WA (US)

(73) Assignee: NOVINIUM, INC., Kent, WA (US)

(*) Notice: Subject to any disclaimer, the term of this patent is extended or adjusted under 35 U.S.C. 154(b) by 176 days.

(21) Appl. No.: 15/084,321

(22) Filed: Mar. 29, 2016

(65) Prior Publication Data

US 2016/0356521 A1    Dec. 8, 2016

Related U.S. Application Data

(60) Provisional application No. 62/171,803, filed on Jun. 5, 2015.

(51) Int. Cl.
*F24F 13/02* (2006.01)
*E02D 29/14* (2006.01)
(Continued)

(52) U.S. Cl.
CPC ........... *F24F 13/029* (2013.01); *E02D 29/14* (2013.01); *F24F 13/02* (2013.01); *F24F 7/06* (2013.01);
(Continued)

(58) Field of Classification Search
CPC .......... F24F 13/029; F24F 13/02; E02D 29/14
(Continued)

(56) References Cited

U.S. PATENT DOCUMENTS

| 713,990 A | 11/1902 | Keith |
| 1,163,189 A | 12/1915 | Wolf |

(Continued)

FOREIGN PATENT DOCUMENTS

| AU | 2016277726 | 7/2017 |
| CA | 2952984 | 6/2017 |

(Continued)

OTHER PUBLICATIONS

English Translation of JP201542816A.*
(Continued)

*Primary Examiner* — Steven B McAllister
*Assistant Examiner* — Allen R Schult
(74) *Attorney, Agent, or Firm* — Davis Wright Tremain LLP; George C. Rondeau, Jr.; Heather M. Colburn

(57) ABSTRACT

A system for use with a manhole vault having an internal atmosphere, and, optionally, with a ventilation stack connecting the vault to an external atmosphere. The system includes a manhole cover, a ventilation pipe, and an air moving assembly. The cover has one or more through-holes extending between top and bottom surfaces. Each of the through-hole(s) is in fluid communication with the external atmosphere at the top surface. The pipe has a through-channel that extends between first and second openings. The first opening is positioned proximal to either an opening into the ventilation stack or at least one of the through-hole(s) at the bottom surface of the cover. The second opening is positioned in the interior of the vault. The device is configured to cause a portion of one of the interior and external atmospheres to flow through the through-channel toward a different one of the interior and external atmospheres.

51 Claims, 53 Drawing Sheets

(51) Int. Cl.
*F24F 7/06* (2006.01)
*F24F 7/08* (2006.01)
*F24F 11/61* (2018.01)
*F24F 13/06* (2006.01)
*F24F 11/77* (2018.01)
*F24F 11/89* (2018.01)

(52) U.S. Cl.
CPC ............... *F24F 7/065* (2013.01); *F24F 7/08* (2013.01); *F24F 11/61* (2018.01); *F24F 11/77* (2018.01); *F24F 11/89* (2018.01); *F24F 2013/0608* (2013.01)

(58) Field of Classification Search
USPC ........................................................ 454/48
See application file for complete search history.

(56) References Cited

U.S. PATENT DOCUMENTS

| | | | |
|---|---|---|---|
| 2,156,166 A | 4/1939 | Smith | |
| 3,302,658 A | 2/1967 | Frees | |
| 3,610,524 A | 10/1971 | Wallen | |
| 3,864,437 A * | 2/1975 | Blaszkowski | F24F 6/04 |
| | | | 261/120 |
| 3,916,870 A | 11/1975 | Beavers | |
| 4,030,851 A | 6/1977 | Graybeal | |
| 4,101,236 A | 7/1978 | Meyer | |
| 4,285,269 A | 8/1981 | Peluse et al. | |
| 4,315,579 A | 2/1982 | Martin, Jr. | |
| 4,408,421 A | 10/1983 | Pai | |
| 4,508,486 A | 4/1985 | Tinker | |
| 4,532,491 A | 7/1985 | Rau et al. | |
| 4,567,939 A | 2/1986 | Dumbeck | |
| 4,593,714 A * | 6/1986 | Madden | B65D 90/105 |
| | | | 137/314 |
| 4,953,450 A | 9/1990 | Remondino | |
| 5,051,022 A | 9/1991 | Bowman | |
| 5,062,735 A * | 11/1991 | Gaudin | E02D 29/14 |
| | | | 210/164 |
| 5,130,016 A | 7/1992 | Gavin | |
| 5,201,151 A | 4/1993 | LeBlanc et al. | |
| 5,209,697 A | 5/1993 | Hurst et al. | |
| 5,739,463 A | 4/1998 | Diaz et al. | |
| 5,820,828 A * | 10/1998 | Ferone | A61L 9/12 |
| | | | 422/108 |
| 5,911,537 A | 6/1999 | Pulver | |
| 5,980,065 A | 11/1999 | Wooderson | |
| 6,012,532 A | 1/2000 | Kiefer et al. | |
| 6,168,514 B1 | 1/2001 | Weston | |
| 6,338,637 B1 | 1/2002 | Muench, Jr. et al. | |
| 6,457,901 B1 * | 10/2002 | Sondrup | E02D 29/1409 |
| | | | 404/25 |
| 6,489,554 B1 | 12/2002 | Bertini et al. | |
| 6,617,973 B1 | 9/2003 | Osterman | |
| 6,743,088 B2 | 6/2004 | Closkey | |
| 6,848,465 B1 | 2/2005 | Ledbetter | |
| 6,851,225 B1 | 2/2005 | Harr et al. | |
| 7,195,504 B2 | 3/2007 | Bertini et al. | |
| 7,353,601 B1 | 4/2008 | Bertini | |
| 7,611,748 B2 | 11/2009 | Bertini | |
| 7,768,413 B2 | 8/2010 | Kosuge et al. | |
| 7,932,466 B2 | 4/2011 | Sanders | |
| 7,944,352 B2 | 5/2011 | Drake et al. | |
| 8,493,223 B2 | 7/2013 | Zadnikar et al. | |
| 8,851,791 B1 | 10/2014 | Putnam | |
| 8,926,414 B1 | 1/2015 | Kirkpatrick | |
| 8,946,548 B2 | 2/2015 | Sanders | |
| 8,976,038 B2 | 3/2015 | Miller, II et al. | |
| 9,100,728 B2 | 8/2015 | Higgins et al. | |
| 9,151,431 B2 | 10/2015 | Kiest, Jr. | |
| 9,276,399 B2 | 3/2016 | Sales Casals et al. | |
| 9,541,432 B2 | 1/2017 | Kertesz et al. | |
| 9,546,466 B2 | 1/2017 | Wander | |
| 9,605,403 B1 | 3/2017 | Putnam | |
| 2002/0166759 A1 | 11/2002 | Mabry et al. | |
| 2005/0109764 A1 | 5/2005 | Kopel | |
| 2006/0284857 A1 | 12/2006 | Oh | |
| 2008/0173467 A1 | 7/2008 | Bertini et al. | |
| 2009/0027061 A1 | 1/2009 | Curt et al. | |
| 2011/0148647 A1 * | 6/2011 | Miller, II | G08B 13/1672 |
| | | | 340/686.1 |
| 2011/0244702 A1 | 10/2011 | Bertini et al. | |
| 2012/0028560 A1 * | 2/2012 | Nikolic | F24F 7/013 |
| | | | 454/239 |
| 2012/0227168 A1 | 9/2012 | Paoluccio et al. | |
| 2012/0270488 A1 | 10/2012 | Fujimura et al. | |
| 2013/0092029 A1 * | 4/2013 | Morgan | B01D 53/30 |
| | | | 96/111 |
| 2014/0150286 A1 * | 6/2014 | Jadhav | A47L 15/0034 |
| | | | 34/443 |
| 2014/0227954 A1 * | 8/2014 | Sone | E02D 29/045 |
| | | | 454/48 |
| 2015/0056908 A1 | 2/2015 | Chapel et al. | |
| 2015/0075201 A1 | 3/2015 | Park et al. | |
| 2015/0118946 A1 | 4/2015 | Yeon | |
| 2015/0276818 A1 | 10/2015 | Nulty | |
| 2015/0323510 A1 | 11/2015 | Huynh et al. | |
| 2015/0345819 A1 | 12/2015 | Ostrovsky | |
| 2016/0274176 A1 | 9/2016 | Di Stefano et al. | |
| 2016/0356521 A1 | 12/2016 | Bertini et al. | |
| 2016/0356522 A1 | 12/2016 | Bertini et al. | |
| 2017/0228998 A1 | 8/2017 | Fu et al. | |
| 2019/0166413 A1 | 5/2019 | Klinger et al. | |

FOREIGN PATENT DOCUMENTS

| | | | |
|---|---|---|---|
| CN | 204475375 | | 7/2015 |
| CN | 106284422 | | 1/2017 |
| DE | 1010464 | | 6/1957 |
| DE | 2857528 | | 8/1980 |
| DE | 8419395 | | 10/1984 |
| DE | 202007006848 | | 9/2007 |
| EP | 0372545 | | 6/1990 |
| EP | 0952263 | | 10/1999 |
| EP | 1473414 | | 11/2004 |
| EP | 1486619 | | 12/2004 |
| EP | 1635000 | | 3/2006 |
| EP | 3206028 | | 8/2017 |
| FR | 2450912 | | 10/1980 |
| GB | 2521217 | | 6/2015 |
| JP | H03156035 | * | 7/1991 |
| JP | H06272268 | | 9/1994 |
| JP | H6-74155 | | 10/1994 |
| JP | H9-512629 | | 12/1997 |
| JP | H11118649 | | 4/1999 |
| JP | H11148880 | | 6/1999 |
| JP | 2000-161600 | | 6/2000 |
| JP | 200494863 | | 4/2004 |
| JP | 2005-504947 | | 2/2005 |
| JP | 2005-282347 | | 10/2005 |
| JP | 2009-075823 | | 4/2009 |
| JP | 2009281982 | | 12/2009 |
| JP | 2012-063943 | | 3/2012 |
| JP | 2012162852 | | 8/2012 |
| JP | 2013167078 | * | 8/2013 |
| JP | 2015042816 | | 3/2015 |
| KR | 20060083777 | | 7/2006 |
| WO | 2004018787 | | 3/2004 |
| WO | 2016033653 | | 3/2016 |

OTHER PUBLICATIONS

International Search Report and Written Opinion, dated Aug. 30, 2016, received in International Application No. PCT/US2016/035934.

International Search Report and Written Opinion, dated Sep. 7, 2017, received in International Application No. PCT/US2017/030255.

International Search Report and Written Opinion, dated Sep. 12, 2017, received in International Application No. PCT/US2017/25601.

(56) References Cited

OTHER PUBLICATIONS

Rudin et al., "A process for predicting manhole events in Manhattan," Mach Learn, 2010, 80: 1-31.
Siemens, Inc., Report #R55-11, "Investigation of Manhole Incidents Occurring Around and in the Underground Distribution System of the Potomac Electric Power Company," Jun. 30, 2011.
International Search Report and Written Opinion, dated Aug. 5, 2016, received in International Application No. PCT/US2016/030282.
U.S. Appl. No. 16/114,697, filed Aug. 28, 2018.
U.S. Appl. No. 16/162,260, filed Oct. 16, 2018.
U.S. Appl. No. 16/189,639, filed Nov. 13, 2018.
U.S. Appl. No. 16/190,832, filed Nov. 14, 2018.
U.S. Appl. No. 16/208,098, filed Dec. 3, 2018.
U.S. Appl. No. 16/208,219, filed Dec. 3, 2018.
U.S. Appl. No. 16/207,633, filed Dec. 3, 2018.
U.S. Appl. No. 16/208,120, filed Dec. 3, 2018.
U.S. Appl. No. 16/219,137, filed Dec. 13, 2018.
U.S. Appl. No. 16/234,246, filed Dec. 27, 2018.
U.S. Appl. No. 16/514,530, filed Jul. 17, 2019.
Information Disclosure Statement Transmittal submitted herewith.
Extended European Search Report, dated Oct. 28, 2019, received in European Application No. 17776872.8.
Non-Final Office Action, dated Aug. 22, 2019, received in U.S. Appl. No. 15/476,775.
Extended European Search Report, dated Apr. 17, 2019, received in European Application No. 16803923.8.
McDermott, Mike, "London County Counsil small vented cover," https://www.flickr.com/photos/mikegmcdermott/23299770406/in/photostream/ (Year: 2013).
Non-Final Office Action, dated Aug. 27, 2020, received in U.S. Appl. No. 16/114,697.
Final Office Action, dated Apr. 1, 2021, received in U.S. Appl. No. 16/114,697.
Office Action, dated Apr. 20, 2021, received in Japanese Application No. 2018-551138.

\* cited by examiner

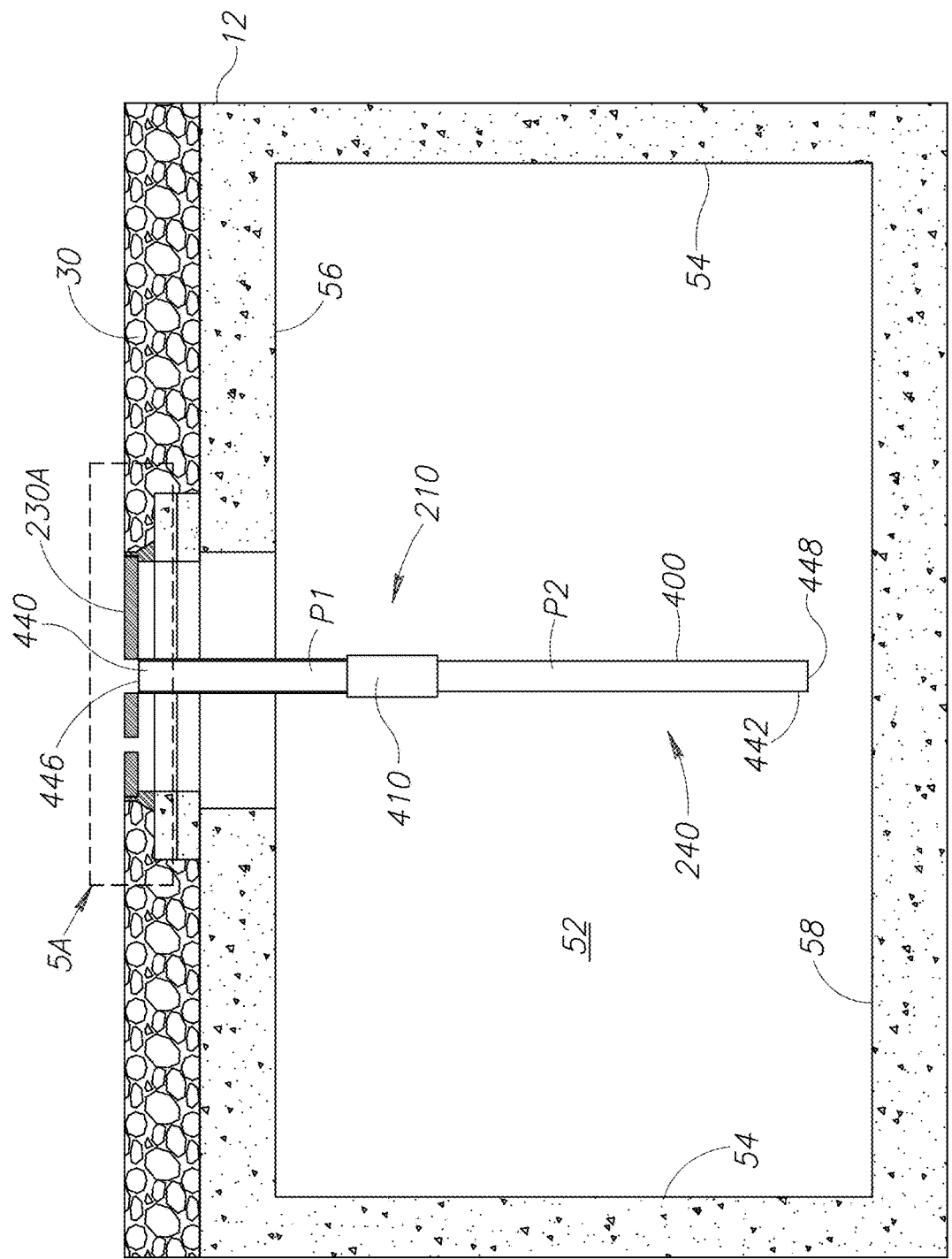

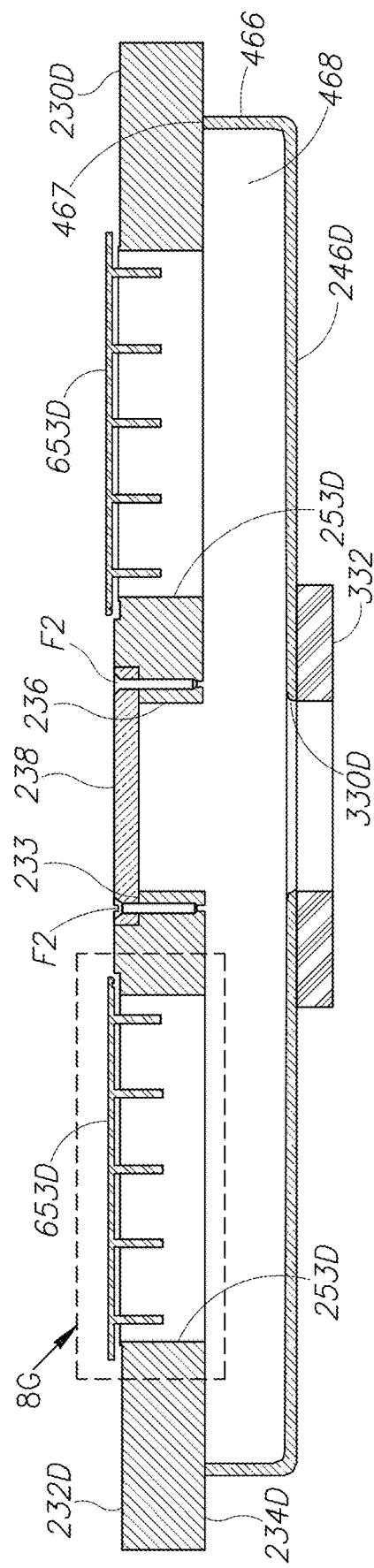
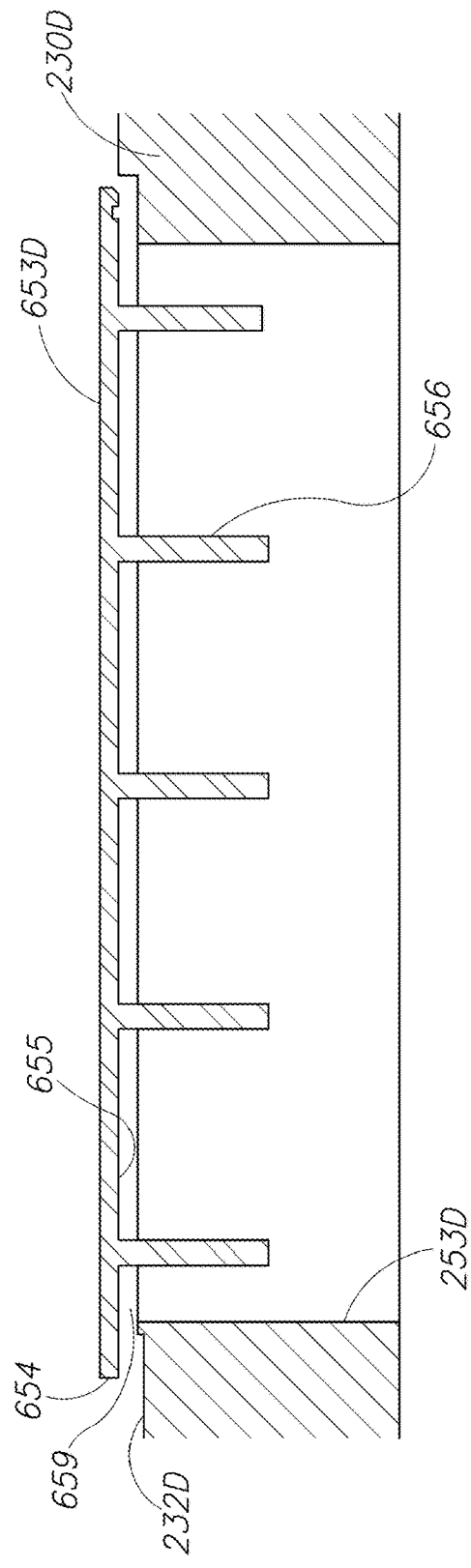
FIG.8F
FIG.8G

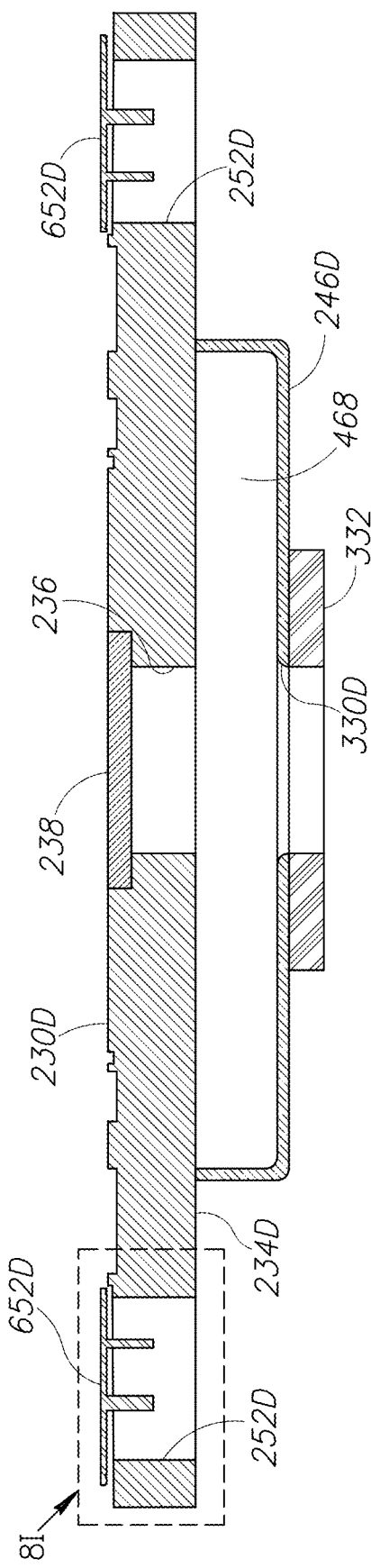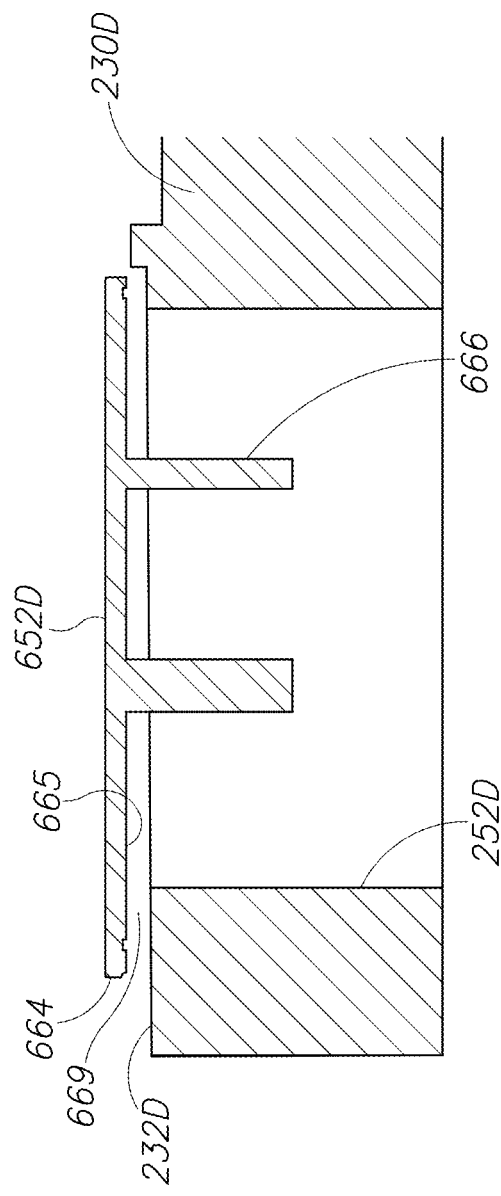

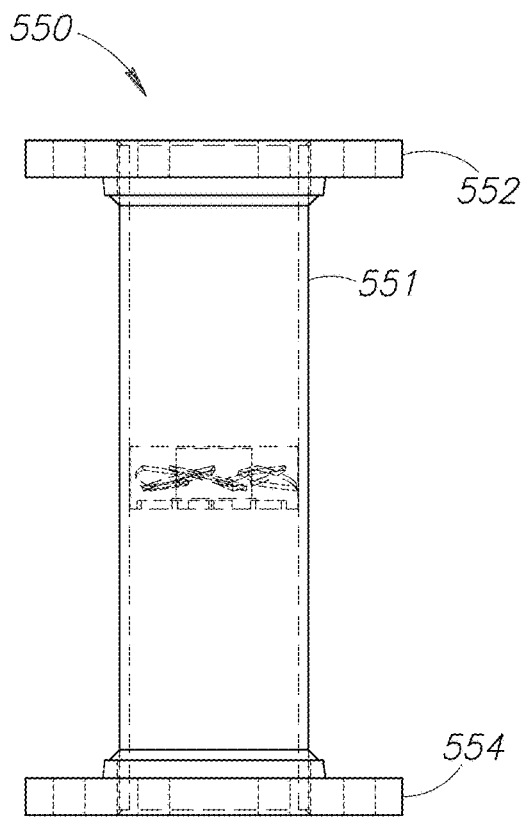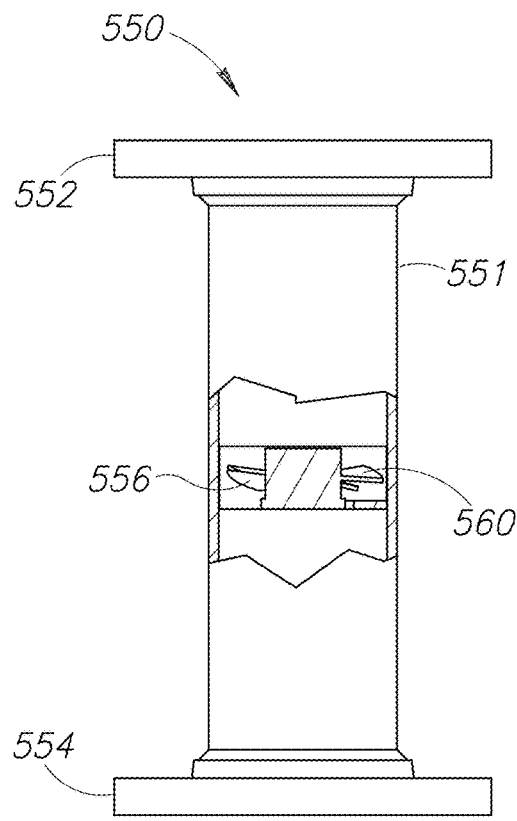
FIG.14A  FIG.14B
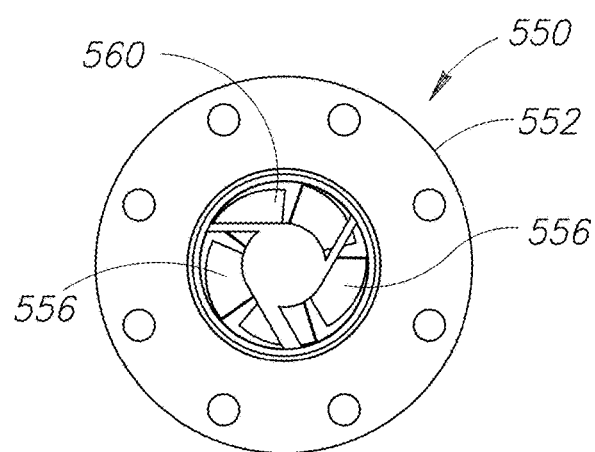
FIG.14C

VENTILATION SYSTEM FOR MANHOLE VAULT

CROSS REFERENCE TO RELATED APPLICATION(S)

This application claims the benefit of U.S. Provisional Application No. 62/171,803, filed on Jun. 5, 2015, which is incorporated herein by reference in its entirety.

BACKGROUND OF THE INVENTION

Field of the Invention

The present invention is directed generally to methods and devices for ventilating underground chambers, such as manhole vaults.

Description of the Related Art

Underground utilities, such as water, sewer, natural gas, electricity, telephone, cable, and steam, are a common means of delivering the essentials of modern life in a developed society. Referring to FIG. 1, such utilities are often routed through an underground system 10 that includes a plurality of substantially identical underground chambers or manhole vaults 12 and 14 interconnected by one or more conduits 20A-20C. The vaults 12 and 14 may each be configured to house critical control equipment, monitoring equipment, and appropriate network connections.

As shown in FIG. 1, the vaults 12 and 14 and the conduit(s) 20A-20C are positioned below a street or sidewalk level (identified as a surface 30). In FIG. 1, only the two vaults 12 and 14 of the system 10 have been illustrated. However, the system 10 may include any number of vaults each substantially similar to one of the vaults 12 and 14. Similarly, only the three conduits 20A-20C have been illustrated. However, the system 10 may include any number of conduits each substantially similar to one of the conduits 20A-20C.

Because the vaults 12 and 14 are substantially identical to one another, for the sake of brevity, only the vault 12 will be described in detail. In FIG. 1, equipment (e.g., electrical equipment), commonly found within the vault 12 has been omitted for the sake of clarity. The vault 12 has an interior 50 with a rectangular prism-shaped main chamber 52. The main chamber 52 is defined by one or more sidewalls 54 that extend between a ceiling 56 and a floor 58. The conduits 20A-20C may pass at least partially through the main chamber 52. A cylindrical passageway 60 (also referred to as a "neck") defined by one or more wall(2) 64 provides personnel access (e.g., for a worker 61) to the main chamber 52 from the surface 30. The neck 60 is usually about 3 feet in diameter and generally extends at least about 3 feet below the surface 30. The neck 60 leads to a manhole 62, which is traditionally capped with a conventional manhole cover, such as a vented manhole cover 70 (see FIG. 2). The vented manhole cover 70 illustrated in FIG. 2 is a design often employed by Consolidated Edison ("ConEd") of New York. The manhole cover (e.g., the vented manhole cover 70 illustrated in FIG. 2) is fitted within a recess 63 in the manhole 62 and provides a measure of security with respect to pedestrian and vehicular traffic.

Underground electrical utilities are typically preferred over above ground systems because underground systems make efficient use of limited surface and air space in urban environments and preserve aesthetics in suburban environments. Underground systems are generally more secure than overhead circuits and, when well maintained, provide reliable service to the public.

Unfortunately, underground electrical utilities also present fire and/or explosion hazards proximate to areas of human habitation. For example, while the conduits 20A-20C provide passageways between the vaults 12 and 14 for interconnecting electrical cables, the conduits 20A-20C also allow air, gases, vapors, and water to enter the interiors 50 of the vaults 12 and 14. It is not unusual for such underground vaults and conduits to fill with water depending on the surface topography, water table, and recent precipitation. Water also enters through the cover. Water allows for electro-chemical breakdown of the insulation to occur through tracking of cables in ducts (i.e., electrical discharge along degraded insulation) and electrical equipment failures inside one or more of the vaults 12 and 14, which produce hazardous concentrations of explosive and flammable gases within one or more of the vaults 12 and 14. Because air can never be excluded entirely from the vault 12, manhole events may result. Manhole events include both minor incidents (such as smoke or small fires) and/or major events (such as sustained fires and explosions). At best, a minor incident is likely to cause an electrical power outage. At worst, a major event, such as an explosion, can occasionally propel a manhole cover skyward causing property damage, injuries, and even death.

According to a paper by Rudin et al. ("A process for predicting manhole events in Manhattan," Mach Learn (2010) 80: 1-31), there were 6670 "serious event tickets" written for a total of 250,000 manholes in the ConEd (N.Y.) system over a ten-year period ending in 2006. In other words, the chance that a manhole will have a serious event in a given year is about 1 in 375. Incident rates in this range suggest, at a minimum, a need for regular inspection and maintenance of manhole vaults. Surprisingly, a report prepared for a Washington, D.C. utility indicated that such routine visits did not reduce the incidence rate of serious events (Siemens, Inc., Report #R55-11, "Investigation of Manhole Incidents Occurring Around and in the Underground Distribution System of the Potomac Electric Power Company," Jun. 30, 2011). Thus, other, more proactive measures are often employed, but as indicated in the following examples, each has been shown to have at least one major shortcoming.

For example, the manhole cover may be tethered (e.g., to the surface 30) to prevent the manhole cover from being launched beyond the length of the tether in the event of an explosion. Unfortunately, this approach does not prevent smoke and/or flames from spilling out of the manhole, which presents an unacceptable public hazard, or at least a nuisance.

Another approach is to substitute a light-weight manhole cover in place of the typically heavy metal manhole cover. This approach can reduce damage to structures, vehicles, and people because the light-weight manhole cover will lift more quickly in the event of an explosion. But, as with the aforementioned tethering approach, the issues of smoke and flames remain. Additional drawbacks to this approach include initial cost and questionable service life.

Some have suggested using electronic sensors to monitor the vault environment and transmit warning notices but this mitigation method is relatively expensive. Further, the electronics employed are somewhat unreliable given the usually harsh environment inside the vault and required long lifespans.

Yet another approach is to seal the conduits 20A-20C (that may house electrical cables) running between vaults 12 and 14 to minimize air entry therein, which produces a fuel-rich, oxygen-starved, environment inside the conduits 20A-20C. Unfortunately, this fuel-rich environment includes flammable gases that ultimately find ways out of the conduits 20A-20C (whether plugged or not) and into one or more of the vault(s) 12 and 14 connected to the conduits 20A-20C. This collection of flammable gases inside one or more of the vaults 12 and 14 can result in a manhole explosion that is more dangerous than a manhole that is merely smoking (referred to as a "smoker").

Some (see U.S. Pat. No. 6,012,532) have proposed limiting airflow within the vault by positioning an inflatable bladder inside the vault and filling the bladder with an inert gas that expands the bladder into the open volume in the vault. Unfortunately, this approach is impractical because the bladder must be deflated and re-inflated each time the manhole vault requires access, which is a large amount of work.

Referring to FIG. 2, using yet another approach, ConEd has installed vented manhole covers (like the vented manhole cover 70) that allow dangerous vault gases to escape from the vault. Unfortunately, vent openings or holes (e.g., vent holes 72) in the vented manhole cover present drawbacks of their own. The vented manhole cover 70 provides about 25% open space but contains no water mitigating features. Thus, the vent holes 72 allow more precipitation and corrosive road chemicals (e.g., road salt and other deicers) to enter the vault and such ingress has been implicated in circuit failures and manhole events. They also increase the likelihood that hazardous liquids, trash, human waste, and/or vermin will enter the vault—all of which can produce flammable vapors, either directly (e.g., a fuel spill) or indirectly by biodegradation of organic materials. Finally, the vent holes 72 can invite disposal of bio-hazards, such as used hypodermic syringes, into the vault, which slow any required maintenance because special procedures are necessary before personnel can enter the vault.

It is therefore apparent that a need exists for methods, equipment, and/or apparatus that effectively reduce the frequency and/or severity of manhole events. The present application provides these and other advantages as will be apparent from the following detailed description and accompanying figures.

BRIEF DESCRIPTION OF THE SEVERAL VIEWS OF THE DRAWING(S)

FIG. 4A is a cross-sectional view of an exemplary implementation of a first embodiment of the ventilation system including a manhole cover and an air moving assembly installed within one of the manhole vaults of the underground system of FIG. 1.

FIG. 8F is a cross-sectional view taken through a line 8F-8F in FIG. 8A.

FIG. 8G is an enlarged view of a portion of FIG. 8F identified by a broken line box 8G in FIG. 8F.

FIG. 8H is a cross-sectional view taken through a line 8H-8H in FIG. 8A.

FIG. 8I is an enlarged view of a portion of FIG. 8H identified by a broken line box 8I in FIG. 8H.

FIG. 14A is a front view of an in-line fan.

FIG. 14B is a right side view of the in-line fan of FIG. 14A with a cutaway portion showing fan blades.

FIG. 14C is a bottom view of the in-line fan of FIG. 14A.

DETAILED DESCRIPTION OF THE INVENTION

Overview

Figure 1:
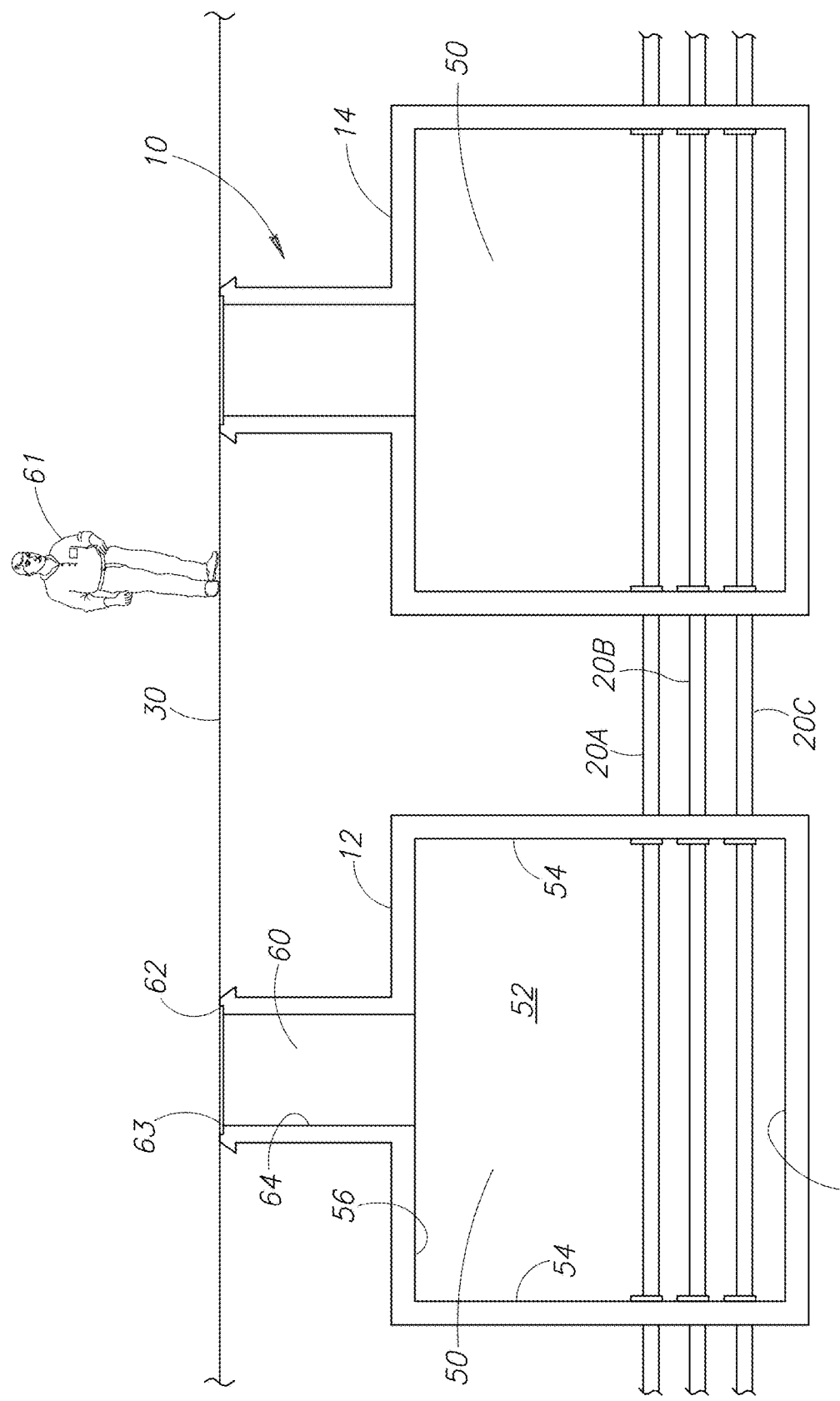
FIG. 1 is a cross-sectional view of a prior art underground system including a plurality of manhole vaults interconnected by a plurality of conduits.
Figure 3:
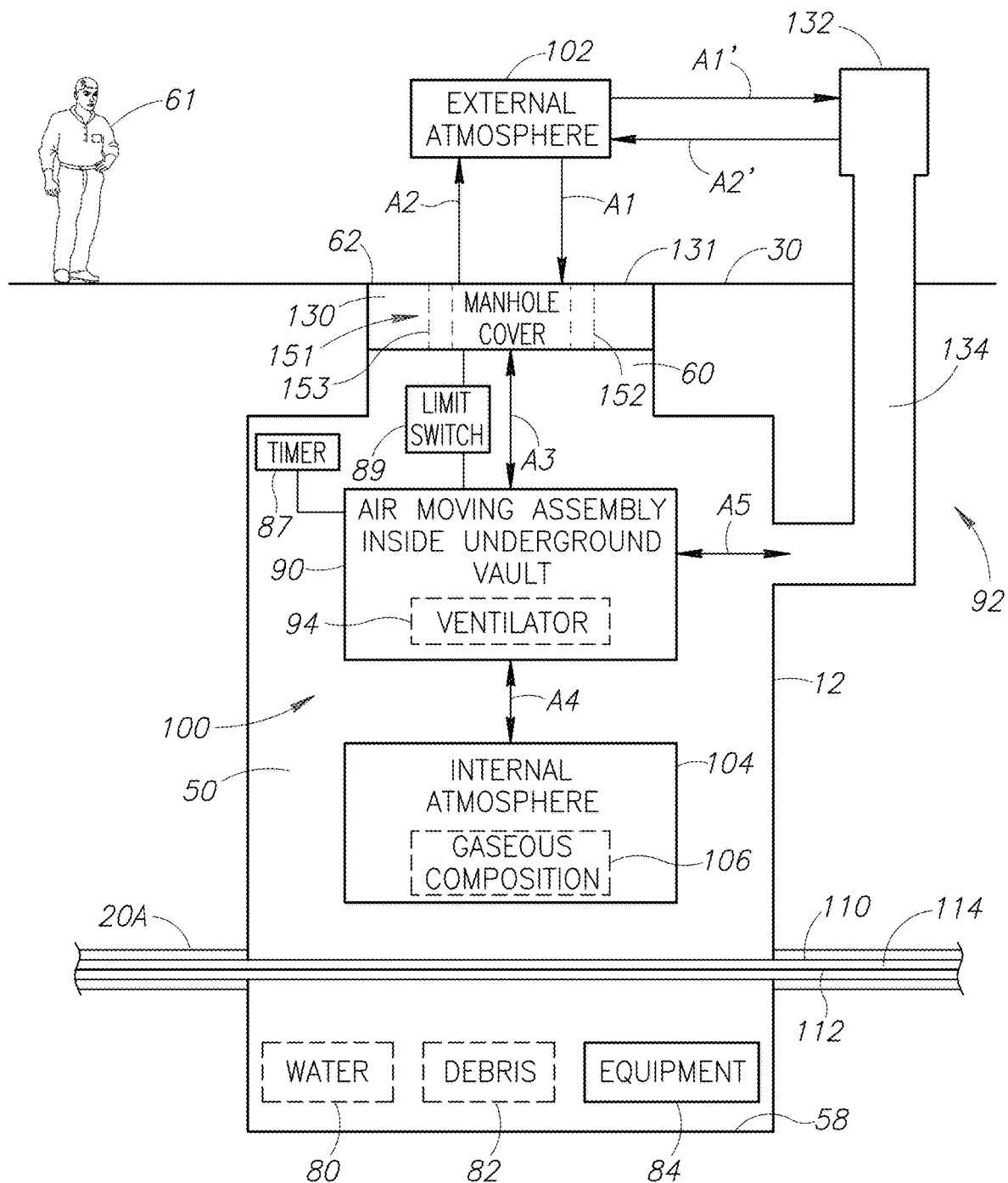
FIG. 3 is a block diagram of a ventilation system for use in at least one of the manhole vaults of the underground system of FIG. 1.

FIG. 3 is block diagram of a ventilation system 100 for use in one or more of the vaults 12 and 14 (see FIG. 1) of the underground system 10 (see FIG. 1). In FIG. 3, the ventilation system 100 has been illustrated as being installed in the vault 12. For ease of illustration, the conduits 20B and 20C (see FIG. 1) have been omitted from FIG. 3. In the embodiment illustrated, each of the conduits 20A-20C (see FIG. 1) houses a cable 110 that has a conductor 112 surrounded by an outer layer 114 constructed from one or more cable insulation materials and/or cable shield materials. The vault 12 may house equipment 84 (e.g., electrical equipment). The vault 12 may also house undesirable materials, such as water 80 (e.g., flood water) and/or debris 82 (e.g., hazardous liquids, road salt, trash, human waste, vermin, hypodermic syringes, etc.).

The ventilation system 100 includes an air moving assembly 90 and an interface 92 between an external atmosphere 102 (e.g., above the surface 30) outside the vault 12 and an internal atmosphere 104 inside the vault 12. The internal atmosphere 104 may include an undesired (and potentially dangerous) gaseous composition 106. The gaseous composition 106 may be non-uniformly distributed within the interior 50 of the vault 12. For example, the gaseous composition 106 may be adjacent or near the floor 58. Gases (that contribute to the gaseous composition 106) may result from electrochemical degradation of the outer layer 114 or a portion thereof (e.g., cable insulation). Further, electrical tracking may heat and decompose the outer layer 114 or a portion thereof (e.g., cable insulation) to create gases (that contribute to the gaseous composition 106).

All or a portion of the air moving assembly 90 may be positioned inside the internal atmosphere 104 of the vault 12. Optionally, the air moving assembly 90 may include an air-moving device 94 (e.g., a ventilator). However, this is not a requirement. The air-moving device 94 may be controlled at least in part by a timer 87 that may be positioned inside or outside the vault 12. The timer 87 may be operable to turn the air-moving device 94 on or off at predetermined times. In this manner, the timer 87 may cycle the air-moving device 94 on/off at predetermined times (e.g., regular intervals, scheduled times, and the like). For example, the timer 87 may run the air-moving device 94 less than about 5 minutes every hour or less than about 15 minutes every hour.

By way of yet another non-limiting example, the air-moving device 94 may be controlled at least in part by a limit switch 89 that shuts power off to the air-moving device 94 when the manhole cover 130 is removed and/or the air-moving device 94 is removed.

The interface 92 may be implemented as a manhole cover 130 and/or a ventilation duct or vent stack 132. The vent stack 132 may be an existing external ventilation duct or vent stack (e.g., of the type currently in use in California).

In embodiments in which the interface 92 is the manhole cover 130, the manhole cover 130 includes one or more through-holes 151. A first portion of the through-holes 151 may each function as a vent hole 152 and/or a second portion of the through-holes 151 may each function as an exhaust hole 153. In other words, the manhole cover 130 may include one or more vent holes 152 and/or one or more exhaust holes 153. Each vent hole 152 is configured to allow a portion of the external atmosphere 102 (represented by an arrow A1) to pass through the manhole cover 130 and enter the internal atmosphere 104. On the other hand, each exhaust hole 153 is configured to allow a portion of the internal atmosphere 104 (represented by an arrow A2) to pass through the manhole cover 130 and enter the external atmosphere 102. As is apparent to those of ordinary skill in the art, because the direction of the flow through a particular one of the through-holes 151 determines whether that particular through-hole is a vent hole or an exhaust hole, any one of the through-holes 151 may be used as either a vent hole or an exhaust hole. Further, by reversing the direction of the flow, a vent hole may be converted into an exhaust hole and vice versa. Further, one or more of the through-holes 151 may be configured for bi-directional flow and therefore function as both a vent hole and an exhaust hole.

The vent hole(s) 152 and the exhaust hole(s) 153 may be sized so as to minimize the flow resistance between the external and internal atmospheres 102 and 104. For example, the ratio of the total open area available for gas ingress (i.e., intake represented by the arrow A1) through the vent hole(s) 152 to that available for gas egress (i.e., exhaust represented by the arrow A2) through the exhaust hole 153 may be about 1.0±0.25. However, this is not a requirement. By way of another non-limiting example, the ratio of total open area available for gas ingress (i.e., intake represented by the arrow A1) through the vent hole(s) 152 to that available for gas egress (i.e., exhaust represented by the arrow A2) through the exhaust hole 153 may be adjusted (or restricted) such that air is preferentially drawn from adjacent manhole vaults (e.g., one of vaults 14 and 16), instead of entirely from the vault 12, and exhausted through the exhaust hole(s) 153. In this manner, the air moving assembly 90 in the vault 12 may be used to also draw air from other vaults connected thereto.

The vent hole(s) 152 may occupy at least a predetermined amount of a total area of a top side 131 of the manhole cover 130. By way of non-limiting examples, the predetermined amount of the total area of the top side 131 occupied by the vent hole(s) 152 may be about 5% or about 15%.

Similarly, the exhaust hole(s) 153 may occupy at least a predetermined amount of the total area of the top side 131 of the manhole cover 130. By way of non-limiting examples, the predetermined amount of the total area of the top side 131 occupied by the exhaust hole(s) 153 may be about 5% or about 15%.

In embodiments in which the interface 92 is the ventilation stack 132, the ventilation stack 132 provides a passageway 134 in fluid communication with both the external and internal atmospheres 102 and 104. Thus, a portion of the external atmosphere 102 (represented by an arrow A1') may pass through the passageway 134 and enter the internal atmosphere 104. On the other hand, a portion of the internal atmosphere 104 (represented by an arrow A2') may pass through the passageway 134 and enter the external atmosphere 102.

The arrows A1 and arrows A1' represent exterior (fresh) air flowing from the external atmosphere 102 into the internal atmosphere 104. On the other hand, the arrows A2 and A2' represent interior (stale and/or contaminated) air flowing from the internal atmosphere 104 into the external atmosphere 102. Together, the arrows A1 and A2 represent an air exchange between the external and internal atmospheres 102 and 104 through the manhole cover 130, and the arrows A1' and A2' represent an air exchange between the external and internal atmospheres 102 and 104 through the ventilation stack 132.

The air moving assembly 90 causes the air exchange represented by one or more of the arrows A1, A1', A2, and A2'. In other words, in embodiments in which the interface 92 includes the manhole cover 130, the air moving assembly 90 may cause at least a portion of the internal atmosphere 104 (represented by the arrow A2) to be expelled outwardly from the vault 12 through the exhaust hole(s) 153 in the manhole cover 130, and/or at least a portion of the external atmosphere 102 (represented by the arrow A1) to be drawn into the vault 12 through the vent hole(s) 152 in the manhole cover 130. In embodiments in which the interface 92 includes the ventilation stack 132, the air moving assembly 90 may cause at least a portion of the internal atmosphere 104 (represented by the arrow A2') to be expelled outwardly from the vault 12 through the passageway 134 and/or at least a portion of the external atmosphere 102 (represented by the arrow A1') to be drawn into the vault 12 through the passageway 134. Optionally, the air-moving device 94 may be external to the vault. For example, the air-moving device 94 may be located within the vent stack 132.

In embodiments in which the interface 92 includes the manhole cover 130, double-headed arrows A3 and A4 represent airflow inside the vault 12 generated by the air moving assembly 90. In such embodiments, the air moving assembly 90 may be configured to push (e.g., blow) internal air toward the exhaust hole(s) 153 of the manhole cover 130, pull (e.g., suck) external air in through the vent hole(s) 152 of the manhole cover 130, or both. In embodiments in which the interface 92 includes the ventilation stack 132, double-headed arrows A4 and A5 represent airflow inside the vault 12 generated by the air moving assembly 90. In such embodiments, the air moving assembly 90 may be configured to push (e.g., blow) internal air into the passageway 134 of the ventilation stack 132, pull (e.g., blow) external air in through the passageway 134 of the ventilation stack 132, or both.

The conduits 20A-20C (see FIG. 1) interconnecting the vaults 12 and 14 (see FIG. 1) provide passageways through which air (and other gases) may travel between the vaults 12 and 14 of the system 10 (see FIG. 1). The air moving assembly 90 may cause air (and other gases) to flow into the internal atmosphere 104 from one or more of the conduits 20A-20C (see FIG. 1) and/or one or more of the neighboring vaults (via the conduits 20A-20C). Additionally, the air moving assembly 90 may cause air (and other gases) to flow out of the internal atmosphere 104 into one or more of the conduits 20A-20C (see FIG. 1) and potentially into one or more neighboring vaults (via the conduits 20A-20C). In other words, the air moving assembly 90 may move air between a particular vault (e.g., the vault 12) and one or more of the conduits 20A-20C (see FIG. 1). Further, the air moving assembly 90 may move air between a particular vault (e.g., the vault 12) and one or more neighboring vaults via the conduits 20A-20C (see FIG. 1).

In embodiments in which the interface 92 includes the manhole cover 130, the manhole cover 130 may be removably coupled to the air moving assembly 90. For example, the manhole cover 130 may include an access hole (e.g., an access hole 236 depicted in FIGS. 7, 8B, 8E, 8F, and 8H) through which the worker 61 may uncouple the manhole cover 130 from the air moving assembly 90. The access hole may be covered by a removable access cover (e.g., an access cover 238 depicted in FIGS. 7, 8A-8C, 8F, and 8H). Optionally, the air moving assembly 90 may include a manifold (e.g., a manifold 246A depicted in FIGS. 7, 9B, and 19, a manifold 246D depicted in FIGS. 8A, 8B, 8D, 8F, and 8H, or a manifold 460 depicted in FIGS. 11A-11C) positioned between the manhole cover 130 and the air moving assembly 90. The manifold is configured to channel the internal air pushed by the air moving assembly 90 toward the exhaust hole(s) 153 of the manhole cover 130 or, alternatively, to channel the external air drawn in through the vent hole(s) 152 by the air moving assembly 90 into the vault 12. Optionally, a coupling flange (e.g., a coupling flange 332 depicted in FIGS. 5B, 7, 8B, 8F, 8H, and 9B) may be used to couple the manhole cover 130 to the air moving assembly 90. The coupling flange may be a separate component or formed in the manhole cover 130 or the manifold.

In embodiments in which the interface 92 includes the manhole cover 130, the manhole cover 130 may be supported by a manhole ring support (e.g., a manhole ring support 250A depicted in FIGS. 5A, 5B, 9B, and 19, a manhole ring support 250B depicted in FIGS. 6A-6C, or a manhole ring support 250G depicted in FIGS. 21A, 21B, and 26), which is positioned inside the manhole 62 within the recess 63 (see FIG. 1). The manhole ring support may function as an adapter allowing the manhole cover 130 to cap manholes having different internal sizes (e.g., internal diameters) and/or different internal shapes.

As described in detail below, the manhole ring support, the manhole cover 130, and/or the surface 30 may include features (e.g., dams, channels, and/or moats) configured to help prevent surface water (e.g., road run-off or precipitation) from flowing into the vault 12 through the through-hole(s) 151. For example, the vent hole(s) 152 may be partially covered or plugged by optional vent plugs (e.g., a vent hole plug 652D depicted in FIGS. 8A-8D, 8H, 8I, and 16, or a vent hole plug 652F depicted in FIGS. 10A, 10B, 10D-10F, and 17A-17C). Similarly, the exhaust hole(s) 153 may be covered or plugged by optional exhaust plugs (e.g., an exhaust hole plug 653D depicted in FIGS. 8A-8C, 8F, 8G, 9A, 15, and 19). The vent hole plugs 652D or 652F may each be configured to help prevent surface water from entering the vault 12 via one of the vent hole(s) 152. Similarly, the exhaust hole plug 653D may be configured to help prevent water from entering the vault 12 via one of the exhaust hole(s) 153.

The following embodiments provide exemplary implementations of the ventilation system 100.

First Embodiment of Ventilation System

Figure 4B:
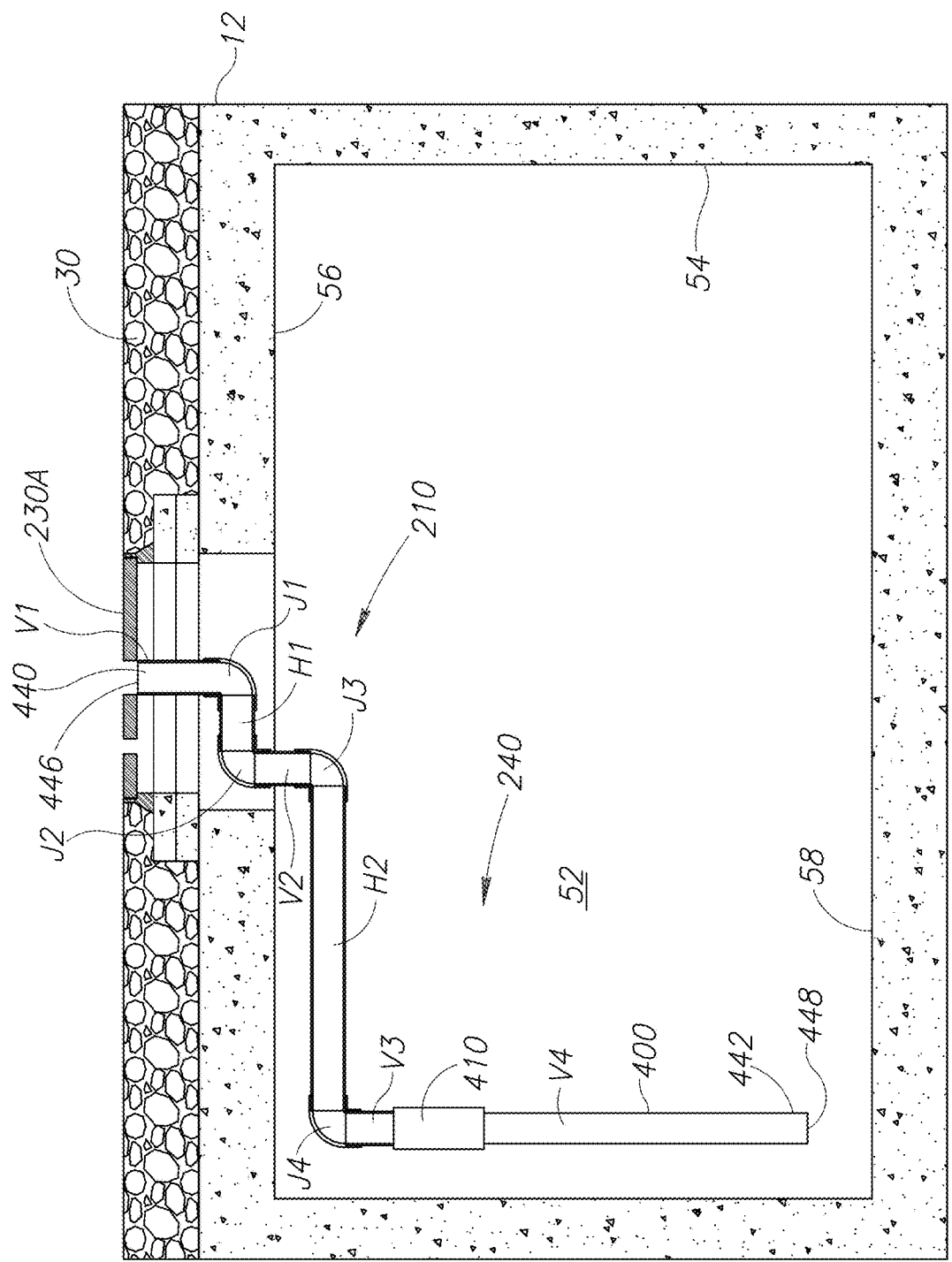
FIG. 4B is a cross-sectional view of an alternate exemplary implementation of the first embodiment of the ventilation system.

FIG. 4A depicts a first embodiment of a ventilation system 210 installed in the vault 12. In this embodiment, the interface 92 (see FIG. 3) includes a manhole cover 230A and the air moving assembly 90 (see FIG. 3) is implemented as an air moving assembly 240. FIG. 4B depicts an alternate implementation of the air moving assembly 240. The ventilation system 210 may include the ventilation stack 132 (see FIG. 3). However, this is not a requirement and the ventilation stack 132 (see FIG. 3) has been omitted from FIGS. 4A and 4B.

Figure 5A:
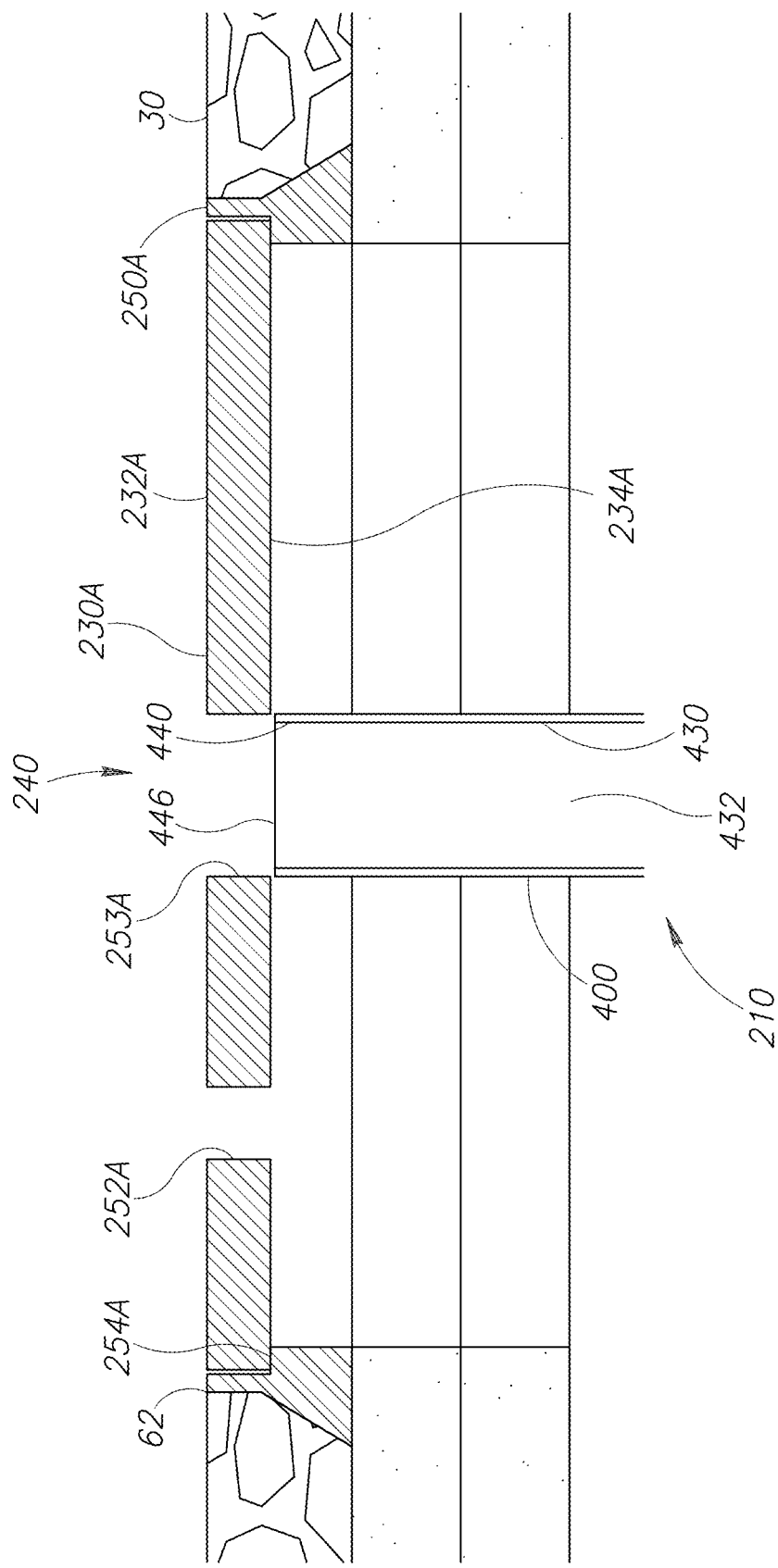
FIG. 5A is an enlarged view of a portion of FIG. 4A identified by a broken line box 5A in FIG. 4A.

FIG. 5A is an enlarged portion of FIG. 4A identified by a broken line box 5A in FIG. 4A. Referring to FIG. 5A, optionally, the ventilation system 210 may include the removable access cover 238 (see FIGS. 7, 8A-8C, 8F, and 8H), the manhole ring support 250A, the vent hole plug 652D (see FIGS. 8A-8D, 8H, 8I, and 16), the vent hole plug 652F (see FIGS. 10A, 10B, 10D-10F, and 17A-17C), and/or the exhaust hole plug 653D (see FIGS. 8A-8C, 8F, 8G, 9A, 15, and 19). Because external above ground components must bear the weight of vehicular traffic, they are typically fabricated from metal. Thus, the manhole cover 230A, the access cover 238 (see FIGS. 7, 8A-8C, 8F, and 8H), the manhole ring support 250A, the vent hole plug 652D (see FIGS. 8A-8D, 8H, 8I, and 16), the vent hole plug 652F (see FIGS. 10A, 10B, 10D-10F, and 17A-17C), and/or the exhaust hole plug 653D (see FIGS. 8A-8C, 8F, 8G, 9A, 15, and 19) may each be constructed from metal. By way of non-limiting examples, each of these components may be fabricated from ductile iron or cast iron when used in a location requiring a traffic rating.

As mentioned above, the ventilation system 210 includes the manhole cover 240A and the air moving assembly 240.

Manhole Cover

Figure 2:
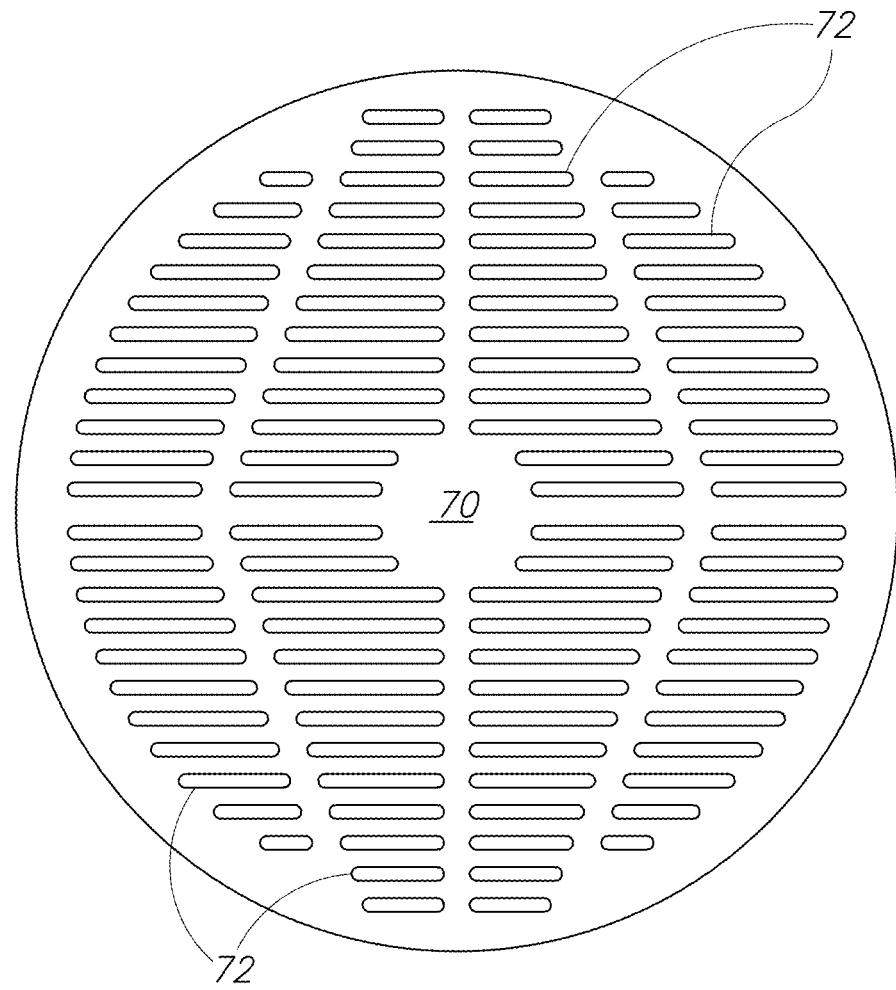
FIG. 2 is a top view of a prior art vented manhole cover.

Referring to FIG. 5A, the manhole cover 230A is configured to cap the manhole 62 instead of and in place of a conventional manhole cover (e.g., the vented manhole cover 70 illustrated in FIG. 2 or a non-vented manhole cover, not shown). As will be described below, the ventilation system 210 may include an alternate embodiment of the manhole cover 230A (e.g., one of manhole covers 230B-230G shown in FIGS. 6A, 7, 8A, 9B, 10A, and 22A, respectively) instead of and in place of the manhole cover 230A. Although the manhole covers 230A-230G have each been illustrated as having a traditional round manhole cover shape, each may have an alternate shape, such as rectangular. Furthermore, the manhole cover 230A may be implemented by retrofitting a conventional manhole cover (e.g., the vented manhole cover 70 illustrated in FIG. 2) by creating the vent hole(s) 152 (see FIG. 3) and/or the exhaust hole(s) 153 (see FIG. 3) in an otherwise solid cover, plugging some existing holes (e.g., the vent holes 72 illustrated in FIG. 2), adding a manifold (e.g., like the manifold 246A) to redirect flow, adding the vent hole plug 652D (see FIGS. 8A-8D, 8H, 8I, and 16), adding the vent hole plug 652F (see FIGS. 10A, 10B, 10D-10F, and 17A-17C), and/or adding the exhaust hole plug 653D (see FIGS. 8A-8C, 8F, 8G, 9A, 15, and 19), where appropriate.

Figure 5B:
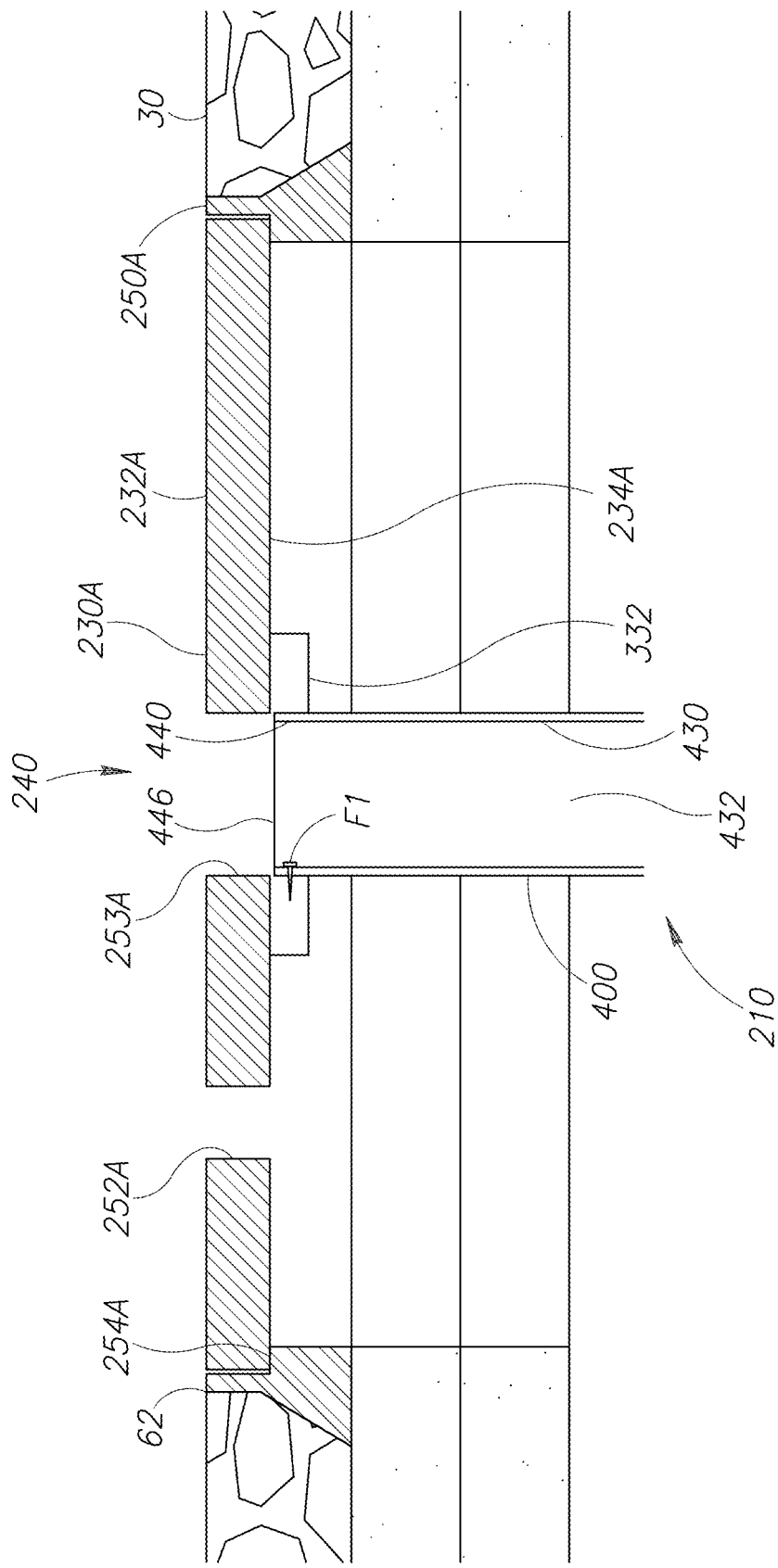
FIG. 5B is a cross-sectional view of a manhole cover coupled to a ventilation pipe by a coupling flange.
Figure 5C:
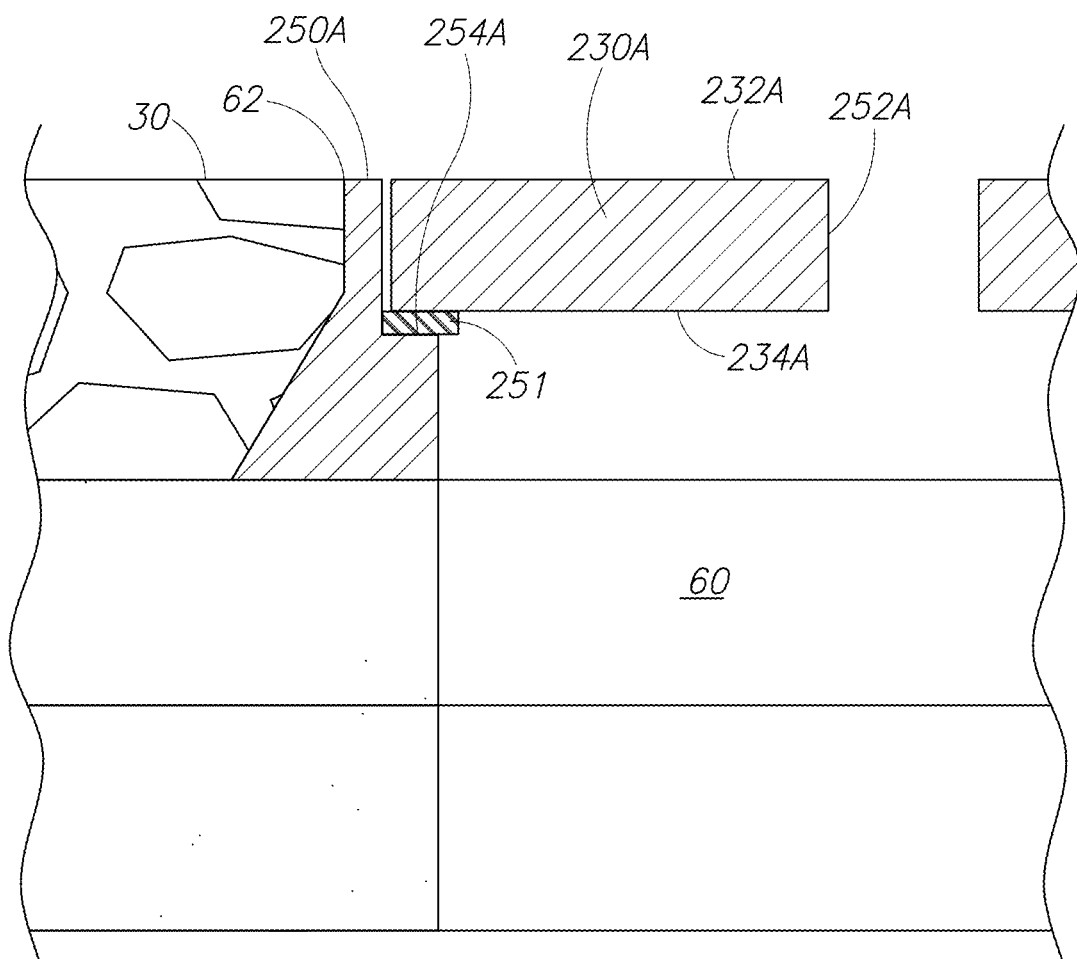
FIG. 5C is an enlarged cross-sectional view of a waterproof seal positioned between the manhole cover and a ring support of FIG. 5A.

Referring to FIG. 5A, in the embodiment of the ventilation system 210 illustrated, the manhole cover 230A is supported by the manhole ring support 250A (described in detail below), which is positioned inside the manhole 62. The manhole cover 230A rests on a ring-shaped bearing surface or ledge 254A formed in the manhole ring support 250A. Referring to FIG. 5C, an optional waterproof seal 251 (e.g., a gasket, an O-ring, putty, caulk, etc.) may be positioned between the manhole cover 230A and the manhole ring support 250A. The seal 251 is configured to prevent water ingress into vault 12 from between the manhole cover 230A and the manhole ring support 250A. Referring to FIG. 5A, optionally, as will be described below, one or more dams 582 (see FIGS. 6A-6C) and/or one or more moats 586 (see FIGS. 6A-6C) may be formed in the manhole ring support 250A, when present, and/or one or more moats 590 (see FIGS. 6A-6C) may be formed in the surface 30 alongside the manhole cover 230A. While the manhole cover 230A has been illustrated as being supported by the manhole ring support 250A, the manhole cover 230A may alternatively be supported by alternative manhole ring supports (e.g., the manhole ring support 250B depicted in FIGS. 6A-6C or the manhole ring support 250G depicted in FIGS. 21A, 21B, and 26) described below.

The manhole cover 230A has a top surface 232A and a bottom surface 234A. Referring to FIG. 5B, optionally, the coupling flange 332 may extend downwardly from the bottom surface 234A. Alternatively, the coupling flange 332 may be a separate component adjacent and, optionally, coupled to the bottom surface 234A. At least one fastener F1 (e.g., a pin, a screw, a bolt, and the like) may be used to removably couple the coupling flange 332 to the air moving assembly 240 (see FIG. 4A). While FIG. 5B illustrates only the single fastener F1, more than one fastener may be so employed. For example, three or four fasteners may be used.

Referring to FIG. 5A, the vent hole(s) 152 (see FIG. 3) have been implemented as at least one vent hole 252A and the exhaust hole(s) 153 (see FIG. 3) have been implemented as at least one exhaust hole 253A. The vent and exhaust holes 252A and 253A extend between the top and bottom surfaces 232A and 234A and may have axes oriented in a direction substantially perpendicular to the surfaces 232A and 234A. In FIG. 5A, the manhole cover 230A includes only the one centrally located exhaust hole 253A and only the single vent hole 252A. The vent and exhaust holes 252A and 253A may be displaced (or spaced apart) from one another as far as practical so as to minimize re-entry (through the vent hole 252A) of exhaust gases (represented by the arrows A2 in FIG. 3) exiting from the exhaust hole 253A.

First Alternate Embodiment of Manhole Cover

Figure 6A:
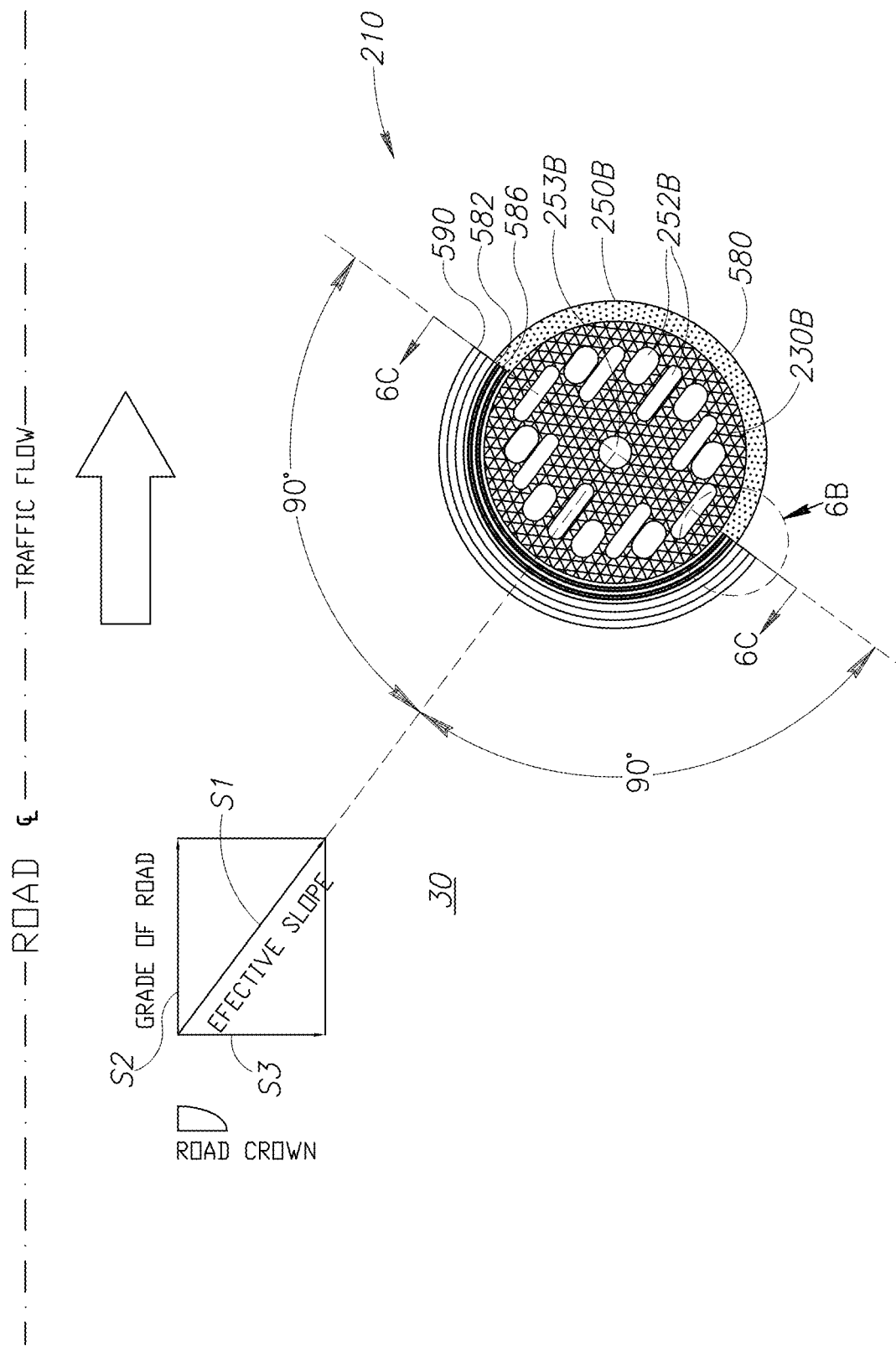
FIG. 6A is a top view of an alternate exemplary implementation of the first embodiment of the ventilation system that includes a manhole cover and a ring support.
Figure 6B:
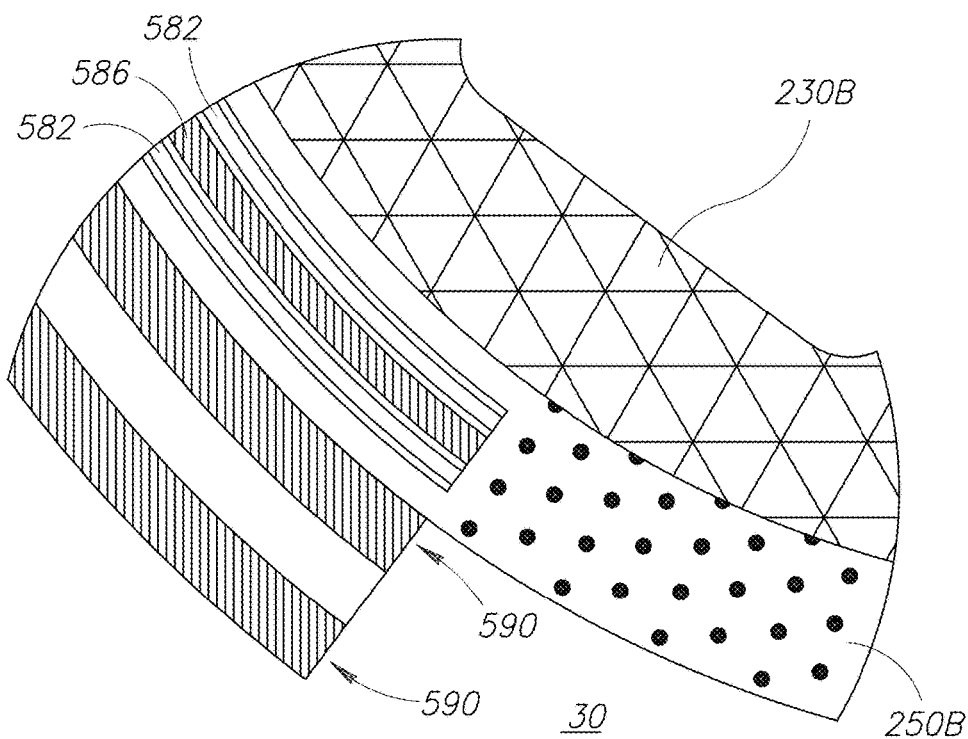
FIG. 6B is an enlarged view of a portion of FIG. 6A identified by a circle 6B in FIG. 6A.
Figure 6C:
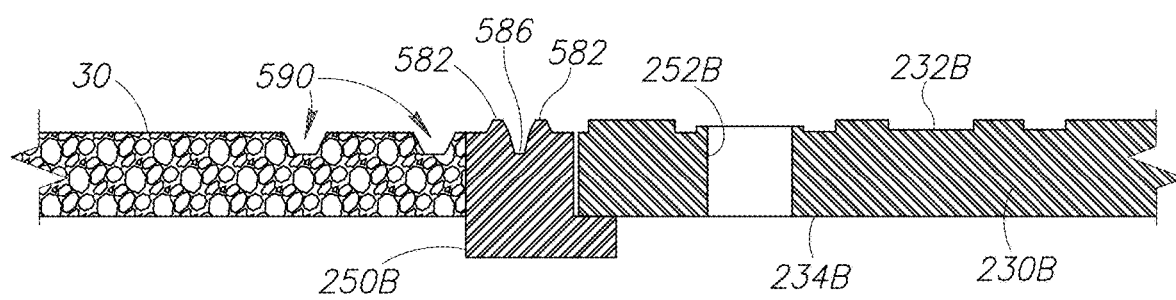
FIG. 6C is a cross-sectional view taken through a line 6C-6C in FIG. 6A.

Referring to FIGS. 6A-6C, the ventilation system 210 may include an alternate embodiment of a manhole cover 230B instead and in place of the manhole cover 230A (see FIGS. 4A-5B) and the manhole ring support 250B (described below) instead and in place of the manhole ring support 250A (see FIGS. 5A, 5B, 9B, and 19).

FIG. 6A is a top view of the manhole cover 230B resting on the manhole ring support 250B. Referring to FIG. 6A, the manhole cover 230B is substantially similar to the manhole cover 230A (see FIGS. 4A-5B). Like the manhole cover 230A, the manhole cover 230B includes top and bottom surfaces 232B and 234B and an exhaust hole 253B substantially identical to the exhaust hole 253A (see FIGS. 5A and 5B). However, in the embodiment illustrated, the manhole cover 230B includes vent holes 252B that each have an oblong lateral cross-sectional shape. These oblong-shaped vent holes 252B are aligned with an effective slope S1 of the surface 30. This shape and orientation may help keep surface water (e.g., precipitation) out of the interior 50 (see FIG. 1) of the vault 12 (see FIGS. 1, 3-4B, 9A, 18, 19, 21A, 21B, 26A, and 32). The vent holes 252B are circumferentially disposed along a radial position closer to the periphery of the manhole cover 230B than the centrally located exhaust hole 253B.

Optionally, a plurality of the vent hole plugs 652D (see FIGS. 8A-8D, 8H, 8I, and 16) may be inserted one each into some of the vent holes 252B and/or a plurality of the vent hole plugs 652F (see FIGS. 10A, 10B, 10D-10F, and 17A-17C) may be inserted one each into some of the vent holes 252B. Similarly, the exhaust hole plug 653D (see FIGS. 8A-8C, 8F, 8G, 9A, 15, and 19) may be inserted into the exhaust hole 253B.

Optionally, as will be described below, the one or more dams 582 (see FIGS. 6A-6C) and/or one or more moats 586 (see FIGS. 6A-6C) may be formed in the manhole ring support 250B and/or the one or more moats 590 (see FIGS. 6A-6C) may be formed in the surface 30 alongside the manhole cover 230B. While the manhole cover 230B has been illustrated as being supported by the manhole ring support 250B, the manhole cover 230B may alternatively be supported by alternative manhole ring supports (e.g., the manhole ring support 250A illustrated in FIGS. 5A, 5B, 9B, and 19 or the manhole ring support 250G illustrated in FIGS. 21A, 21B, and 26) described below.

Second Alternate Embodiment of Manhole Cover

Figure 7:
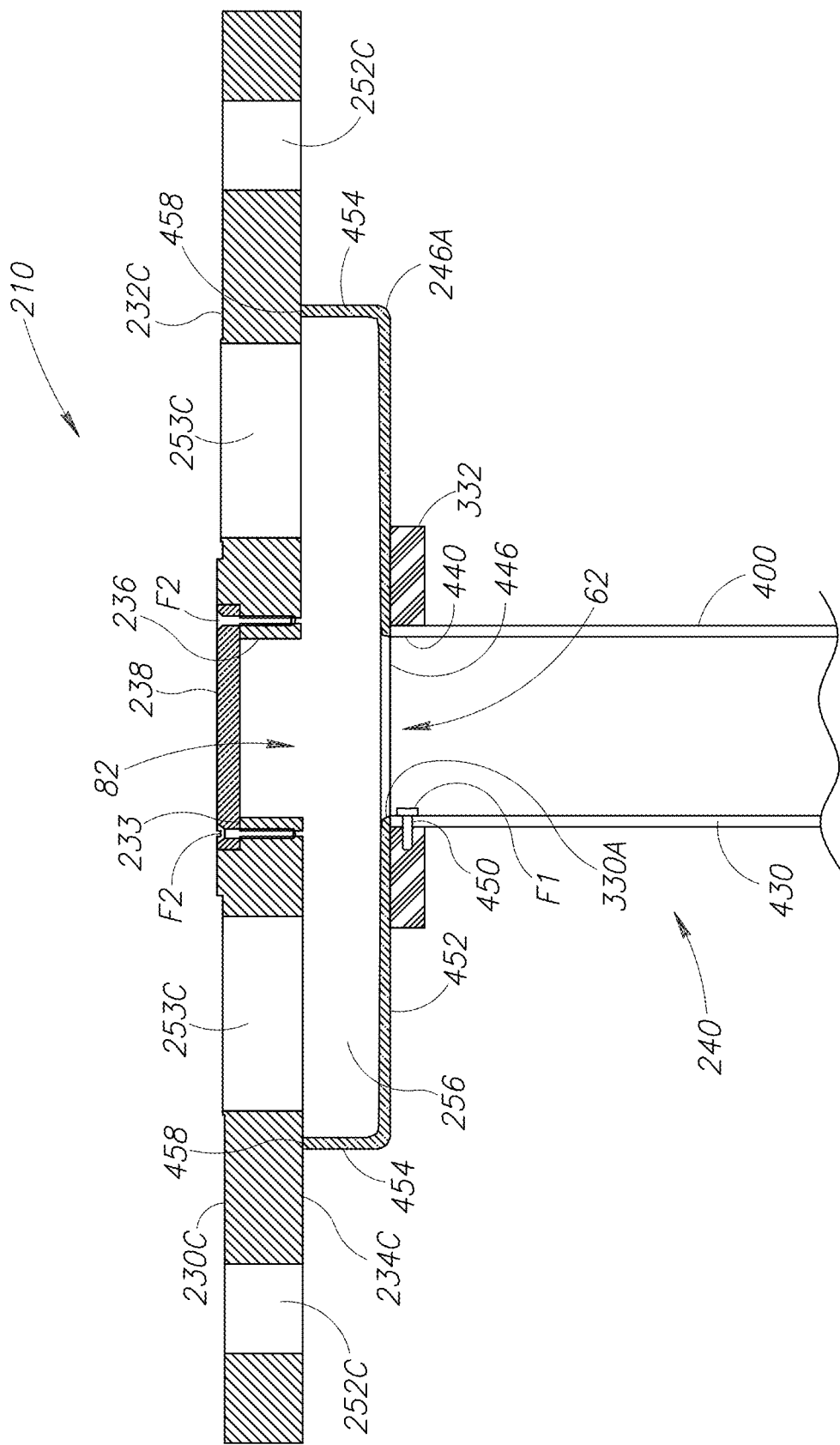
FIG. 7 is a cross-sectional view of an alternate exemplary implementation of the first embodiment of the ventilation system that includes a manifold that couples the ventilation pipe to the manhole cover.

Referring to FIG. 7, the ventilation system 210 may include an alternate embodiment of a manhole cover 230C instead and in place of the manhole cover 230A (see FIGS. 4A-5B). The manhole cover 230C is configured for use with the removable access cover 238 and the manifold 246A.

The manhole cover 230C has a top surface 232C opposite a bottom surface 234C. The manhole cover 230C includes the central access hole 236, which extends between the top and bottom surfaces 232C and 234C. The access hole 236 is covered by the access cover 238. In the embodiment illustrated, the access cover 238 is recessed inside the central access hole 236 and positioned below the top surface 232C. The access cover 238 rests upon a ring-shaped ledge 233 formed inside the central access hole 236. One or more fasteners F2 (e.g., bolts or screws) may be used to couple the access cover 238 to the manhole cover 230C (e.g., to the ledge 233).

Both vent holes 252C and exhaust holes 253C extend between the top and bottom surfaces 232C and 234C. The vent holes 252C are arranged along a first ring and the exhaust holes 253C are arranged along a second ring concentric with the first ring. The second ring has a smaller radius than the first ring and, therefore, is positioned inside the first ring. As will be described below, the manifold 246A channels or directs the internal air pushed by the air moving assembly 240 toward the exhaust holes 253C of the manhole cover 230C.

Figure 21A:
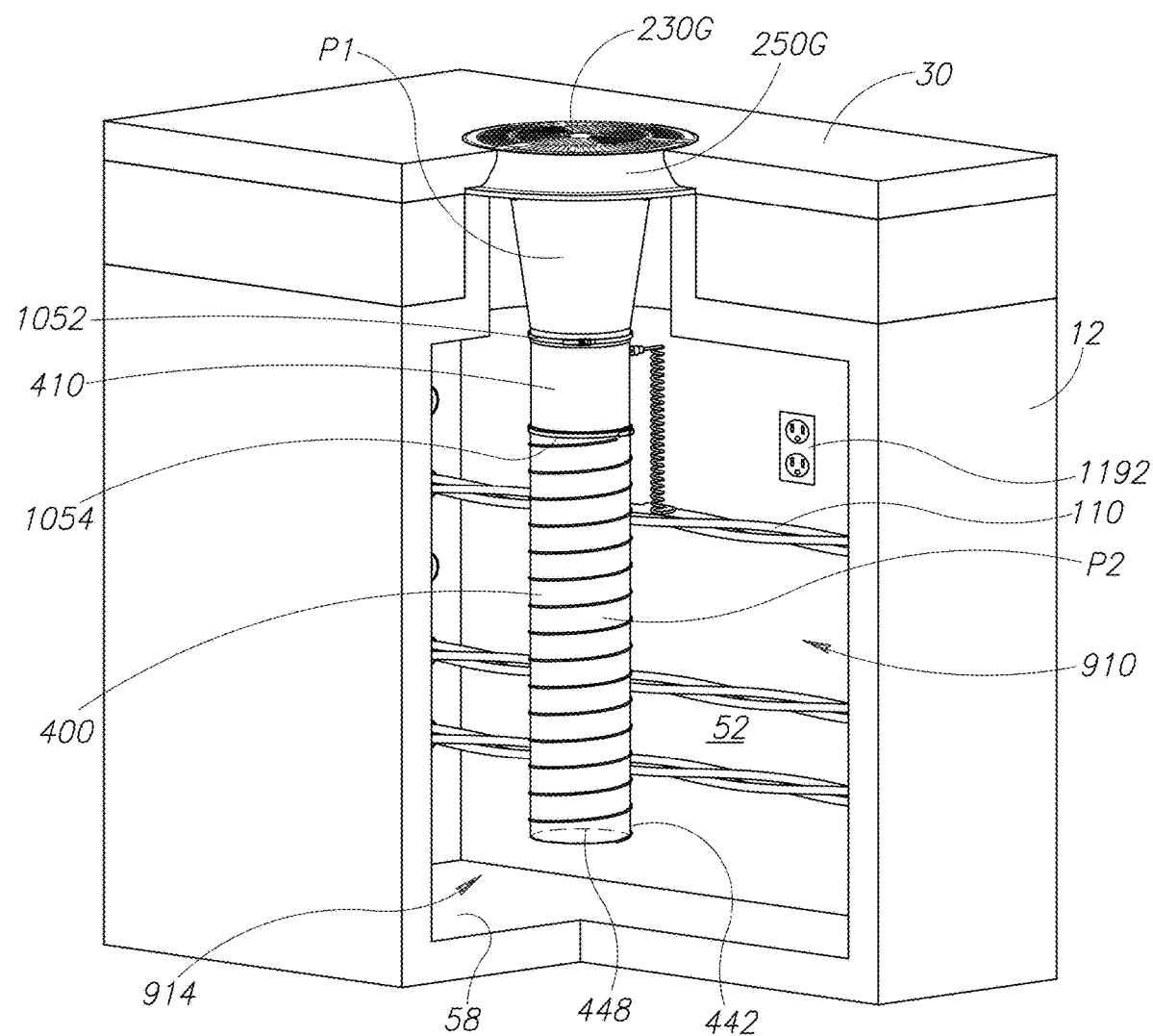
FIG. 21A is a perspective view of an exemplary implementation of a fourth embodiment of the ventilation system including a manhole cover, a support bracket assembly, and a ventilator assembly.

The manhole cover 230C may be supported by a manhole ring support (e.g., the manhole ring support 250A, 250B, or 250G illustrated in FIGS. 5A, 6A, and 21A, respectively). Optionally, a plurality of the vent hole plugs 652D (see FIGS. 8A-8D, 8H, 8I, and 16) may be inserted one each into some of the vent holes 252C and/or a plurality of the vent hole plugs 652F (see FIGS. 10A, 10B, 10D-10F, and 17A-17C) may be inserted one each into some of the vent holes 252C. Similarly, a plurality of the exhaust hole plugs 653D (see Figures FIGS. 8A-8C, 8F, 8G, 9A, 15, and 19) may be inserted one each into the exhaust holes 253C.

Third Alternate Embodiment of Manhole Cover

Figure 8A:
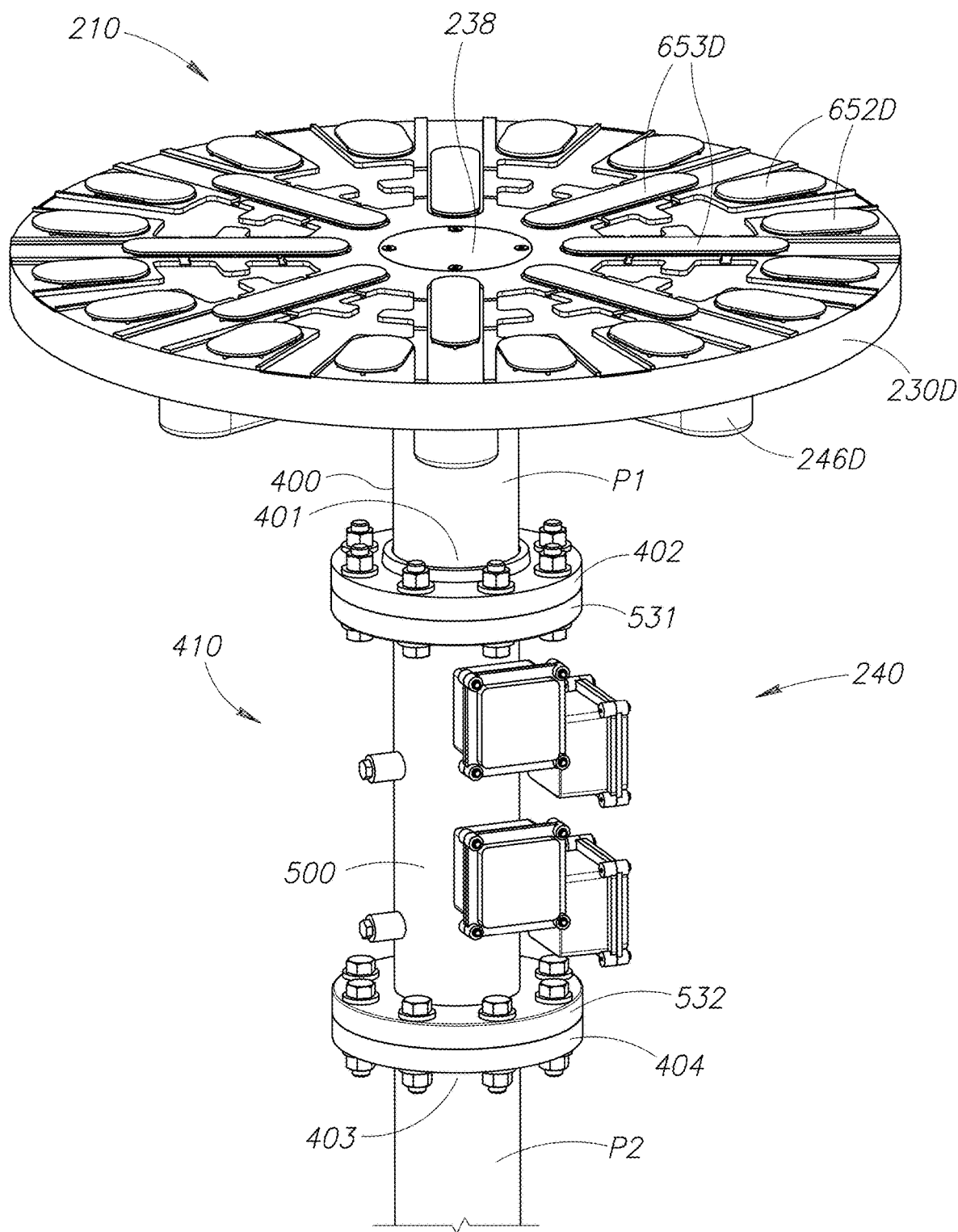
FIG. 8A is an isometric view of an alternate exemplary implementation of the first embodiment of the ventilation system that includes a manhole cover and vent and exhaust hole plugs.

Referring to FIG. 8A, the ventilation system 210 may include an alternate embodiment of a manhole cover 230D instead and in place of the manhole cover 230A (see FIGS. 4A-5B). The manhole cover 230D is configured for use with the removable access cover 238, the vent hole plugs 652D, the exhaust hole plugs 653D, and the manifold 246D (described below). The manifold 246D is used instead and in place of the manifold 246A (see FIGS. 7, 9B, and 19). The ventilation system 210 is presented as an isometric view in FIG. 8A and as an exploded view in FIG. 8B. In these figures, the air moving assembly 240 is truncated for illustration purposes, but it should be understood that it may extend to any desired vertical level within the vault 12 (see FIGS. 1, 3-4B, 9A, 18, 19, 21A, 21B, 26A, and 32). FIG. 8C is a top view of the ventilation system 210. FIGS. 8F and 8H are cross-sectional views taken through lines 8F-8F and 8H-8H, respectively, shown in FIG. 8C, and show a subassembly of the manhole cover 230D and the manifold 246D.

The manhole cover 230D is substantially similar to the manhole cover 230C (see FIG. 7). Referring to FIG. 8F, the manhole cover 230D has a top surface 232D opposite a bottom surface 234D. The manhole cover 230D includes the central access hole 236, which extends between the top and bottom surfaces 232D and 234D. The access hole 236 is covered by the removable access cover 238. In the embodiment illustrated, the access cover 238 is coupled to the manhole cover 230D by the fastener(s) F2 (e.g., bolts or screws).

Figure 8B:
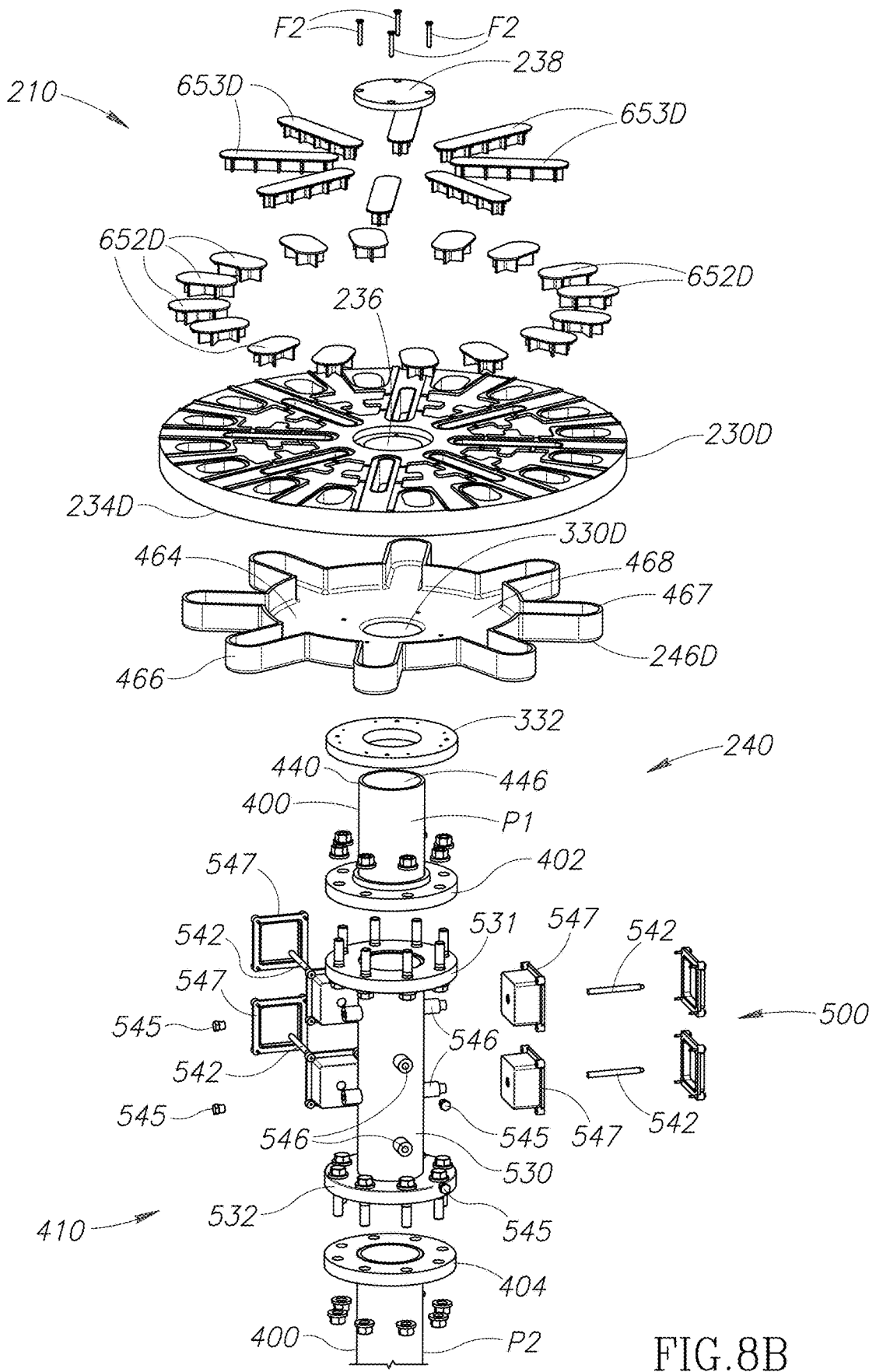
FIG. 8B is an exploded view of the implementation of the first embodiment of the ventilation system depicted in FIG. 8A.
Figure 8C:
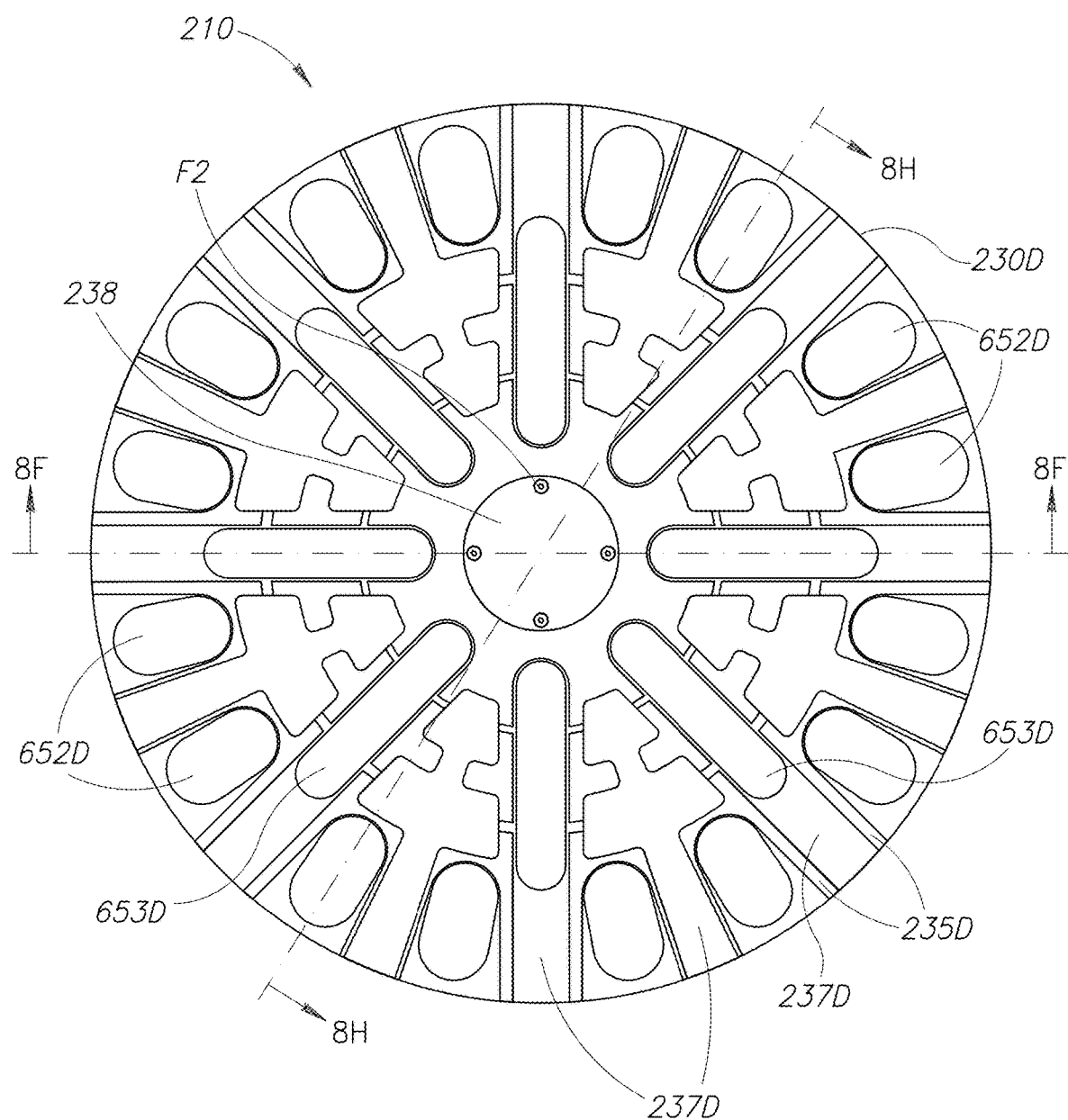
FIG. 8C is a top view of the implementation of the first embodiment of the ventilation system depicted in FIG. 8A.
Figure 8D:
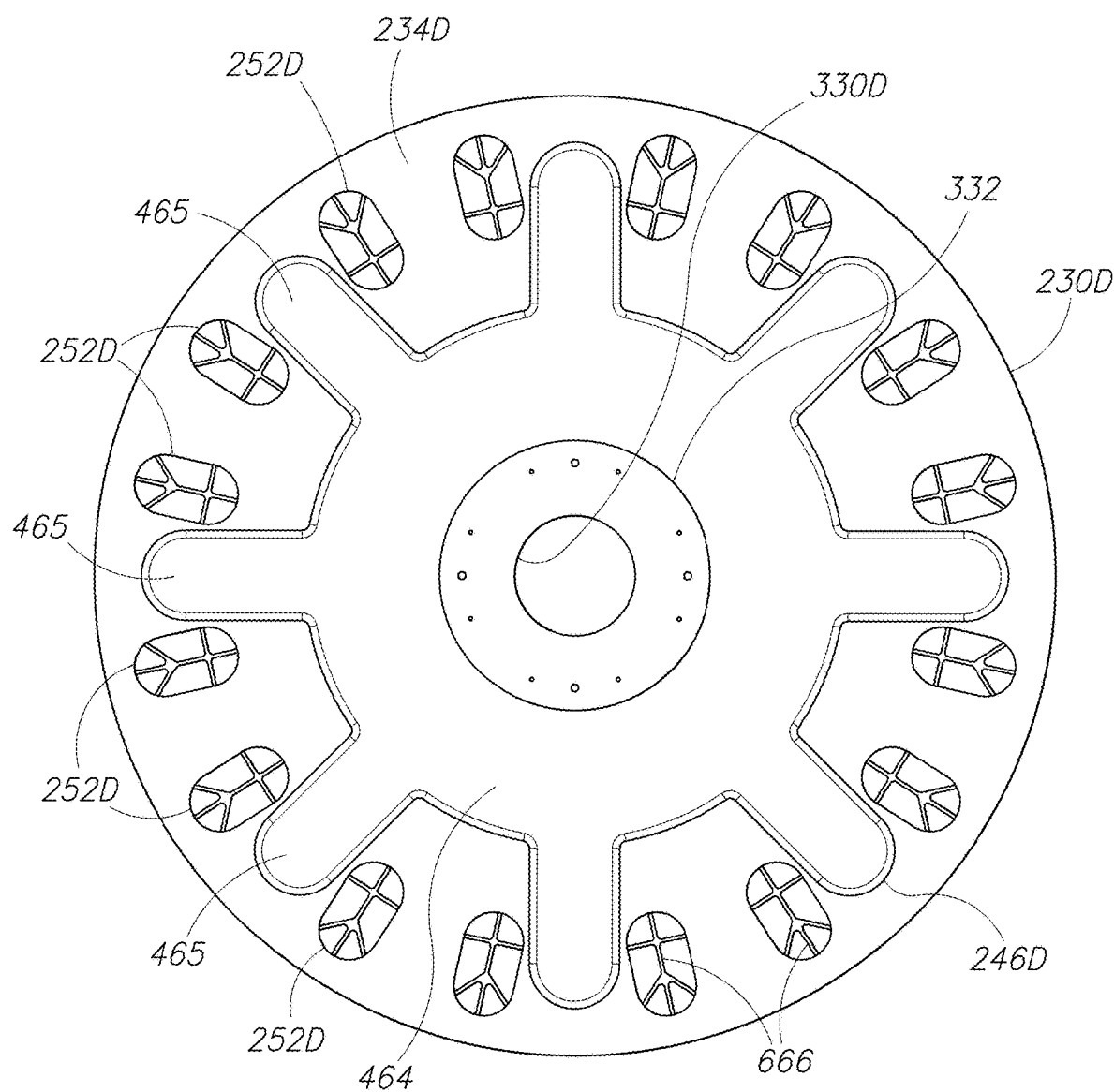
FIG. 8D is a bottom view of the implementation of the first embodiment of the ventilation system depicted in FIG. 8A.
Figure 8E:
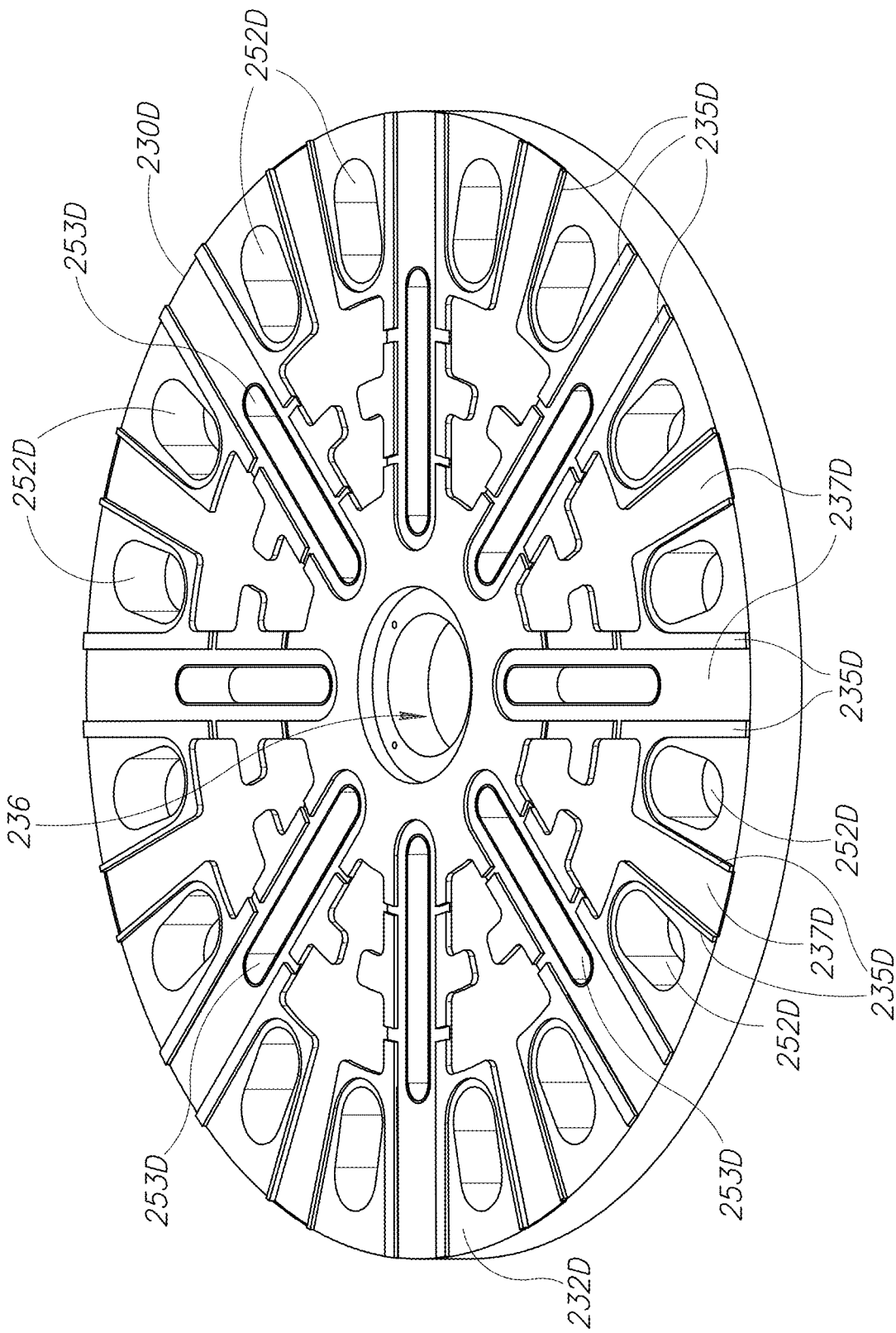
FIG. 8E is an isometric view of the manhole cover shown in FIG. 8A omitting the vent and exhaust hole plugs.

Referring to FIG. 8E, the vent hole(s) 152 (see FIG. 3) have been implemented as vent hole(s) 252D and the exhaust hole(s) 153 (see FIG. 3) have been implemented as exhaust holes 253D. Both the vent holes 252D and the exhaust holes 253D extend between the top and bottom surfaces 232D and 234D (see FIG. 8F). The vent holes 252D are arranged along a first ring and the exhaust holes 253D are arranged along a second ring concentric with the first ring. In the embodiment illustrated, the exhaust holes 253D are each elongated and each extends radially outwardly at least partially between a different pair of adjacent vent holes 252D. Thus, the exhaust holes 253D and the vent holes 252D overlap radially.

Unlike the manhole cover 230C (see FIG. 7), the manhole cover 230D includes elevation dams or walls 235D that at least partially define water channels or raceways 237D. The elevation walls 235D partially surround each vent hole 252D and each exhaust hole 253D. The elevation walls 235D extend upwardly and may optionally extend upwardly beyond the surface 30 (see FIGS. 1, 3-6C, 9A, 9B, 18, 19, 21A, 26A, and 32). The elevation walls 235D and the raceways 237D allow surface water (e.g., precipitation such as rain and melted snow) to runoff the manhole cover 230D and reduce or minimize the flow thereof into the vent and exhaust holes 252D and 253D. The elevation walls 235D may be aligned with a grade (represented by an arrow S2 in FIG. 6A) of the surface 30.

State and local regulations typically limit the height of surface features like the elevation walls 235D. For this reason, the elevation walls 235D should generally be no taller than about ⅛ inches to about 3/16 inches. The raceways 237D can also be used to collect surface water and/or direct surface water into hole-free areas of the manhole cover 230D.

Referring to FIG. 8H, the vent hole plugs 652D (described below) may also help prevent precipitation (e.g., rain and snow) from entering the vault 12 (see FIGS. 1, 3-4B, 9A, 18, 19, 21A, 21B, 26A, and 32) via the vent holes 252D. Similarly, referring to FIG. 8F, the exhaust hole plugs 653D (described below) may also help prevent precipitation (e.g., rain and snow) from entering the vault 12 (see FIGS. 1, 3-4B, 9A, 18, 19, 21A, 21B, 26A, and 32) via the exhaust holes 253D. For example, referring to FIG. 8C, if the elevation walls 235D are overwhelmed by a heavy flow of water, the vent and exhaust hole plugs 252D and 253D help reduce direct flow of water into the vault 12 (see FIGS. 1, 3-4B, 9A, 18, 19, 21A, 21B, 26A, and 32).

Optionally, the manhole cover 230D may be supported by a manhole ring support (e.g., the manhole ring support 250A, 250B, or 250G illustrated in FIGS. 5A, 6A, and 21A, respectively). As will be described below, the one or more dams 582 (see FIGS. 6A-6C) and/or one or more moats 586 (see FIGS. 6A-6C) may be formed in the manhole ring support and/or the one or more moats 590 (see FIGS. 6A-6C) may be formed in the surface 30 alongside the manhole cover 230D.

Fourth Alternate Embodiment of Manhole Cover

Figure 9A:
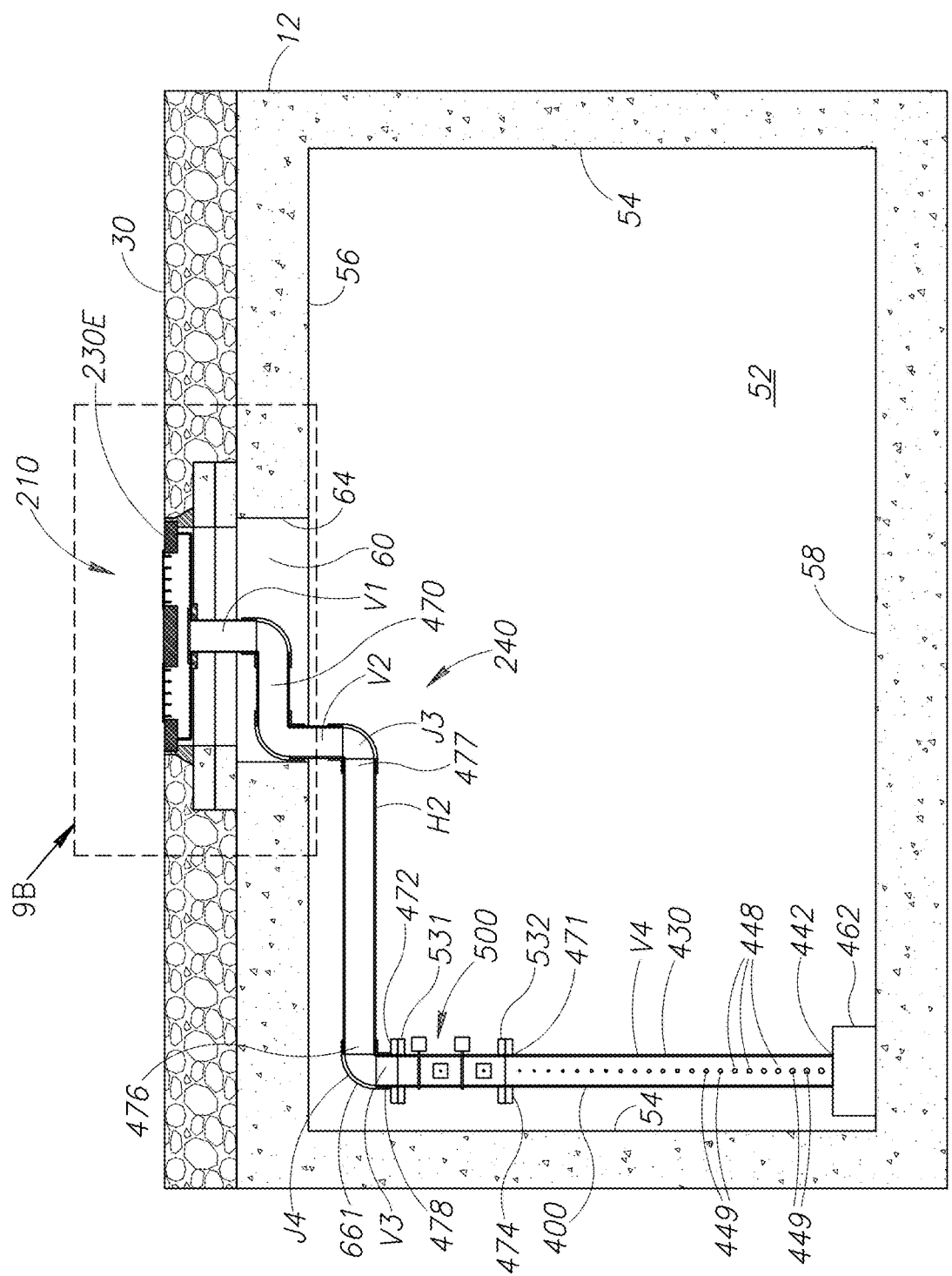
FIG. 9A is a cross-sectional view of an alternate exemplary implementation of the first embodiment of the ventilation system.
Figure 9B:
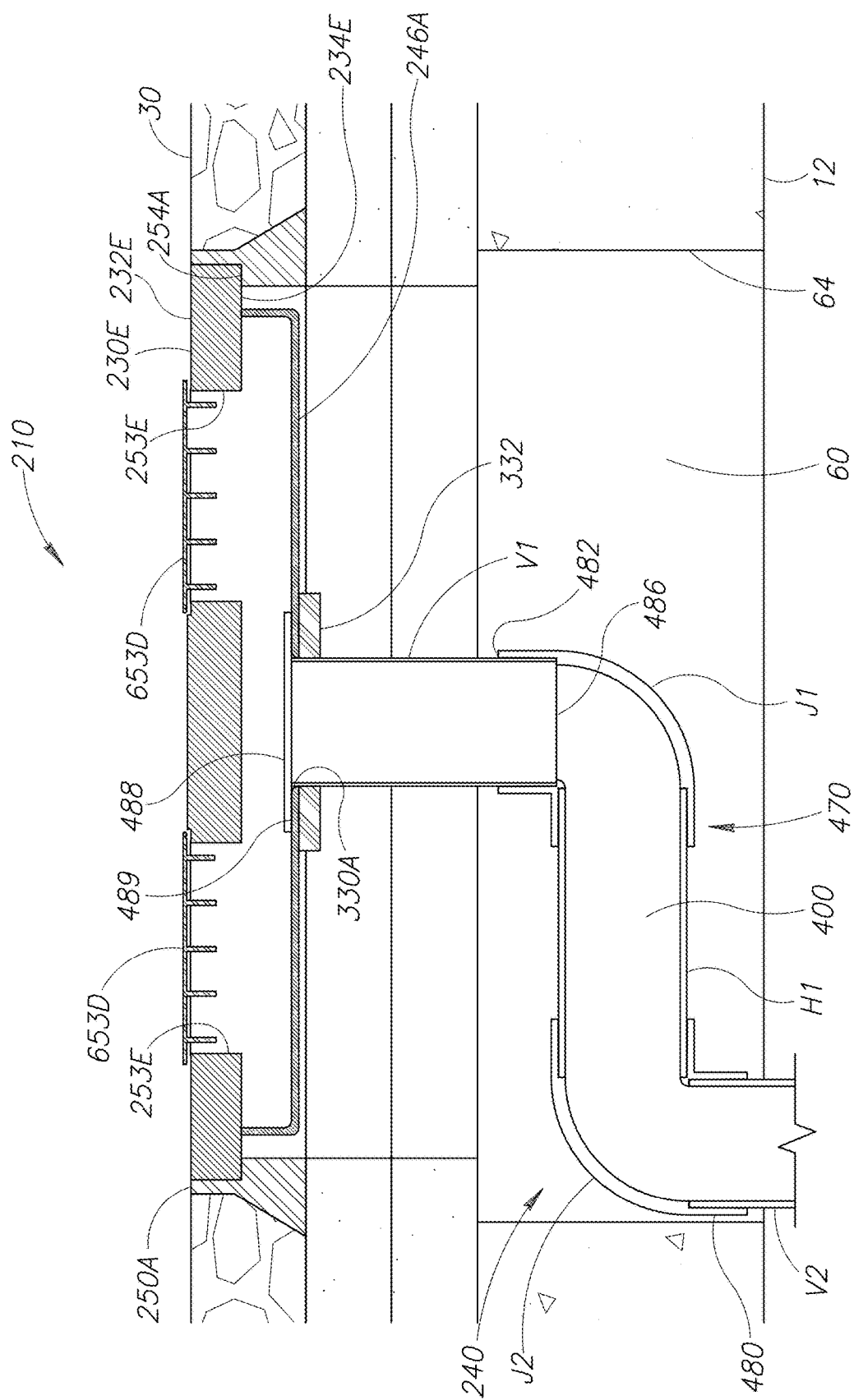
FIG. 9B is an enlarged view of a portion of FIG. 9A identified by a broken line box 9B in FIG. 9A.

Referring to FIGS. 9A and 9B, the ventilation system 210 may include an alternate embodiment of a manhole cover 230E instead and in place of the manhole cover 230A (see FIGS. 4A-5B). Referring to FIG. 9B, the manhole cover 230E is configured for use with the manhole ring support 250A, the exhaust hole plugs 653D, and the manifold 246A.

Referring to FIG. 9B, the manhole cover 230E includes exhaust holes 253E that extend between top and bottom surfaces 232E and 234E. The manifold 246A is coupled to the bottom surface 234E, and this combination rests on the ledge 254A of the manhole ring support 250A. The manifold 246A provides fluid communication between the air moving assembly 240 and the exhaust holes 253E.

Unlike other embodiments described above, the manhole cover 230E omits vent holes. Instead, portions of the external atmosphere 102 (see FIG. 3) may enter the vault 12 via other means (e.g., through a gap defined between the manhole cover 230E and the manhole ring support 250A, through the vent stack 132 illustrated in FIG. 3, through the conduits 20A-20C depicted in FIG. 1, and the like).

Optionally, the one or more dams 582 (see FIGS. 6A-6C) and/or one or more moats 586 (see FIGS. 6A-6C) may be formed in the manhole ring support 250A and/or the one or more moats 590 (see FIGS. 6A-6C) may be formed in the surface 30 alongside the manhole cover 230E.

Fifth Alternate Embodiment of Manhole Cover

Figure 10A:
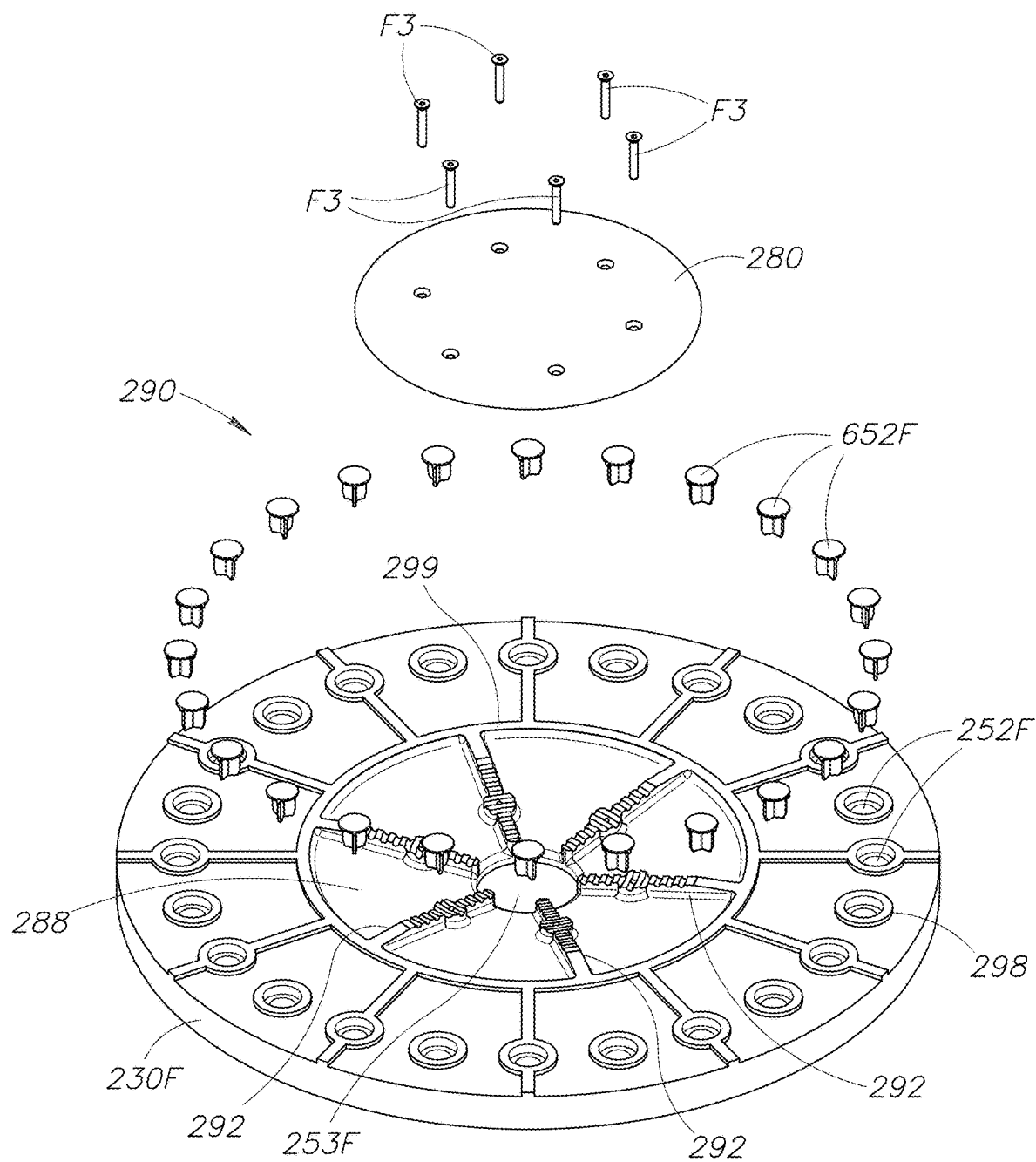
FIG. 10A is an exploded view of an alternate exemplary implementation of the first embodiment of the ventilation system that includes a manhole cover, an exhaust passage cap, and round vent hole plugs.
Figure 10B:
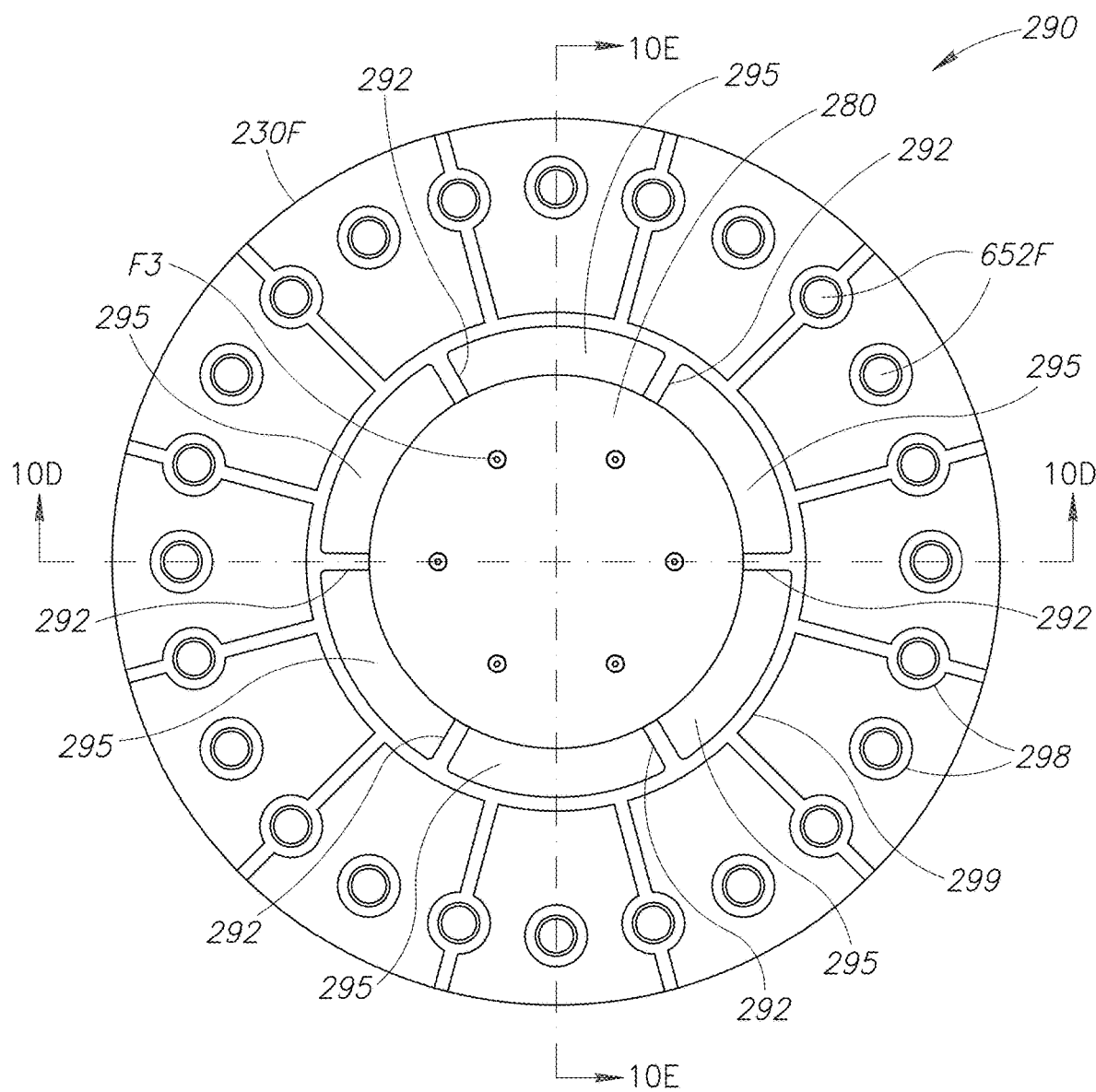
FIG. 10B is a top view of the implementation of the first embodiment of the ventilation system depicted in FIG. 10A.

Referring to FIGS. 10A-10F, the ventilation system 210 (see FIGS. 4A-5B, 6A, 7-8C, 9A, and 9B) may include an alternate embodiment of a manhole cover 230F instead and in place of the manhole cover 230A (see FIGS. 4A-5B). Referring to FIG. 10A, the manhole cover 230F is configured for use with an exhaust passage cap 280 and the vent hole plugs 652F (described below). Optionally, the coupling flange 332 (see FIGS. 5B, 7, 8B, 8F, 8H, and 9B) may be used to couple the manhole cover 230F to the air moving assembly 240 (see FIGS. 4A, 4B, 7-8B, 9A, 9B, and 18). Together, the manhole cover 230F, the exhaust passage cap 280, and the vent hole plugs 652F form a manhole cover assembly 290.

Figure 10C:
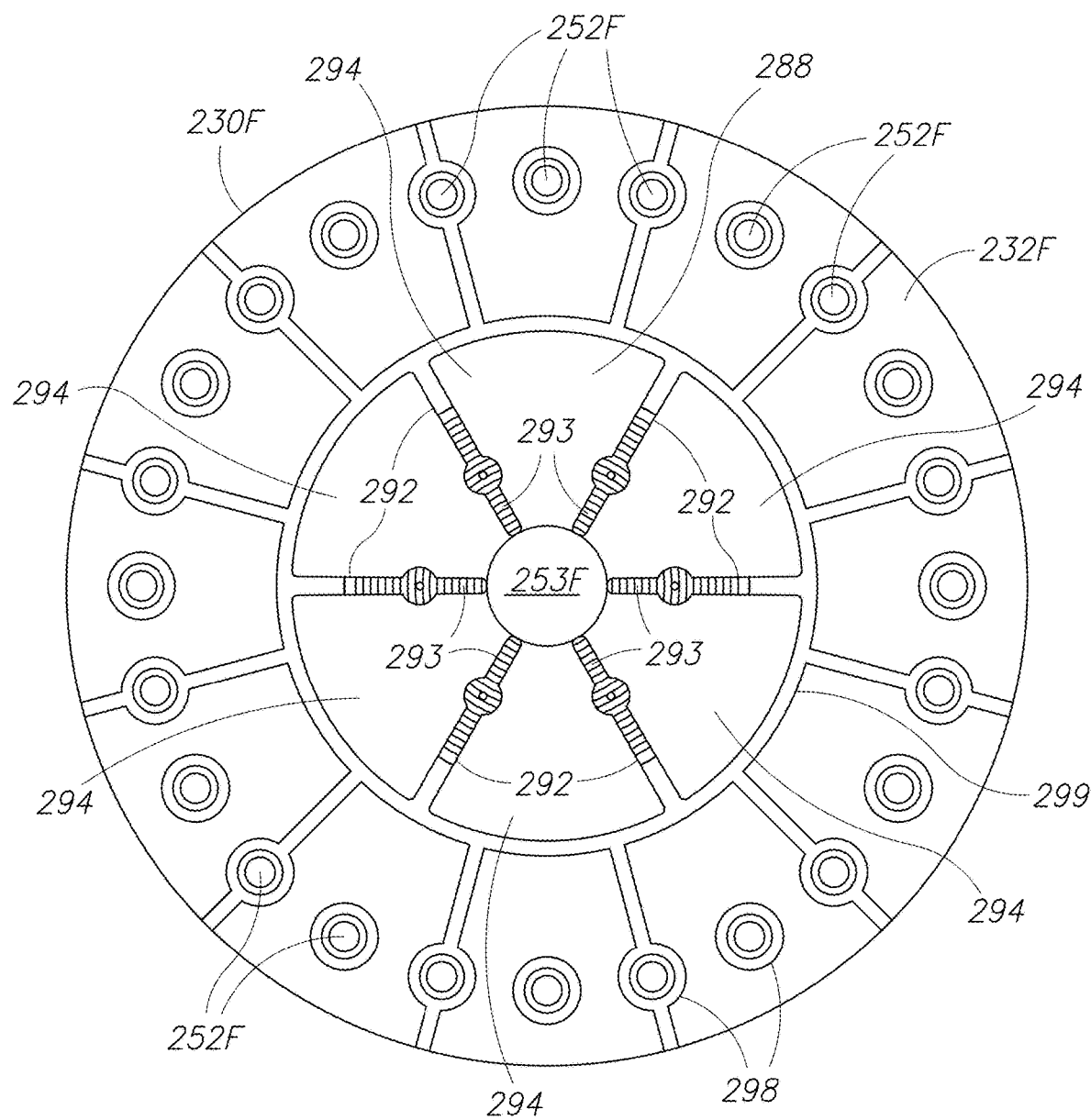
FIG. 10C is a top view of the manhole cover shown in FIG. 10A omitting the exhaust passage cap and the round vent hole plugs.
Figures 10D, 10E:
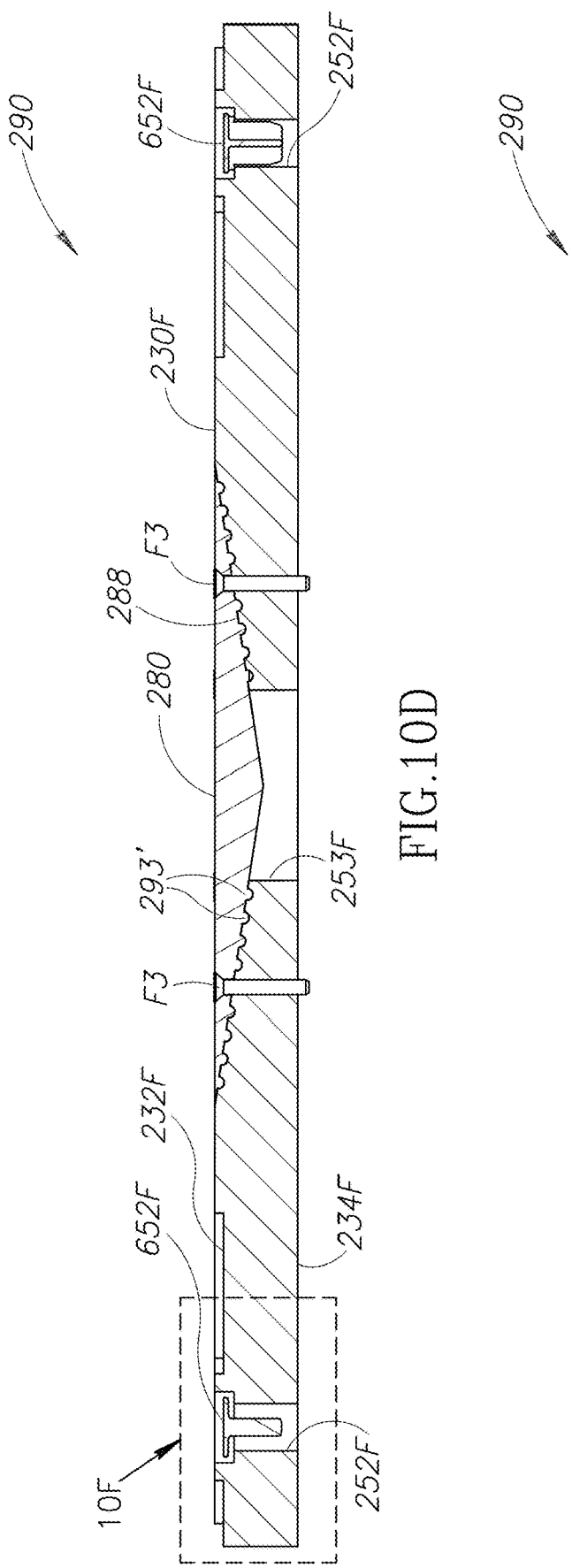
FIG. 10D is a cross-sectional view taken through a line 10D-10D in FIG. 10B.
FIG. 10E is a cross-sectional view taken through a line 10E-10E in FIG. 10B.

Referring to FIG. 10D, the manhole cover 230F has a top surface 232F opposite a bottom surface 234F. The manhole cover 230F includes a single exhaust hole 253F that also functions as the access hole 236 (see FIGS. 7, 8B, 8E, 8F, and 8H). The exhaust hole 253F is covered by the exhaust passage cap 280, which provides functionality similar to that of the access cover 238 (see FIGS. 7, 8A-8C, 8F, and 8H). In the embodiment illustrated, the exhaust passage cap 280 is coupled to the manhole cover 230F by one or more fasteners F3 (e.g., bolts or screws).

Referring to FIG. 10A, the manhole cover 230F has a recessed portion 288 surrounding the exhaust hole 253F. The recessed portion 288 includes upwardly extending support walls or ribs 292 that extend radially outwardly from the exhaust hole 253F under the exhaust passage cap 280. The ribs 292 are rack-like members configured to support the exhaust passage cap 280, which is fastened thereto by the fastener(s) F3. Referring to FIG. 10C, the ribs 292 are corrugated along or include grooves 293' (see FIG. 10D) formed in their upper edge surfaces 293.

Recesses or channels 294 are defined between adjacent ones of the ribs 292. Air exiting the air moving assembly 240 (see FIGS. 4A, 4B, 7-8B, 9A, 9B, and 18) flows out of the exhaust hole 253F, into the channels 294, and out openings 295 (see FIG. 10B) defined between the peripheral edge of the exhaust passage cap 280 and the manhole cover 230F. Thus, the channels 294 provide functionality to similar to that provided by the manifold 246A (see FIGS. 7, 9B, and 19). Accordingly, in this embodiment, the exhaust hole 253F (see FIG. 10C) provides the same functionality as a manifold port 330A (described below and illustrated in FIGS. 7 and 9B).

Figure 10F:
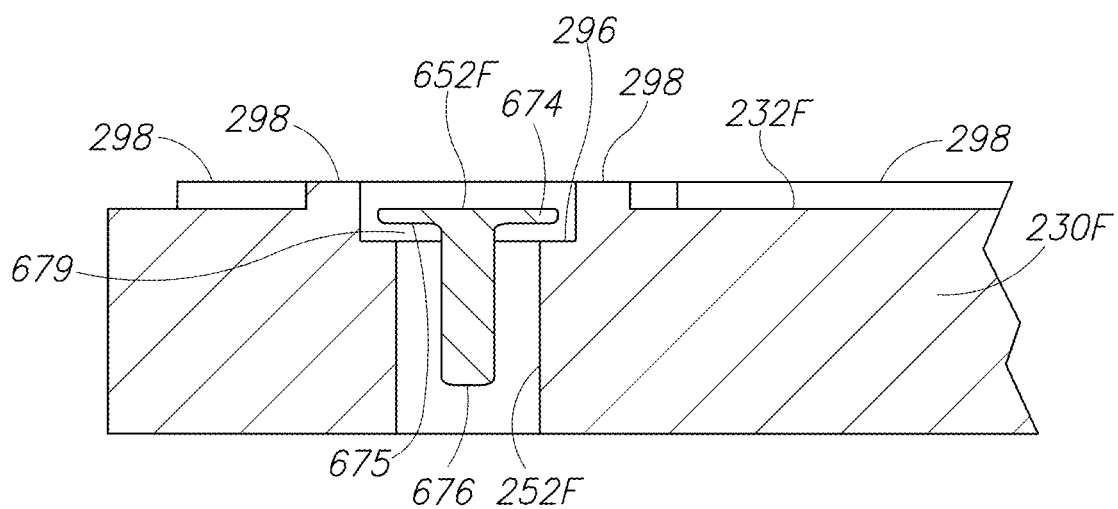
FIG. 10F is an enlarged view of a portion of FIG. 10D identified by a broken line box 10F in FIG. 10D.

Referring to FIG. 10D, vent holes 252F extend between the top and bottom surfaces 232F and 234F. The vent holes 252F are arranged along a first ring that is spaced apart from and surrounds the exhaust hole 253F. In this embodiment, the vent holes 252F are round and each configured to receive a different one of the vent hole plugs 652F. The vent hole plugs 652F may be characterized as being disposed near the periphery of the manhole cover 230F. Referring to FIG. 10F, in the embodiment illustrated, the vent hole plugs 652F are recessed and each rests upon a ring-shaped or annular ledge 296 that is positioned below the top surface 232F of the manhole cover 230F and surrounds the vent hole 252F into which the vent hole plug has been inserted.

In FIG. 10C, the exhaust passage cap 280 (see FIGS. 10A, 10B, 10D, and 10E) and round vent hole plugs 652F (see FIGS. 10A, 10B, 10D-10F, and 17A-17C) have been removed, exposing the ribs 292 and the vent holes 252F, respectively. The manhole cover 230F includes elevation walls 298 that partially or fully surround each of the vent and/or exhaust holes 252F and 253F and a circular elevation wall 299 that surrounds the recessed portion 288. The circular elevation wall 299 is configured to limit ingress of liquids and solids into the channels 294 via the openings 295 (see FIG. 10B). The elevation walls 298 (which typically extend about ⅛ inch to about ¼ inch above the top surface 232F) may limit ingress of water and facilitate runoff thereof. Experiments simulating surface run-off from "heavy rain" conditions have shown that such elevation walls help to limit the amount of water that can enter a given hole in the manhole cover 230F, particularly when, as illustrated in FIG. 10F, the interior periphery of the elevation wall 298 is displaced slightly (e.g., by the ledge 296) from the periphery of the corresponding hole (e.g., the vent hole 252F). Referring to FIG. 10F an annular area of the ledge 296 (i.e., between the inner periphery of the elevation wall 298 and the periphery of the round vent hole 252F) is twice the cross-sectional area of the round vent hole 252F.

Additionally, experiments suggest that certain hole shapes are better at keeping water out. For example, star-shaped holes (e.g., a six-pointed star) and oval/oblong-shaped holes (e.g., the exhaust holes 253F and the vent holes 252F shown in FIG. 8E) were found to be superior to round holes, in the latter case only when the water flow direction was along the long axis of the oval.

Figure 10G:
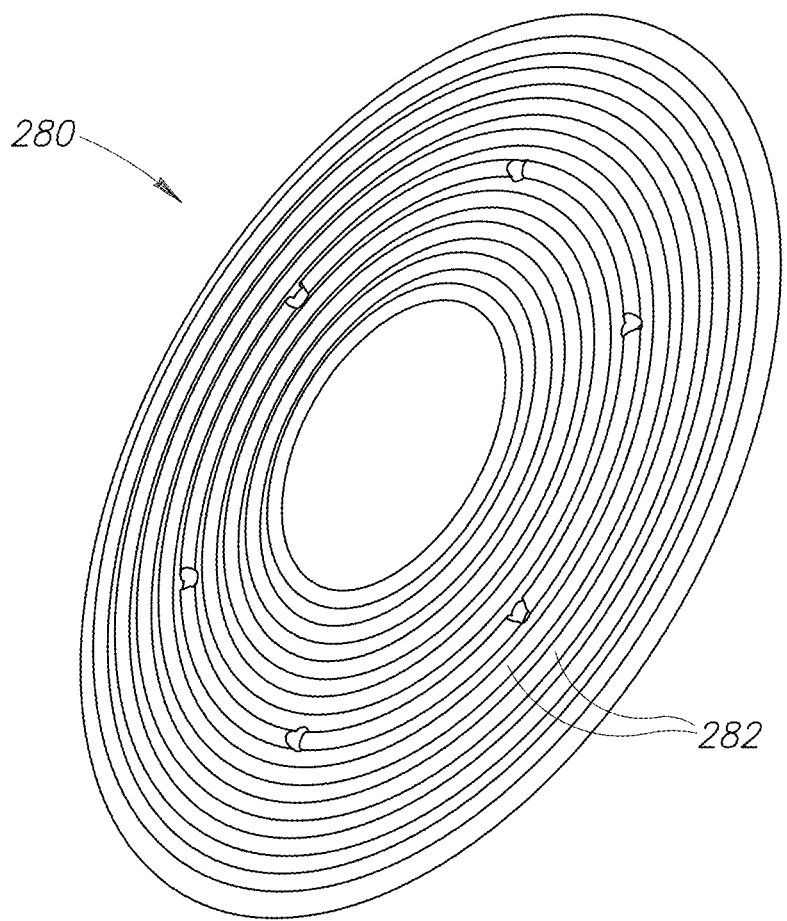
FIG. 10G is an isometric view of the exhaust passage cap shown in FIG. 10A.

Referring to FIGS. 10E and 10G, the exhaust passage cap 280, has concentric corrugations or ridges 282 (see isometric view of the exhaust passage cap 280 in FIG. 10G) formed on its underside and configured to be received within and mate with the grooves 293' (see FIG. 10D) formed in the upper edge surfaces 293 (see FIG. 10C) of the ribs 292 (see FIG. 10C). Referring to FIG. 10E, the channels 294 defined between the manhole cover 230F and the exhaust passage cap 280 function as exhaust passages that are in fluid communication with both the exhaust hole 253F and the openings 295.

Optionally, the manhole cover 230F may be supported by a manhole ring support (e.g., one of the manhole ring supports 250A, 250B, or 250G illustrated in FIGS. 5A, 6A, and 21A, respectively). Optionally, the one or more dams 582 (see FIGS. 6A-6C) and/or one or more moats 586 (see FIGS. 6A-6C) may be formed in the manhole ring support and/or the one or more moats 590 (see FIGS. 6A-6C) may be formed in the surface 30 alongside the manhole cover 230F.

Air Moving Assembly

Referring to FIG. 4A, as mentioned above, the ventilation system 210 includes the air moving assembly 240. The air moving assembly 240 includes a ventilation conduit or pipe 400 and an air moving device or ventilator 410. Optionally, the air moving assembly 240 may include one of the optional manifolds 246A (see FIGS. 7, 9B, and 19), 246D (see FIGS. 8A, 8B, 8D, 8F, and 8H), and 460 (see FIGS. 11A-11C) and/or an optional float assembly 412 (see FIG. 12). As will be described in further detail below, the ventilator 410 may be implemented as an in-line heater 500 (see FIGS. 8A, 8B, 9A, and 13A-13C), an in-line blower or fan 550 (see FIGS. 14A-14C), or a ventilator assembly 1100 (see FIGS. 27 and 30-32). By way of additional non-limiting examples, the ventilator 410 may be implemented as a forced convection device, a powered bellows, a compressor, a piston pump, a piston ventilator, an in-line pump, a fan, a blower, a cartridge heater, a coil heater, or a heat-generating device configured to provide passive heating, such as a transformer, generator, compressor, and the like.

Ventilation Pipe

Referring to FIG. 3, the term "ventilation pipe" as used herein is given its broadest definition and includes any hollow structure that can convey a portion of the internal atmosphere 104 (e.g., the gaseous composition 106) and/or a portion of the external atmosphere 102 therethrough. This terminology thus includes such elements as a tube, channel, duct, conduit, or hose and can be a separate structure, or one that is, at least in part, incorporated into the design of the vault 12.

Referring to FIG. 4A, the ventilation pipe 400 may be positioned adjacent to the manhole cover 230A and optionally coupled thereto. Referring to FIG. 7, in some embodiments, the manifold 246A (or the manifold 246D depicted in FIGS. 8A, 8B, 8D, 8F, and 8H, or the manifold 460 depicted in FIGS. 11A-11C) is positioned between the manhole cover (e.g., the manhole cover 230C) and the ventilation pipe 400.

Referring to FIG. 5A, the ventilation pipe 400 has one or more walls 430 that define an interior through-channel 432. By way of a non-limiting example, referring to FIG. 20, the ventilation pipe 400 may have a generally circular cross-sectional shape with an inner diameter D1 (defined by the wall(s) 430) of about 1 inch to about 12 inches. For example, the inner diameter D1 may be about 3 inches to about 5 inches.

Referring to FIG. 4A, the ventilation pipe 400 has a first open end 440 opposite a second open end 442 with the ventilator 410 (when present) positioned therebetween. The ventilation pipe 400 may include (or be constructed from) multiple sections. For example, referring to FIG. 4A, the ventilation pipe 400 may include sections P1 and P2. In this implementation, the ventilator 410 is positioned between the sections P1 and P2. As shown in FIG. 8A, the section P1 may have a lower end 401 with a lower flange 402 configured to be coupled to the ventilator 410. Similarly, the section P2 may have an upper end 403 with an upper flange 404 configured to be coupled to the ventilator 410.

Referring to FIG. 4B, by way of another non-limiting example, the ventilation pipe 400 may include one or more joints J1-J4 (e.g., elbows), one or more substantially vertical sections V1-V4, and/or one or more substantially horizontal sections H1 and H2. In FIG. 4B, the ventilator 410 is positioned between the two vertical sections V3 and V4 of the ventilation pipe 400. In such embodiments, the vertical sections V3 and V4 may be substantially similar to the sections P1 and P2 illustrated in FIG. 4A. For example, referring to FIG. 9A, the vertical section V3 may include a lower flange 472 (substantially identical to the lower flange 402 illustrated in FIG. 8A) configured to be coupled to the ventilator 410 and the vertical section V4 may include the upper flange 474 (substantially identical to the upper flange 404 illustrated in FIG. 8A) configured to be coupled to the ventilator 410.

By way of additional non-limiting examples, the ventilation pipe 400 may include sections that are angled, tapered, curved, and the like. Further, different sections of the ventilation pipe 400 may have different cross-sectional sizes and/or shapes.

The ventilation pipe 400 may be implemented using a flexible hose (e.g., corrugated metal or plastic) of an appropriate diameter, with the second open end 442 thereof positioned as desired within the main chamber 52 of the vault 12. Referring to FIG. 4A, the ventilation pipe 400 may include a combination of rigid and flexible sections arranged in suitable configurations. For example, the ventilation pipe 400 may have a vertical rigid section (e.g., the section P1) fluidly connected to the manhole cover 230A at its bottom surface 234A (or, as described below, to one of the manifolds 246A, 246D, and 460, when present). The vertical rigid section (e.g., the section P1) may be coupled (e.g., by the ventilator 410) to a flexible section (e.g., the section P2) that extends to a desired location within the main chamber 52 of the vault 12. In such an embodiment, the vertical rigid section, the ventilator 410 (when present), and the flexible section provide a continuous fluid path.

Referring to FIG. 4A, the first open end 440 has at least one outlet or first opening 446 that is in fluid communication with the interior through-channel 432 (see FIG. 5A) of the ventilation pipe 400. As shown in FIGS. 5A and 5B, the first open end 440 of the ventilation pipe 400 is positioned proximal to the exhaust hole 253A of the manhole cover 230A (e.g., at its bottom surface 234A) such that there is fluid communication between the interior through-channel 432 of the ventilation pipe 400 and the exhaust hole 253A (via the first opening(s) 446). Although, the first open end 440 of the ventilation pipe 400 may be in contact with the bottom surface 234A, and sealably secured thereto to provide a fluid-tight connection, it is also contemplated that there may be a small gap between the first open end 440 of the ventilation pipe 400 and the bottom surface 234A, provided that most, and preferably essentially all, of the portion of the internal atmosphere 104 (e.g., the gaseous composition 106 illustrated in FIG. 3) being exhausted through the first opening(s) 446 of the ventilation pipe 400 is also caused to flow through the exhaust hole 253A.

Alternatively, the first open end 440 may be positioned proximal to the vent hole 252A of the manhole cover 230A (e.g., at its bottom surface 234A) such that there is fluid communication between the interior through-channel 432 of the ventilation pipe 400 and the vent hole 252A (via the first opening(s) 446). In such implementations, the first open end 440 of the ventilation pipe 400 may be in contact with the bottom surface 234A or spaced apart therefrom provided a substantial portion of the external atmosphere 102 (see FIG. 3) being drawn in through the vent hole 252A flows into the first opening(s) 446.

Referring to FIG. 4A, the second open end 442 of the ventilation pipe 400 is positioned in the main chamber 52 of the vault 12. The ventilation pipe 400 has at least one intake or second opening 448 in fluid communication with both the internal atmosphere 104 (see FIG. 3) and the interior through-channel 432 (see FIGS. 5A and 5B). In the embodiment illustrated, the second opening 448 is formed at or near the second open end 442. The second opening(s) 448 may simply include the opening of the interior through-channel 432 defined by the wall(s) 430 (see FIGS. 5A, 5B, 19, and 20) at the second open end 442 of the ventilation pipe 400.

Optionally, the second opening(s) 448 may include one or more holes (e.g., holes 449 depicted in FIG. 9A) formed in the wall(s) 430 (see FIGS. 5A, 5B, 19, and 20) of the ventilation pipe 400 and located proximal to the second open end 442. In embodiments in which at least some of the second opening(s) 448 are formed in the wall(s) 430, the second open end 442 of the ventilation pipe 400 may be completely or partially closed (or blocked). Those of the second opening(s) 448 formed in the wall(s) 430 may be generally circular. In such embodiments, the second opening(s) 448 may have a diameter that is less than a predetermined percentage (e.g., about 5% or about 10%) of the inner diameter D1 (see FIG. 20) of the ventilation pipe 400. Referring to FIG. 20, those of the second opening(s) 448 that extend laterally through one of the wall(s) 430 may be at least partially covered or blocked by a flap portion 447 (defined in one of the wall(s) 430).

Referring to FIG. 4A, the ventilation pipe 400 may be configured to position its second open end 442 and/or at least one second opening 448 at any desired vertical position or level within the vault 12. For example, the ventilation pipe 400 may also be configured to draw the gaseous composition 106 (see FIG. 3) from any desired point(s) (e.g., lower levels of the main chamber 52) within the vault 12 using suitable connectors (e.g., the joints J1-J4 depicted in FIG. 4B) and extensions (e.g., the sections P1 and P2, the horizontal sections H1-H2, and/or the vertical sections V1-V4). By way of non-limiting examples, right-angle elbows in combination with straight pipe sections may be used.

Multiple second openings 448 may be positioned at vertical levels just above the floor 58 (e.g., about ½ foot above the floor 58). As further described below, it has been found that when all of the second openings 448 of the ventilation pipe 400 are positioned more than 3 feet above the floor 58, the removal of heavier-than-air gases and vapors is significantly reduced. To avoid this limitation, at least one second opening 448 may be positioned about 3 feet or less above the floor 58 to draw heavier-than-air gases from the lower regions of the vault 12. For example, the ventilation pipe 400 may extend into the main chamber 52 such that at least one second opening 448 is positioned about 2 feet or less above the floor 58. By way of a non-limiting example, at least one second opening 448 may be positioned about a half foot above the floor 58.

In implementations that include only a single second opening, the second opening 448 may be positioned at a location between about one foot above the floor 58 and substantially at floor level. When the second opening 448 is substantially at floor level, a sufficient gap may be provided between the second opening 448 and the floor 58 to allow air to flow into and/or out of the second opening 448.

Furthermore, portions of the internal atmosphere 104 (see FIG. 3) may be simultaneously drawn from multiple vertical and/or horizontal sites within the main chamber 52 of the vault 12. For example, the second opening(s) 448 may include the plurality of holes 449 (see FIG. 9A) provided along at least a portion of the ventilation pipe 400 and the second open end 442 may be partially or entirely blocked.

The second openings 448 may also be positioned such that the ventilation system 210 functions when the water 80 (see FIG. 3) is in the main chamber 52 (e.g., the main chamber 52 is flooded). For example, multiple second openings 448 may be positioned along a portion (e.g., the section P2, the section V4, and the like) of the length of the ventilation pipe 400 so that if the main chamber 52 is partially flooded due to particularly heavy precipitation, the ventilation pipe 400 will draw the gaseous composition 106 (see FIG. 3) through those of the second openings 448 that are positioned above the water level and maintain effective exhaust of the undesired gaseous composition. Alternatively, the ventilation pipe 400 may deliver a portion of the external atmosphere 102 (see FIG. 3) into the main chamber 52 through those of the second openings 448 that are positioned above the water level to thereby maintain effective ventilation of the vault 12.

The second openings 448 may have different, graduated, or varying sizes (and/or shapes) and may be positioned along at least a portion of the length of the ventilation pipe 400 to optimize the exhaust of the gaseous composition 106 (see FIG. 3) and/or reduce (or minimize) air stagnation in the main chamber 52 of the vault 12. In such embodiments, and the second open end 442 may be partially or entirely blocked. The area of such second openings 448 may vary with height so that there is less open area near the upper first open end 440 than near the lower second open end 442 of the ventilation pipe 400. For example, FIG. 9A illustrates an implementation of the ventilation pipe 400 similar to that depicted in FIG. 4B, except, in FIG. 9A, the ventilation pipe 400 includes multiple second openings 448 that are graduated. As shown in FIG. 9A, those of the second openings 448 formed nearer the lower second open end 442 have greater open areas (e.g., larger diameters) than those of the second openings 448 formed nearer the upper first open end 440.

Of course, one of ordinary skill in the art will appreciate that the above exemplary values for placement of the second opening(s) 448 of the ventilation pipe 400 may vary according to one or more factors, e.g., vault dimensions, nature of gases likely to be encountered, environmental parameters, floor profile, vault shape, and equipment located within the vault. One of ordinary skill in the art can determine suitable (e.g., optimal) placement of the second opening(s) 448 for a given situation by applying ordinary skill in the art to the present teachings (e.g., by following the guidelines described in the Experimental section, below).

Although, in FIGS. 4A and 4B, the ventilation pipe 400 is shown without support within the vault 12, the ventilation pipe 400 may be held in place by a bracket, mechanical arm, chain, cable, or other suitable support means, particularly when the ventilation pipe 400 is not mechanically attached to the manhole cover 230A. The ventilation pipe 400 may be held in place near the bottom surface 234A (see FIGS. 5A and 5B) of the manhole cover 230A to provide sufficient clearing of the gaseous composition 106 (see FIG. 3) composition within the vault 12. Alternatively, these components may be mechanically coupled together such that they may be lifted from the vault 12 together as a unit. This unit can be suspended from a tripod or like portable structure outside the vault 12 until the needed work is completed. If the ventilation pipe 400 is flexible or has a flexible section (e.g., the section P2), such flexible portions may be collapsed to a relatively short length (e.g., using a line attached to a hook) and lifted out of the vault 12 along with the manhole cover 230A.

Referring to FIG. 4B, to keep the ventilation pipe 400 out of the way of workers (e.g., the worker 61 depicted in FIGS. 1 and 3) entering the vault 12, the ventilation pipe 400 may hug (and be fastened to) at least one of the sidewall(s) 54, the ceiling 56, and at least one of the wall(s) 64 of the neck 60. Referring to FIG. 5B, an L-shaped section (or a Z-shaped section if desired) of the ventilation pipe 400 (e.g., a subassembly of the joints J1 and J2 and the horizontal section H1) may be disconnected from the manhole cover 230A by reaching in from the surface 30 through the central exhaust hole 253A (or the access hole 236 included in some embodiments and depicted in FIGS. 7, 8B, 8E, 8F, and 8H) and removing the fastener(s) F1 (see FIG. 5B). Then, this disconnected section may be swung out of the way, or lifted out of the vault 12 completely, to allow access to the main chamber 52 (e.g., via a ladder, not shown).

The ventilation pipe 400 may be fabricated from a rigid plastic or metal and may be assembled from pipe segments constructed from such materials. FIGS. 9A and 9B depict an exemplary implementation of the ventilation pipe 400 that includes the joints J1-J4, the vertical sections V1-V4, and the horizontal sections H1-H2. In this embodiment, the joints J1-J4, the vertical sections V1-V4, and the horizontal sections H1-H2 may each be constructed from fiberglass pipe or polyvinyl chloride ("PVC") plastic pipe (e.g., 4 inch schedule 40 PVC pipe). One or more of the joints J1-J4 may be implemented as a 90° PVC elbow.

Referring to FIG. 9B, in this implementation, the joints J1 and J2 and the horizontal section H1 define a Z-shaped duct 470. Referring to FIG. 9A, the Z-shaped duct 470 and/or the vertical section V1 is/are attached to one of the sidewall(s) 54 of the main chamber 52 or one of the wall(s) 64 of the neck 60 (e.g., by brackets, not shown). The lower vertical section V4 is mounted near floor level on a support block 462. The support block 462 may partially or completely block or close the second open end 442 of the ventilation pipe 400. As mentioned above, the second openings 448 may include the holes 449 that are drilled or otherwise formed in the wall(s) 430 of the ventilation pipe 400 near its lower second open end 442. In the embodiment illustrated in FIG. 9A, the second openings 448 implemented by the holes 449 have varying diameters that progressively decrease in size as the height above the support block 462 increases, to provide intake paths for the internal atmosphere 104 (see FIG. 3) and/or exit paths for the external atmosphere 102 (see FIG. 3). As discussed above, with such an arrangement, exhaust of gas is still possible even if the main chamber 52 of the vault 12 is partially flooded provided some of the second openings 448 remain above the high water mark.

The ventilator 410 is mounted vertically along one of the sidewall(s) 54 of the main chamber 52 as near to the manhole 62 as possible and within two feet of the ceiling 56 using commercially available pipe mounting brackets (not shown). An upper end 471 of the lower vertical section V4 has an upper flange 474 (substantially identical to the upper flange 404 illustrated in FIG. 8B) that is connected to a lower flange 532 of the in-line heater 500 or, alternatively, to a lower flange 554 of the in-line fan 550 illustrated in FIGS. 14A-14C. Referring to FIG. 9A, a first ceramic fiber mat gasket (not shown) may be placed between these flanges whereat the ventilator 410 (e.g., the heater 500 illustrated in FIGS. 8A, 8B, 9A, and 13A-13C or the in-line fan 550 illustrated in FIGS. 14A-14C) is connected to the vertical section V4.

The horizontal section H2 is suspended from the ceiling 56 by pipe hangers (not shown) which allow some movement to accommodate thermal expansion. The joint J4 is positioned at a first end 476 of the horizontal section H2 and connects the horizontal section H2 to the vertical section V3. A lower end 478 of the vertical section V3 has a lower flange (substantially identical to the lower flange 402 illustrated in FIG. 8B) that is connected to an upper flange 531 of the inline heater 500 or, alternatively, to an upper flange 552 of the in-line fan 550 illustrated in FIGS. 14A-14C. Referring to FIG. 9A, a second ceramic fiber mat gasket (not shown) may be placed between these flanges whereat the ventilator 410 (e.g., the heater 500 illustrated in FIGS. 8A, 8B, 9A, and 13A-13C or the in-line fan 550 illustrated in FIGS. 14A-14C) is connected to the vertical section V3. In embodiments in which the ventilator 410 has been implemented as the heater 500 (see FIGS. 8A, 8B, 9A, and 13A-13C), the first and second gaskets thermally isolate the in-line heater 500 from direct contact with the horizontal and vertical sections H2, V3, and V4, which could be damaged by the high temperature. The in-line heater 500 is also wrapped with insulation (not shown) to insulate it from the internal atmosphere 104 (see FIG. 3) inside the vault 12 and concentrate heat in the center of the heater 500, where it will promote upward gas flow within the ventilation pipe 400.

The joint J3 is positioned at a second end 477 of the horizontal section H2. The cross-sectional profile of the joint J3 transitions from circular, where it is connected to the second end 477 of the horizontal section H2, to rectangular, where it is connected to the short vertical section V2, which has a rectangular (flattened) cross-sectional shape. Referring to FIG. 9B, the short vertical section V2 hugs and may be attached to one of the wall(s) 64 of the neck 60, thereby minimally obstructing this narrow passageway. The top of the short vertical section V2 is releasably inserted into a first end 480 of the Z-shaped duct 470. The first end 480 has a rectangular cross-sectional shape that has slightly larger rectangular dimensions to accommodate the top of the short vertical section V2 in a male/female engagement (e.g., a taper joint).

A second end 482 of the Z-shaped duct 470 is positioned substantially at the center of the neck 60, in alignment with the center of the manhole cover 230E, and transitions from a (horizontal) rectangular cross-sectional shape to a (vertical) conical opening which can mate with (e.g., receive) a tapered lower end 486 of the coupling vertical section V1, again in a male/female engagement (taper joint).

The coupling vertical section V1 releasably connects the manifold 246A (coupled to the bottom surface 234E of the manhole cover 230E) with the Z-shaped duct 470 to place the exhaust holes 253E in the manhole cover 230E in fluid communication with the aforementioned series of components (i.e., the manifold 246A, the Z-shaped duct 470, the vertical section V2, the horizontal section H2, the vertical section V3, the ventilator 410, the joint J3, the joint J4, and the vertical section V4).

Referring to FIG. 9B, an upper flanged end 488 of the coupling vertical section V1 extends into the manifold 246A through the port 330A. The upper flanged end 488 has a flange 489 that prevents the vertical section V1 from falling through the port 330A of the manifold 246A. The coupling vertical section V1 may be fitted with a cross-piece handle (not shown) at or near its upper flanged end 488 to facilitate lifting the vertical section V1 out of the port 330A.

Figure 18:
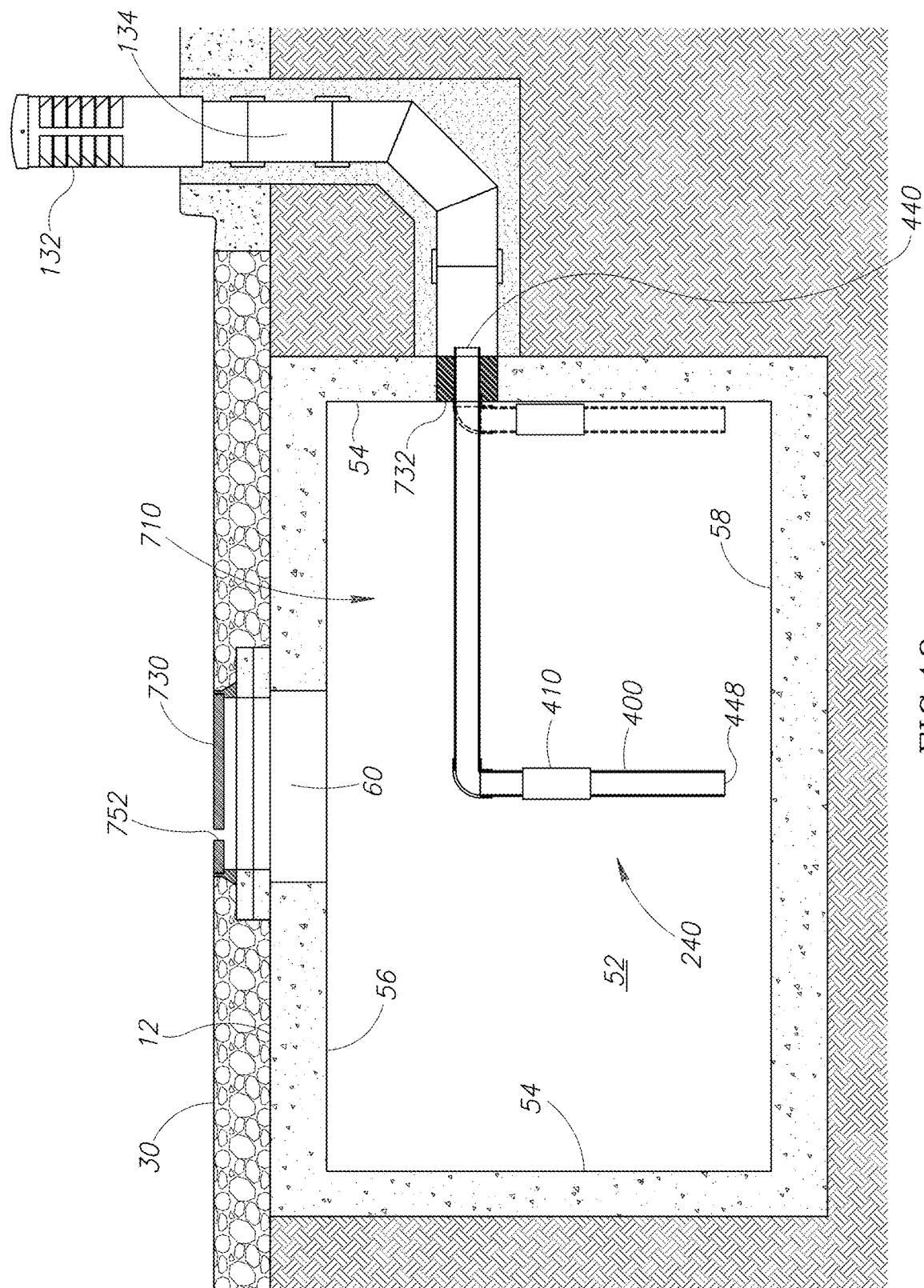
FIG. 18 is a cross-sectional view of an exemplary implementation of a second embodiment of the ventilation system for use with a manhole vault connected to an external atmosphere by a vent stack.

By way of yet another exemplary implementation, referring to FIG. 4B, when a completely new manhole vault is being installed, the ventilation pipe 400 may optionally be integrated directly into one or more of the sidewall(s) 54 of the vault 12 and appropriately plumbed to the manhole cover 230A (or one of the manhole covers 230B-230G shown in FIGS. 6A, 7, 8A, 9B, 10A, and 22A, respectively) or the vent stack 132 (see FIGS. 3 and 18).

Optional Manifold

Referring to FIG. 7, when, as in the manhole cover 230C, there are multiple exhaust holes (e.g., the exhaust holes 253C), the optional manifold 246A (or the manifold 246D depicted in FIGS. 8A, 8B, 8D, 8F, and 8H or the manifold 460 depicted in FIGS. 11A-11C) may be used to channel flow from the first opening 446 of the ventilation pipe 400 into the multiple exhaust holes. Alternatively, referring to FIG. 3, when there are multiple vent holes 152, one of the optional manifolds 246A, 246D, or 460 may be used to channel flow from the multiple vent holes into the first opening 446 of the ventilation pipe 400.

Each of the manhole covers 230C-230E (see FIGS. 7, 8A, and 9B, respectively) includes multiple exhaust holes. As mentioned above, the manhole covers 230C and 230E are each configured for use with the manifold 246A, and the manhole cover 230D is configured for use with the manifold 246D. While the manhole cover 230F includes multiple exhaust holes (the openings 295 illustrated in FIGS. 10B and 10E), as explained above, a manifold like the manifold 246A is not necessary to channel the flow from the first opening 446 of the ventilation pipe 400 into the exhaust hole 253F and out the openings 295.

Referring to FIG. 7, the manifold 246A is positionable between the upper first open end 440 of the ventilation pipe 400 and the manhole cover 230C (or the manhole cover 230E illustrated in FIGS. 9A and 9B). The manifold 246A has a base portion 452 and one or more peripheral sidewalls 454 that extend upwardly from the base portion 452. The base portion 452 and the peripheral sidewall(s) 454 define an upwardly opening internal cavity 456. The manifold 246A may be positioned proximate to the bottom surface 234C of the manhole cover 230C (or the bottom surface 234E of the manhole cover 230E). For example, upper edge(s) 458 of the peripheral sidewall(s) 454 may be positioned against the bottom surface 234C of the manhole cover 230C (or the bottom surface 234E of the manhole cover 230E) and optionally sealed thereagainst.

The manifold 246A includes the port 330A, which is formed in the base portion 452. The port 330A is configured to receive the flow from the first opening 446 of the ventilation pipe 400 into the internal cavity 456. The manifold 246A is configured to provide fluid communication (through the internal cavity 456) between the port 330A and all of the exhaust holes 253C (or the exhaust holes 253E illustrated in FIG. 9B). Alternatively, the port 330A may be configured to receive airflow from the internal cavity 456. In such implementations, the manifold 246A is configured to provide fluid communication (through the internal cavity 456) between the port 330A and the vent holes 252C.

Although, in FIG. 9A, the ventilation pipe 400 is shown without support within the vault 12, as mentioned above, the ventilation pipe 400 may be held in place by a bracket, mechanical arm, chain, cable, or other suitable support means, particularly when the ventilation pipe 400 is not mechanically attached to the manifold 246A. On the other hand, referring to FIG. 9B, the port 330A may be coupled to the ventilation pipe 400, either directly or with the aid of the coupling flange 332. The coupling flange 332 may be a separate component or formed in the bottom of the manifold 246A. The manifold 246A may be sealably attached to the bottom surface 234C of the manhole cover 230C, or at least in contact with it, directly or via a gasket (not shown). Similarly, the manifold 246A may be sealably attached to the bottom surface 234E of the manhole cover 230E, or at least in contact with it, directly or via a gasket (not shown).

When the manhole cover 230C (or the manhole cover 230E), the manifold 246A, and the ventilation pipe 400 are coupled together, the worker 61 (see FIGS. 1 and 3) may lift this triad from the manhole 62 (see FIG. 1) as one unit before servicing/entering the vault 12. This unit can be suspended from a tripod or like portable structure (not shown) outside the vault 12 until the needed work is completed. If the ventilation pipe 400 is flexible or collapsible, it can be collapsed to a relatively short length (e.g., using a line attached to a hook) and lifted out of the vault 12 along with the manifold 246A and the manhole cover 230C (or the manhole cover 230E).

Alternatively, this triad of components may be releasably coupled together to allow removal of only the manhole cover 230C (or the manhole cover 230E), or the combination of the manifold 246A and the attached manhole cover 230C (or the manhole cover 230E), while leaving the ventilation pipe 400 in the vault 12. An example of such an arrangement is shown in FIG. 7. FIG. 7 illustrates an embodiment in which the coupling flange 332 is fastened (e.g., bolted) or otherwise attached to (e.g., formed in the bottom of) the manifold 246A, which is in turn attached (e.g., by welding or brazing) to the manhole cover 230C. At least one fastener F1 (e.g., a flange pin) may be inserted into and through aligned holes 450 formed in one of the wall(s) 430 of the ventilation pipe 400 and the coupling flange 332 to hold the ventilation pipe 400 in place. While FIG. 7 illustrates only the single fastener F1, more than one fastener (or screw) may be so employed. For example, three or four fasteners may be used.

Before the worker 61 (see FIGS. 1 and 3) enters the vault 12 (see FIGS. 1, 3-4B, 9A, 18, 19, 21A, 21B, 26A, and 32), the worker 61 removes the access cover 238 (e.g., by removing the fasteners F2) to expose the access hole 236. Then, the worker 61 removes the fastener(s) F1 to release the ventilation pipe 400 from the manifold 246A. This allows the worker 61 to lift the manhole cover 230C, along with manifold 246A and the coupling flange 332 out of the manhole 62 (see FIG. 1) while the ventilation pipe 400 remains in place within the vault 12. The ventilation pipe 400 may be suspended or held by a bracket, chain, or cable attached to at least one of the sidewall(s) 54 or the ceiling 56 (see FIGS. 1, 4A, 4B, 9A, 18, and 19) of the vault 12. Such a suspension means may be capable of being moved (e.g., swung) out of the way or removed by reaching in from the surface 30 (see FIGS. 1, 3-6C, 9A, 9B, 18, 19, 21A, 26A, and 32) to facilitate entry to the vault 12.

Other coupling means known in the art for releasably connecting the ventilation pipe 400 to the subassembly formed by the manifold 246A and the manhole cover 230C (or the manhole cover 230E) may be substituted for the coupling flange 332 and the fastener(s) F1. For example, these coupling connections can be accomplished using bolted flanges, clamped flanges, hanging a (bolted) flange from a ledge in or on the manhole cover 230C (or the manhole cover 230E), magnetic coupling, hangers and hooks mating with holes or tabs in the ventilation pipe 400, spring-loaded clips, a rotating lock mechanism similar to a window sash lock, a swinging lock mechanism similar to a suitcase lock, or rotating tabs below the cover with a key inserted from the top of the cover (a pivot latch or pivot lock). Additional examples of suitable coupling means include a threaded connection that can swivel on an end of the ventilation pipe 400 or on the manhole cover 230C (or the manhole cover 230E) and has an internal securing means which can be manipulated by hand or a tool, a "bayonet" mount using a quarter or half turn locking connection by way of an internal handle, a snap-on/snap-off connection incorporating protrusions and detents (e.g., a quick disconnect), and "zip" ties, cord or cable which attach features on the ventilation pipe 400 to those on the manhole cover 230C (or the manhole cover 230E), among others. Of course, any such means may be configured to provide a relatively straightforward release and re-connection of the manhole cover 230C (or the manhole cover 230E) and the ventilation pipe 400 from the surface 30 by the worker 61 (see FIGS. 1 and 3) who remains outside of the vault 12 and reaches at most a hand and/or a specialized tool into the vault 12 (via the neck 60).

The manifold 246A may be stamped or molded from a metal or plastic and attached to the manhole cover 230C (or the manhole cover 230E) by, e.g., welding, brazing, bolting, strapping, or riveting, as appropriate. Likewise, the coupling flange 332, typically formed from steel, cast iron, or plastic may be attached to the bottom surface of the manifold 246A, concentric with the port 330A thereof.

First Alternate Embodiment of Optional Manifold

Referring to FIGS. 8A, 8B, 8D, 8F, and 8H, as mentioned above, the manhole cover 230D is configured for use with the manifold 246D, which includes the radially overlapping vent and exhaust holes 252D and 253D (see FIG. 8E).

Referring to FIG. 8B, the manifold 246D is positionable between the manhole cover 230D and the upper first open end 440 of the ventilation pipe 400. The manifold 246D has a base portion 464 and a continuous peripheral sidewall 466 that extends upwardly from the base portion 464. The base portion 464 and the peripheral sidewall 466 define an upwardly opening internal cavity 468. Referring to FIG. 8F, the peripheral sidewall 466 is configured to extend around each of the exhaust holes 253D such that each of the exhaust holes 253D is in fluid communication with the internal cavity 468 when the manifold 246D is adjacent the bottom surface 234D of the manhole cover 230D. For example, when an upper edge 467 of the peripheral sidewall 466 is positioned against the bottom surface 234D of the manhole cover 230D and optionally sealed thereagainst. Thus, in the embodiment shown in FIG. 8B, the manifold 246D has a radially outwardly extending portion 465 (see FIG. 8D) for each of the exhaust holes 253D (see FIGS. 8E-8G) that extends between at least two adjacent vent holes 252D (see FIGS. 8D, 8E, 8H, and 8I). As shown in FIG. 8H, the radially outwardly extending portions 465 (see FIG. 8D) are positioned such that the vent holes 252D are not in fluid communication with the internal cavity 468 when the manifold 246D is adjacent the bottom surface 234D of the manhole cover 230D.

Figure 19:
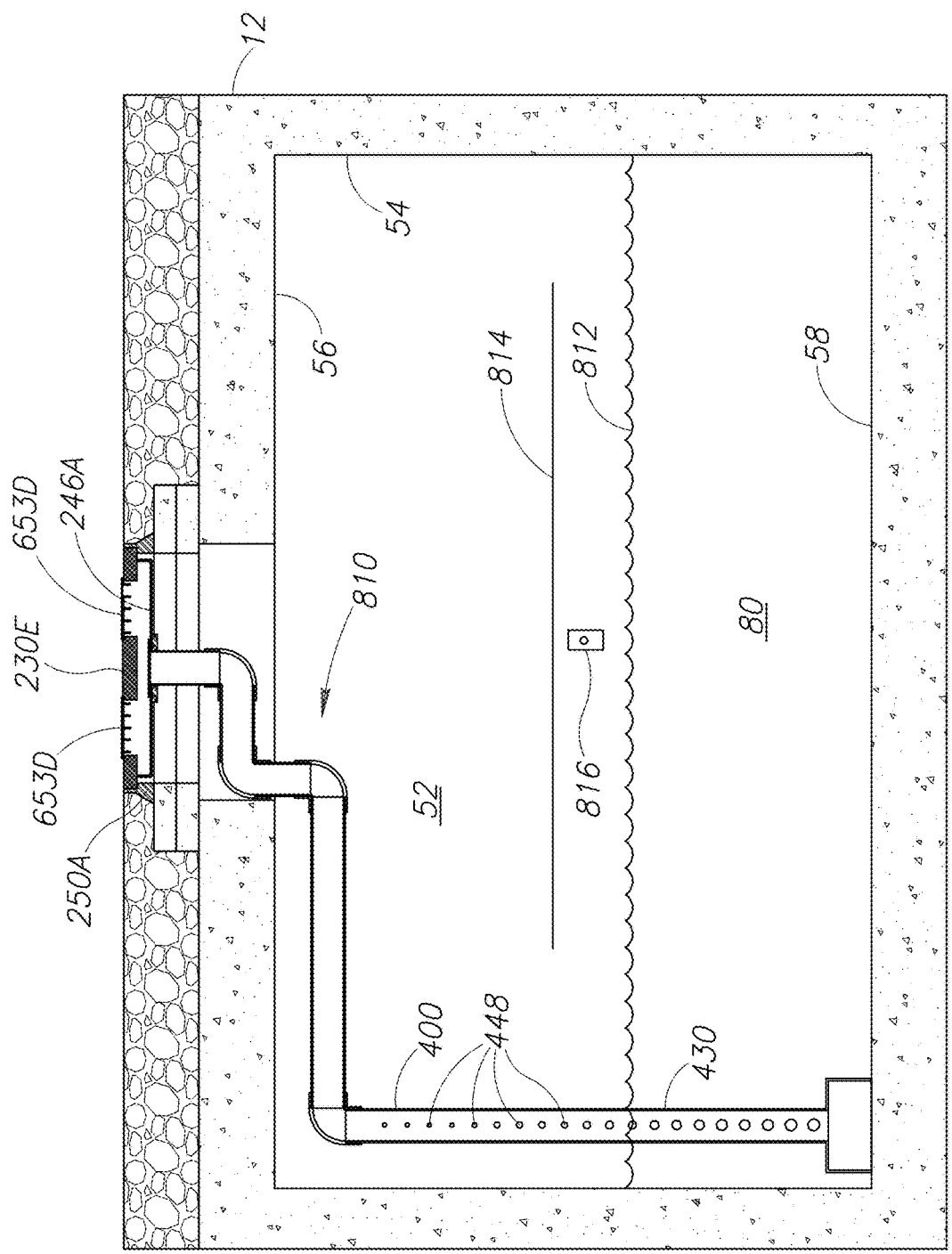
FIG. 19 is a cross-sectional view of an exemplary implementation of a third embodiment of the ventilation system.
Figure 20:
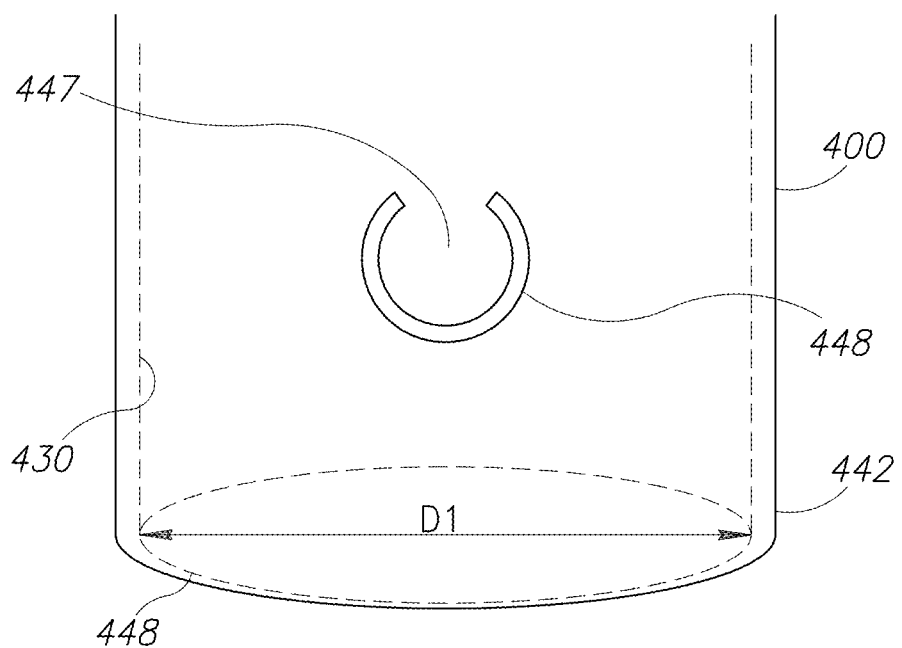
FIG. 20 is a side perspective view of an exemplary implementation of an open second end of the ventilation pipe of the ventilation system.

Referring to FIG. 8B, the manifold 246D includes a port 330D formed in the base portion 464 that is substantially similar to the port 330A (see FIGS. 7 and 9B) of the manifold 246A (see FIGS. 7, 9B, and 19). The port 330D is configured to receive the flow from the first opening 446 of the ventilation pipe 400 into the internal cavity 468. The manifold 246D is configured to provide fluid communication (through the internal cavity 468) between the port 330D and all of the exhaust holes 253D (see FIGS. 8E-8G).

Second Alternate Embodiment of Optional Manifold

Figure 11A:
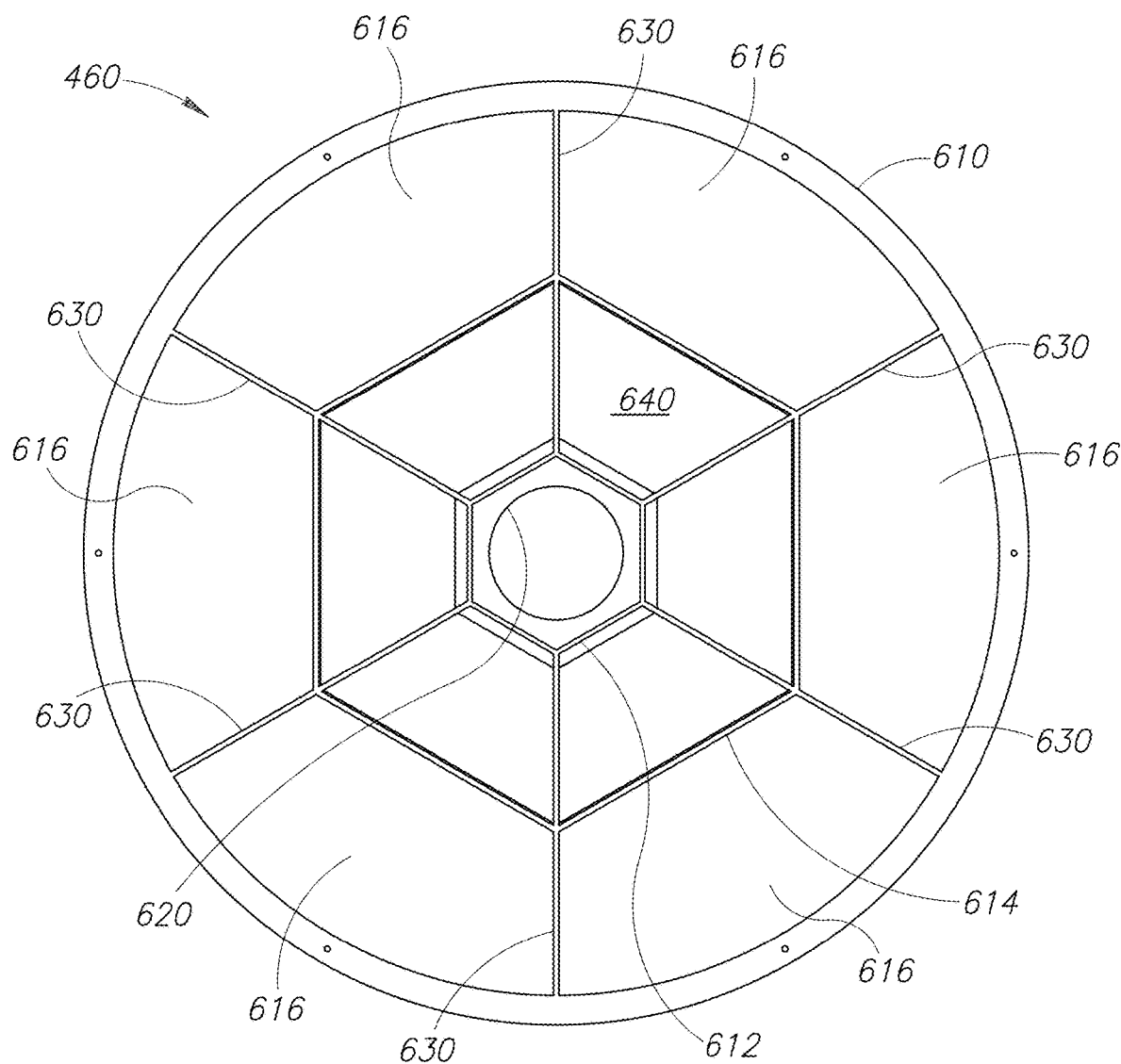
FIG. 11A is a top view of an alternate exemplary implementation of a manifold for use in the ventilation system.
Figure 11B:
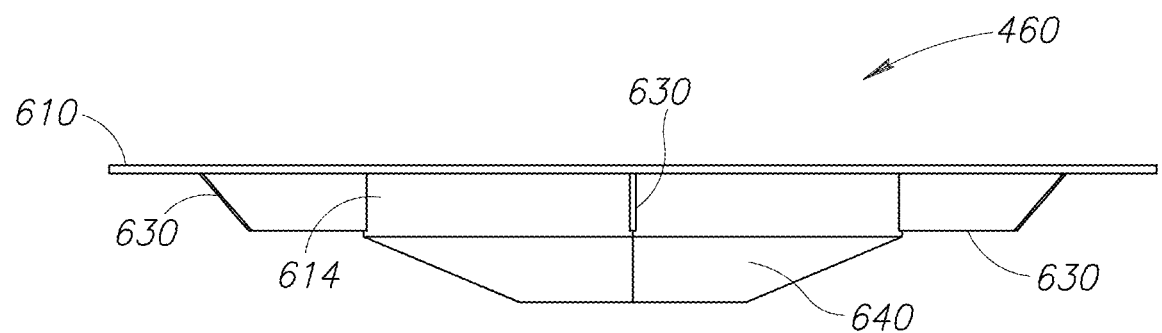
FIG. 11B is a side view of the manifold of FIG. 11A.
Figure 11C:
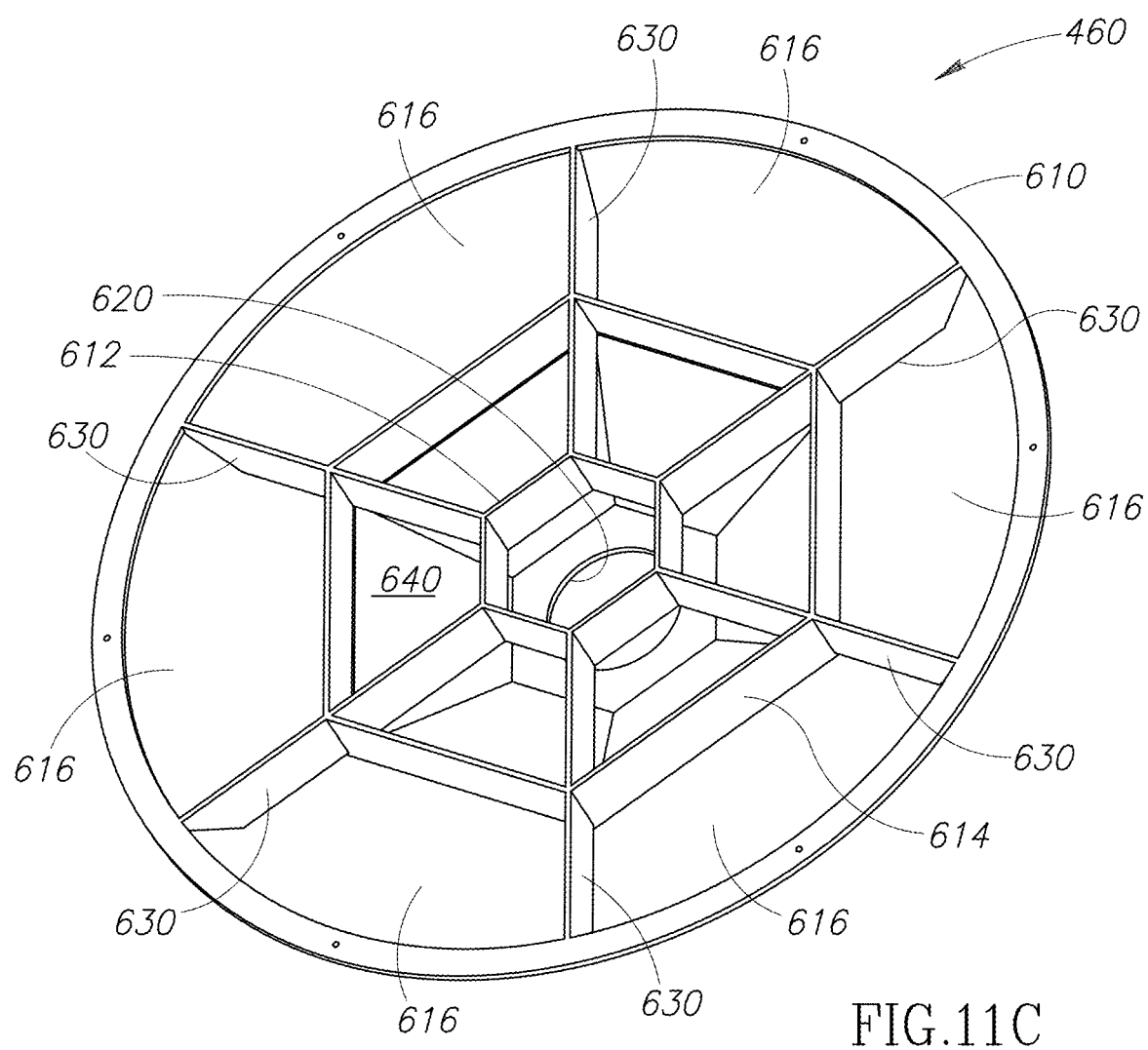
FIG. 11C is an isometric view of the manifold of FIG. 11A.

Referring to FIGS. 11A-11C, the air moving assembly 240 may include a second alternate embodiment of a manifold 460 instead and in place of either the manifold 246A (see FIGS. 7, 9B, and 19) or the manifold 246D (see FIGS. 8A, 8B, 8D, 8F, and 8H). The manifold 460 may be characterized as having a skeletonized structure. By way of non-limiting examples, the manifold 460 may be fabricated from aluminum or steel.

Referring to FIG. 11A, the manifold 460 has a circular rim 610 and radial support ribs 630. The circular rim 610 is configured to rest on the ledge 254A (see FIGS. 5A, 5B, and 9B) of the ring support 250A (see FIGS. 5A, 5B, 9B, and 19). The circular rim 610 is configured to be sandwiched between the ledge 254A and the manhole cover 230C (see FIG. 7) or the manhole cover 230E (see FIGS. 9A and 9B).

The ribs 630 are attached to and extend radially inwardly from the rim 610. The ribs 630 define two central, concentric, hexagonal structures 612 and 614. The structure 612 is positioned inside the structure 614. Openings 616 are defined between adjacent ribs 630, the structure 614, and the circular rim 610. The structure 614 is positioned along and coupled to an upper edge of a central hexagonal-shaped pan 640. By way of a non-limiting example, the central hexagonal pan 640 may be about 4 inches deep. The pan 640 has a central port 620 that is substantially similar to the port 330A (see FIGS. 7 and 9B) of the manifold 246A (see FIGS. 7, 9B, and 19). The port 620 may be positioned below and aligned with the center of the structure 612. The port 620 may be aligned with and optionally coupled to the first open end 440 (see FIGS. 4A-5B, 7, 8B, and 18) of the ventilation pipe 400 (see FIGS. 4A-5B, 7, 8A-9A, 12, 18, 19, 21A, and 21B, 26A, 31, and 32).

For example, referring to FIG. 9B, when the manifold 460 (see FIGS. 11A-11C) is used with the manhole cover 230E (instead of and in place of the manifold 264A) and the implementation of the ventilation pipe 400 illustrated in FIG. 9B, the port 620 may receive and optionally be coupled to the second end 482 (conical opening) of Z-shaped duct 470 and/or the upper flanged end 488 of the coupling vertical section V1. The ribs 630 of the manifold 460 mate with the underside of the manhole cover 230E to provide at least a partial seal between the manhole cover 230E and the hexagonal pan 640 such that the exhaust holes 253E are in fluid communication with the interior of the hexagonal pan 640. Of course, only the exhaust holes 253E should be disposed within the perimeter of the pan 640 and when present, vent holes (e.g., the vent holes 252C illustrated in FIG. 7) should be disposed outside this perimeter. In other words, the exhaust holes 253E and any vent holes formed in the manhole cover 230E are positioned so they do not overlap radially (e.g., all of the exhaust holes 253E are positioned closer to the center of the manhole cover 230E than the vent holes). Thus, the manifold 460 may be used with the manhole cover 230C because the exhaust holes 253C are positioned nearer the center of the manhole cover 230C than the vent holes 252C. This arrangement also positions the vent holes 252C to be in fluid communication with the openings 616 so that air may flow therethrough.

The manifold 460 (see FIGS. 11A-11C) is configured to provide easy access to the vault 12. First, the worker 61 (see FIGS. 1 and 3) may remove the manhole cover 230E, which rests on the manifold 460, by engaging a tool (such as a pick, not shown) into a closed end well (e.g., a closed end well 928 illustrated in FIG. 22A) on the manhole cover 230E, lifting the manhole cover 230E off the ring support 250A, and dragging the manhole cover 230E out of the way and onto the adjacent surface 30. Second, the worker 61 (see FIGS. 1 and 3) lifts the coupling vertical section V1 out of the port 620 in the manifold 460 (e.g., using the cross-piece handle, not shown). Third, the worker 61 (see FIGS. 1 and 3) lifts the manifold 460, which rests on the ledge 254A of the ring support 250A, out of the vault 12 by grasping one or more of the ribs 630 (e.g., with hooks and cables) and places the manifold 460 on the surface 30. Fourth, the worker 61 (see FIGS. 1 and 3) lifts the Z-shaped duct 470 out of the vault 12 and places the Z-shaped duct 470 on the surface 30. At this point, the vault 12 can be entered provided all confined space procedures have been satisfied.

After any required maintenance is completed, the vault 12 is again secured in reverse order, as follows. First, the worker 61 (see FIGS. 1 and 3) slips the (rectangular) first end 641 of the Z-shaped duct 470 into the top of vertical section V2. Second, the worker 61 (see FIGS. 1 and 3) lowers the manifold 460 onto the ring support 250A while ensuring that the center of the port 620 is in alignment with the second (conical) end 642 of the Z-shaped duct 470. Third, the worker 61 (see FIGS. 1 and 3) inserts the coupling vertical section V1 into the port 620 such that the tapered end 632 of the coupling vertical section V1 mates with the second (conical) end 642 of the Z-shaped duct 470. In a final step, the worker 61 (see FIGS. 1 and 3) places the manhole cover 230E on the manifold 460. It will be appreciated that all of the above operations can be accomplished from street level (e.g., from the surface 30). It should further be appreciated that the manifold 460 may be configured to mate with existing vented manhole covers (e.g., the vented manhole cover 70 illustrated in FIG. 2) to create zones of exhaust holes and vent holes with no, or only minimal, modification of the existing manhole cover.

Optional Float Assembly

As mentioned above, the water 80 (see FIG. 3) may at least partially fill the main chamber 52 and block one or more of the second opening(s) 448. One method of avoiding this problem is to position the second openings 448 at multiple locations along the ventilation pipe 400. In this manner, the likelihood that all of the second openings 448 will be blocked (e.g., submerged in the water 80) is significantly reduced.

Figure 12:
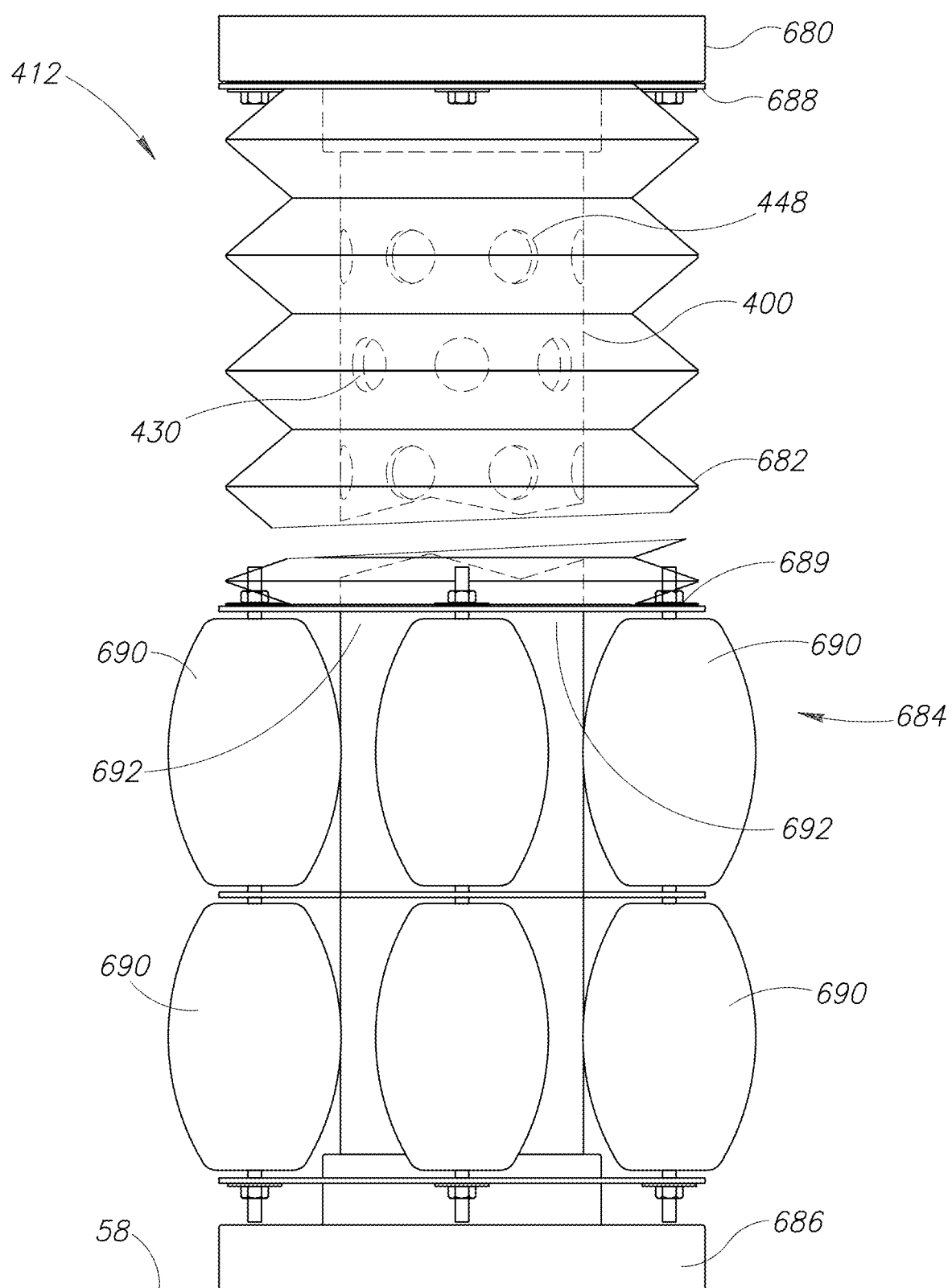
FIG. 12 is side view of a float assembly including a bellows attached to a float subassembly.

Referring to FIG. 12, the float assembly 412 may be used to maintain ventilation (e.g., exhaust) during a flooding event. The assembly 412 includes a flange 680, a flexible cylindrical bellows 682, a float subassembly 684, and a support block 686. The support block 686 may be substantially similar to the support block 462 depicted in FIG. 9A and fixed mounted to the floor 58. Referring to FIG. 12, the flange 680 may be fixedly mounted to the ventilation pipe 400, the ventilator 410 (see FIGS. 4A, 4B, 8A, 8B, 18, 21A, 21B, and 26), and/or the ceiling 56 (see FIGS. 1, 4A, 4B, 9A, 18, and 19). The ventilation pipe 400 extends between the flange 680 and the support block 686. As shown in FIG. 12, the ventilation pipe 400 passes through the bellows 682. The second open end 442 of the ventilation pipe 400 rests on the support block 686 and is partially covered with the bellows 682. The bellows 682 may be characterized as being a longitudinally compressible sleeve that surrounds a portion of the ventilation pipe 400 near the second open end 442. One or more second openings 448 (formed in the wall(s) 430) of the ventilation pipe 400 are positioned within the bellows 682. The bellows 682 extends between the flange 680 and the float subassembly 684. The bellows 682 has an upper end 688 that is attached to the flange 680 and a lower end 689 attached to the float subassembly 684.

The internal atmosphere 104 (see FIG. 3) may flow into the bellows 682 through its lower end 689 but is prevented from entering the upper end 688 of the bellows 682. Thus, the bellows 682 restricts access to the second opening(s) 448 inside the bellows. Specifically, only portions of the internal atmosphere 104 (see FIG. 3) entering the bellows 682 through its lower end 689 may reach the second opening(s) 448 within the bellows 682.

The float subassembly 684 includes a plurality of individual spaced apart floats 690 arranged circumferentially around the ventilation pipe 400. Interstitial spaces or openings 692 are defined between adjacent ones of the floats 690. As the level of the water 80 in the vault 12 rises, the float subassembly 684 rises correspondingly and compresses the bellows 682. In this embodiment, the second open end 442 of the ventilation pipe 400 remains stationary as the float subassembly 684 rises along the ventilation pipe 400. A portion of the internal atmosphere 104 (e.g., the gaseous composition 106 illustrated in FIG. 3) may be removed from the vault 12 by the second opening(s) 448 positioned within the bellows 682. Portions of the internal atmosphere 104 may flow between the spaced apart floats 690 (through the openings 692), and upwardly between the bellows 682 and the ventilation pipe 400. Then, those portions of the internal atmosphere 104 may enter the ventilation pipe 400 via the second openings 448 positioned inside the bellows 682. Variations of the above arrangement in which the bellows 682 includes openings (not shown), formed either in the upper portion of the bellows 682 itself or in the structure which connects the upper end 688 of the bellows 682 to the ventilation pipe 400, are also possible. In either case, the bellows 682 expands and contracts in length according to the prevailing water level, and the portion of the internal atmosphere 104 (see FIG. 3) entering the bellows 682 is drawn through the ventilation pipe 400 by the ventilator 410 (see FIGS. 4A, 4B, 8A, 8B, 18, 21A, 21B, and 26) which may be in-line with the ventilation pipe 400.

The float assembly 412 allows only air that flows between the floats 690 (through the openings 692) to enter the bellows 682 and the second openings 448 positioned inside the bellows 682. Thus, the level of the openings 692 is an effective intake level that is determined by the level of the water 80. In this manner, the float assembly 412 may be used to automatically adjust the height of the effective intake level so as to maintain it above the level of the water 80. Further, the openings 692 may be positioned such that they are at a predetermined distance above the water 80. This arrangement helps ensure the internal atmosphere 104 (see FIG. 3) enters the ventilation pipe 400 at or near the surface level of the water 80 (see FIGS. 3 and 19), when the water is present. On the other hand, the portion of the internal atmosphere 104 (see FIG. 3) enters the ventilation pipe 400 at or near the floor 58, when the water 80 is not present inside the vault 12.

By way of a non-limiting example, the float assembly 412 could be installed on the vertical section V4 shown in FIGS. 4B and 9A, or the section P2 shown in FIGS. 4A, 8A, and 21A.

Ventilator

Referring to FIGS. 4A and 4B, the ventilator 410 may cause a portion of the internal atmosphere 104 (e.g., the gaseous composition 106 illustrated in FIG. 3) within the main chamber 52 of the vault 12 to flow in a generally upward direction through the ventilation pipe 400 and eventually exit to the external atmosphere 102 through the exhaust hole 253A in the manhole cover 230A. Alternatively or additionally, the ventilator 410 may cause a portion of the external atmosphere 102 (see FIG. 3) to flow in a generally downward direction into the main chamber 52 of the vault 12 through the ventilation pipe 400. Thus, the ventilator 410 is a fluid conveying means for transferring at least a portion of the internal atmosphere 104 out of the vault 12 and/or transferring at least a portion of the external atmosphere 102 into the vault 12. As discussed below, it has been found that heavier-than-air gases or vapors are not effectively exhausted from the vault 12 without the benefit of such a ventilator when there is no prevailing wind sweeping over the top surface 232A (see FIGS. 5A and 5B) of the manhole cover 230A.

As mentioned above, the ventilator 410 may be implemented as the in-line heater 500 (see FIGS. 8A, 8B, 9A, and 13A-13C), the in-line blower or fan 550 (see FIGS. 14A-14C), or the ventilator assembly 1100 (see FIGS. 27 and 30-32). By way of additional non-limiting examples, the ventilator 410 may be implemented as a forced convection device, a powered bellows, a compressor, a piston pump, a piston ventilator, an in-line pump, a fan, a blower, or a heat-generating device configured to provide passive heating, such as a transformer, generator, compressor, and the like. It is also contemplated that a redundant system employing more than one type of air moving device (e.g., both the in-line fan 550 and the in-line heater 500) may be advantageous in particularly critical applications. Further, more than one air moving device of the same type may be used.

The ventilator 410 shown in FIGS. 4A and 4B may be implemented as an in-line heater (e.g., the in-line heater 500 depicted in FIGS. 8A, 8B, 9A, and 13A-13C) configured to heat the entire ventilation pipe 400, or a portion thereof, to induce a "chimney effect" (or stack effect) in the ventilation pipe 400 that reduces the density of the gas therein and causes it to rise. For example, the entire ventilation pipe 400, or a portion thereof, may be wrapped circumferentially with electrical heating elements (e.g., heating tape, not shown).

As is appreciated by those of ordinary skill in the art, the in-line heater 500 is not limited to use with any particular manhole cover. In FIGS. 8A and 8B, the in-line heater 500 is illustrated being used with the manhole cover 230D, and the in-line heater 500 is illustrated being used with the manhole cover 230E in FIG. 9A. Further, the in-line heater 500 is not limited to use with any particular implementation of the ventilation pipe 400. For the sake of brevity, referring to FIG. 9A, the in-line heater 500 will be described below being used with the manhole cover 230E and the implementation of the ventilation pipe 400 depicted in FIG. 9A.

Figure 13A:
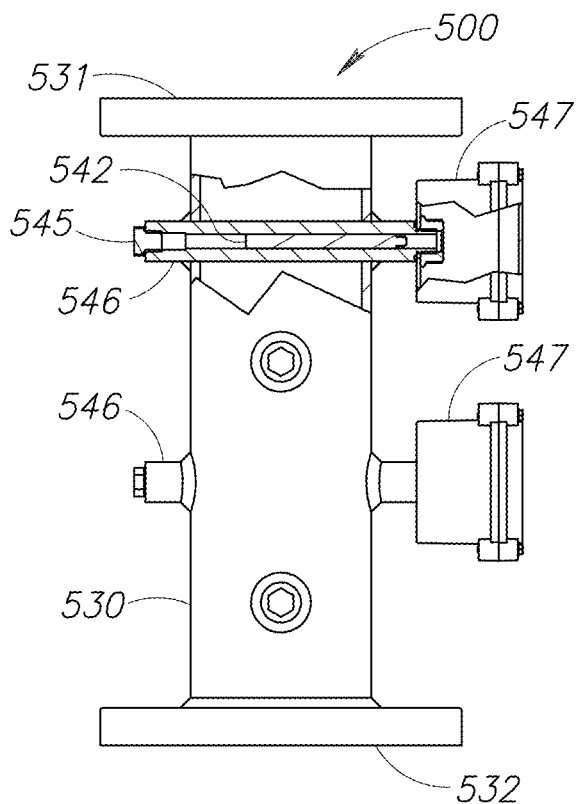
FIG. 13A is a left side view of an in-line heater with a cutaway portion showing an electric cartridge heater.

FIG. 13A is a left side view of in-line heater 500. The in-line heater 500 includes a heated metal pipe section 530 having the upper flange 531, which may be attached to the lower flange 402 (see FIG. 8B) of the section P1, the manifold 246A, or the lower flange 472 (see FIG. 9A) of the vertical section V3 (see FIGS. 4B and 9A). The pipe section 530 also has the lower flange 532 for attachment to the upper flange 404 (see FIG. 8B) of the section P2 or an upper flange 474 (substantially identical to the upper flange 404 illustrated in FIG. 8A) of the vertical section V4 (see FIGS. 4B and 9A) of the ventilation pipe 400.

Figure 13B:
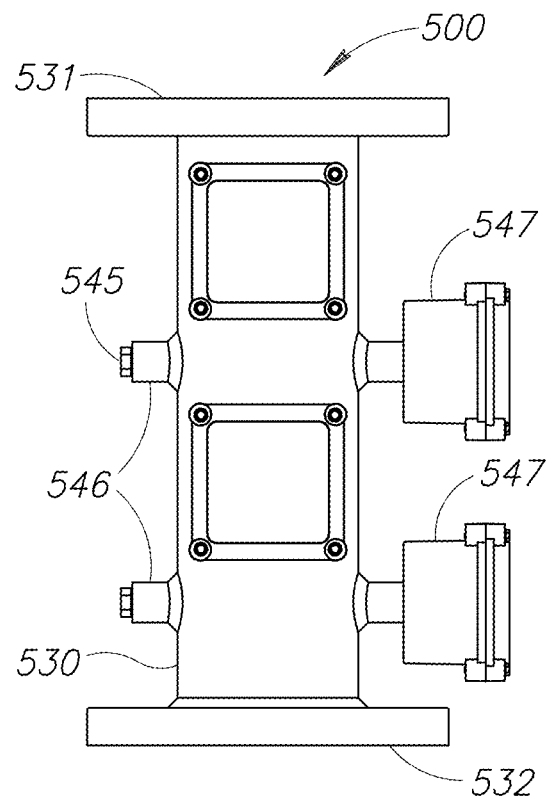
FIG. 13B is a front view of the in-line heater of FIG. 13A.
Figure 13C:
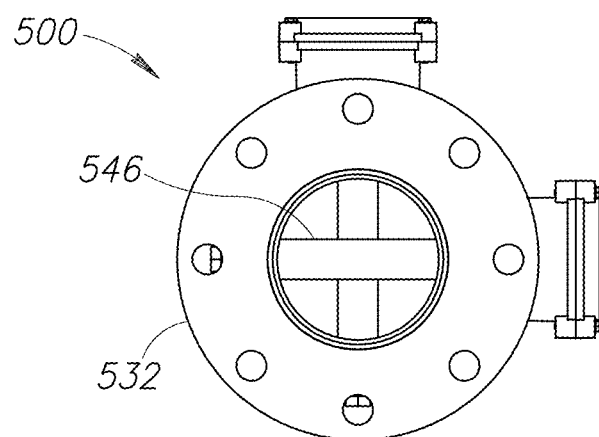
FIG. 13C is a bottom view of the in-line heater of FIG. 13A.

A cutaway portion in FIG. 13A exposes the internal configuration of the in-line heater 500. As shown in FIG. 13A, electric cartridge heaters 542 are inserted into thermal wells 546 that penetrate the walls of the flanged pipe section 530. The flanged pipe section 530 may be constructed from metal to provide good heat transfer with corrosion resistivity in the damp environment. In practice, aluminum may be preferable based on installation and cost considerations. The thermal wells 546 are sealed so as to exclude water by pipe plugs 545 and sealingly mated submersible electrical junction boxes 547. Each of the electrical junction boxes 547 may be connected to an appropriate electrical source (e.g., by a connection 1190 illustrated in FIGS. 21B and 31). For additional clarity, FIGS. 13B and 13C illustrate front and bottom views of the heater 500, respectively. In these figures, each of the cartridge heaters 542 has an electrical connection in a corresponding one of the electrical junction boxes 547. The multiple cartridge heaters 542 are used to create redundancy and assure long life of the in-line heater 500. This redundancy may also improve reliability. The in-line heater 500 may be configured to provide a desired output (e.g., greater than about 100 Watts or greater than about 400 Watts).

Power for the in-line heater 500 may be conveniently tapped from a secondary wire, a transformer, or other electrical equipment typically present in the vault 12. In case that this is not available, a suitable low voltage wire may be run from a nearby power access point to the vault 12.

The in-line heater 500 may be thermally insulated to protect personnel from hot metal surfaces and for the sake of energy efficiency. Further, because heating the internal atmosphere 104 (see FIG. 3) within the vault 12 may decrease a thermal gradient between the interior through-channel 432 (see FIGS. 5A and 5B) of the ventilation pipe 400 and the internal atmosphere 104 (see FIG. 3) within the vault 12, thermally insulating the in-line heater 500 may increase (e.g., maximize) the flowrate within the ventilation pipe 400. It is preferred that the in-line heater 500 is installed in a substantially vertical orientation to maximize the gas flow because, as determined by several experiments, the heated gases tend to stagnate in horizontal pipe sections (e.g., the horizontal sections H1 and H2 shown in FIGS. 4B and 9A). Any horizontal sections of the ventilation pipe 400 should be installed with a slight upward slope (at least about ⅛ inch or at least about ¼ inch of rise per foot may be used) to promote flow of the gaseous composition 106 (see FIG. 3) toward the manhole cover 230A and prevent accumulation of water within the ventilation pipe 400.

Furthermore, referring to FIG. 9A, the heated section of the ventilation pipe 400 is preferably installed just above the highest anticipated water level in the vault 12 for best ventilation (e.g., a floating heater). For practical reasons, the in-line heater 500 is preferably installed near the ceiling 56 of the vault 12 to minimize the risk of being submerged in water near the floor 58 during periods of heavy street flooding. Safety considerations also dictate that temperatures of exposed surfaces and exhaust gases not exceed 60° C. to avoid exposing any personnel entering the vault 12 as well as pedestrians or their pets at the surface 30 to potential burn hazards. Additionally, the temperature of any heating elements used should be kept well below the auto-ignition point (e.g., about 200° C.) of organic vapors likely to be encountered.

The in-line heater 500 may be fabricated from steel, aluminum, copper, stainless steel, brass, or bronze. Insulation is typically applied over heater 500, but again not shown in these figures. As previously noted, the ventilation pipe 400 may be formed in sections. For example, the heated metal pipe section 530 (see FIGS. 8B, 13A, and 13B) of the in-line heater 500 may be joined to a plastic pipe or corrugated plastic hose (e.g., the section P2 or the vertical section V4). In such an arrangement, a thermally insulating gasket material, such as aluminum oxide, can be introduced between the plastic and metal sections to protect the former. Other devices used to implement the ventilator 410 (e.g., the in-line fan 550) may be safely used with either metal or plastic piping.

FIGS. 14A-14C illustrate an exemplary implementation of the in-line fan 550 that may be used to implement the ventilator 410 (see FIGS. 4A, 4B, 8A, 8B, 18, 21A, 21B, and 26). The in-line fan 550 is depicted in front, side, and bottom views in FIGS. 14A, 14B, and 14C, respectively. The in-line fan 550 or a similar air moving device may be inserted in a section of the ventilation pipe 400 (or between adjacent sections of the ventilation pipe 400), preferably close to the ceiling 56 (see FIGS. 1, 4A, 4B, 9A, 18, and 19) of the vault 12 (see FIGS. 1, 3-4B, 9A, 18, 19, 21A, 21B, 26A, and 32). However, this is not a requirement. The in-line fan 550 may be oriented to blow air from the internal atmosphere 104 (see FIG. 3) into the external atmosphere 102 (see FIG. 3) and vice versa.

Referring to FIGS. 14A and 14B, the in-line fan 550 has a housing 551 with the upper and lower flanges 552 and 554. The upper and lower flanges 552 and 554 are substantially identical to the upper and lower flanges 531 and 532 (see FIGS. 8A, 8B, 9A, 13B, and 13C), respectively. Thus, the upper and lower flanges 552 and 554 may be coupled to the lower and upper flanges 402 and 404 (see FIGS. 8A and 8B), respectively. Referring to FIGS. 14B and 14C, inside the housing 551, the in-line fan 550 includes rotatable fan blades 556. FIG. 14B shows the internal configuration of the fan blades 556.

By way of non-limiting examples, the in-line fan 550 may be implemented as either a simple axial in-line fan or an in-line centrifugal fan capable of continuous, reliable operation. As with the above described in-line heater 500 (see FIGS. 8A, 8B, 9A, and 13A-13C), the in-line fan 550 can draw power from suitable equipment within the vault 12. The in-line fan 550 may be rated to meet the electrical classification of the main chamber 52 (see FIGS. 1, 4A, 4B, 9A, 18, 19, 21A, 21B, and 26) and suitably encased to render the in-line fan 550 relatively corrosion-resistant and dirt-resistant to provide a long service life.

Manhole Ring Support

Referring to FIG. 5A, as mentioned above, the manhole cover 230A may rest on the ledge 254A of the manhole ring support 250A. Optionally, water ingress through a gap between the ring support 250A (see FIG. 1A) and the periphery of the manhole cover 230A may be reduced by adding at least one partial dams 582 (see FIGS. 6A-6C) and/or partial groove or moats 586 (see FIGS. 6A-6C) to the ring support 250A to divert flow from this region.

For example, referring to FIG. 6A, the ring support 250B has an upper external portion 580 positioned on or alongside the surface 30. The upper external portion 580 includes two semi-circular partial ring dams 582. Each of the partial dams 582 may subtend an angle from about 90 degrees to about 330 degrees. Depending on local regulations, the height of each of the partial ring dams 582 may typically be no greater than about ⅛ inch to about 3/16 inch above the top surface 232B of the manhole cover 230B. To properly divert water on the surface 30, the partial ring dam 582 is positioned such that the direction from its midpoint to the center of the manhole cover 230B aligns with the effective slope S1 of the surface 30 immediately adjacent to the ring dam. This direction is the resultant obtained by vectorially adding the grade (represented by the arrow S2) of the surface 30 in a direction parallel with the road to a slope (represented by an arrow S3) perpendicular to the road.

One or more partial ring moats 586, disposed near the periphery of the manhole cover 230B, may be formed in the upper external portion 580 of the ring support 250B. In the embodiment illustrated, the moat 586 is positioned between the partial ring dams 582. The moat 586 is believed to deflect water away from the manhole cover 230B and thereby further reduce the amount of water that can enter a gap between the ring support 250B and the periphery of the manhole cover 230B. Like the ring dams 582, each of the partial ring moats 586 is semi-circular, but may subtend an angle from about 90 degrees to about 330 degrees.

The above-described partial dams 582 and ring moats 586 may have a variety of cross-sectional profiles to address tripping, noise, and traction considerations (e.g., rectangular, beveled rectangular, chamfered rectangular, trapezoidal, filleted rectangular, or arcuate, inter alia).

The term "partial" as applied to the dams 582 and moats 586 indicates that these features, which are concentric with the ring support 250B, extend only partially around the ring support 250B. In other words, the partial dams 582 and moats 586 only partially surround the manhole cover 230B.

Moat(s)

One or more partial roadway moats 590, disposed near the periphery of the ring support 250B, may be formed in the surface 30. For example, the partial roadway moats 590 may be cut into the surface 30. The partial roadway moats 590 and are believed to deflect water away from the manhole cover 230B and thereby further reduce the amount of water that can enter a gap between the ring support 250B and the periphery of the manhole cover 230B. Like the ring dams 582 and moats 586, each of the partial roadway moats 590 is semi-circular, but may subtend an angle from about 90 degrees to about 330 degrees. For the purposes herein, the partial roadway moats 590 may be arcuate, or linear, the latter version being more easily cut into the existing surface 30. The partial roadway moats 590 may have a variety of cross-sectional profiles to address tripping, noise, and traction considerations (e.g., rectangular, beveled rectangular, chamfered rectangular, trapezoidal, filleted rectangular, or arcuate, inter alia).

The term "partial" as applied to the roadway moats 590 indicates that these features, which are concentric with the ring support 250B, extend only partially around the perimeter of the ring support 250B. In other words, the partial roadway moats 590 only partially surround the manhole cover 230B.

One or more partial ring dams 582, partial ring moats 586, or partial roadway moats 590, or a combination of these features, may be employed (e.g., as illustrated in FIGS. 6A-6C and described above).

Optional Exhaust Hole Plug

As discussed in the Background section, a major limitation of providing additional venting for a manhole cover is the inevitable ingress of undesirable liquids, mainly water, and solids including snow and slush. Referring to FIG. 8A, this detraction may be addressed at least in part by the exhaust hole plug 653D. The exhaust hole plug 653D may be configured for insertion into any suitably shaped hole formed in a manhole cover. For the sake of brevity, the exhaust hole plug 653D is described below as being configured for insertion into one of the exhaust holes 253D (see FIGS. 8E-8G) of the manhole cover 230D.

Figure 15:
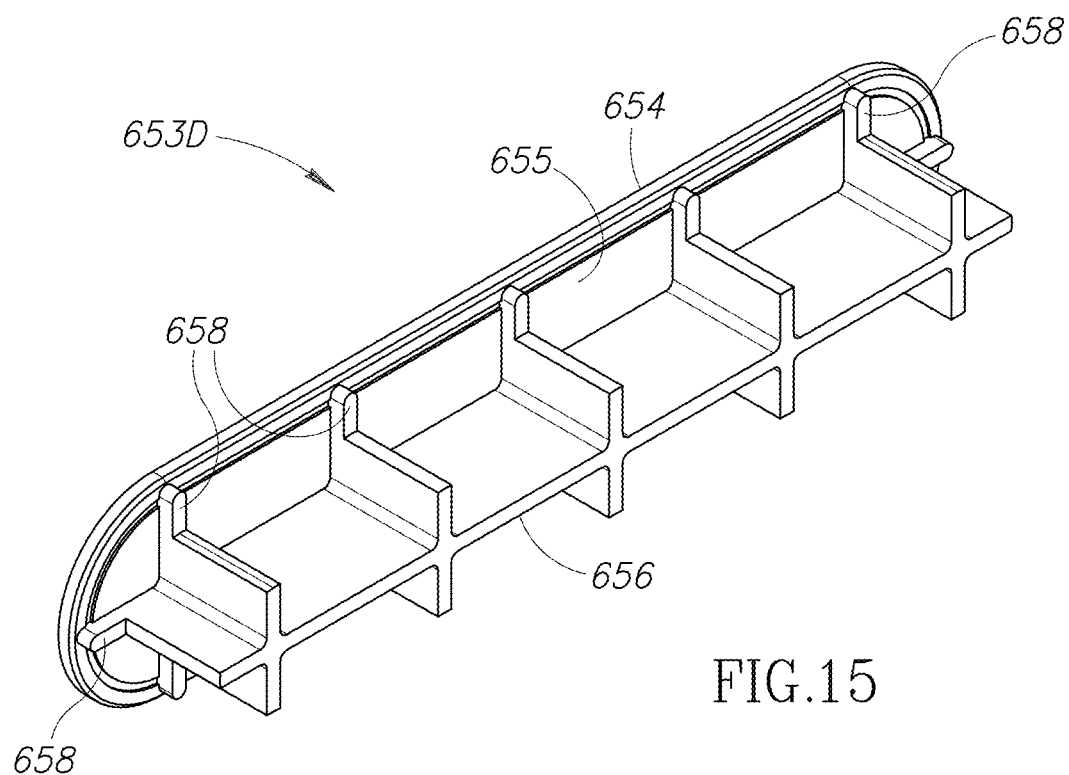
FIG. 15 is a detailed isometric view of the exhaust hole plug for use with the implementation of the first embodiment of the ventilation system depicted in FIG. 8A.

Referring to FIG. 15, the exhaust hole plug 653D includes an exhaust hole cap 654 and a support member 656. The support member 656 is attached to and extends away from a bottom surface 655 of the cap 654. The support member 656 includes multiple spacer portions or steps 658 that are spaced apart from one another and positioned along the periphery of the exhaust hole cap 654. Referring to FIG. 8C, it should be noted that the section 8F-8F is taken slightly (about 1/16 inch) off center, so the support member 656 appears to be unsupported in this view, but subsequent illustrations and discussion clarify the positioning of this element.

Referring to FIG. 8G, the steps 658 (see FIG. 15) are configured to limit the insertion depth of the support member 656 into the exhaust hole 253D. The steps 658 (see FIG. 15) of the support member 656 position the exhaust hole cap 654 above the top surface 232D of the manhole cover 230D. Thus, a gap 659 (see FIG. 8G) is defined between the bottom surface 655 of the exhaust hole cap 654 and the top surface 232D of the manhole cover 230D. The gap 659 allows discharge of the dangerous gaseous composition 106 shown in FIG. 3 (through the exhaust hole 253D). A different exhaust hole plug 653D is positioned in each of the exhaust holes 253D with the exhaust hole cap 654 positioned above the top surface 232D of the manhole cover 230D so as to leave the gap 659 through which gas may flow while limiting entry of rain water and debris.

The exhaust hole plug 653D may be press (or interference) fit into one of the exhaust holes 253D in the manhole cover 230D. In such embodiments, the dimensions of the support member 656 may be slightly oversized with respect to the internal size of the exhaust holes 253D to hold the support member 656 in place by friction inside the exhaust hole 253. During this pressing operation, the multiple steps 658 (best seen in FIG. 15) of the support member 656 limit the travel thereof into the exhaust hole 253D as the steps 658 seat or rest on the top surface 232D of the manhole cover 230D.

The exhaust hole plug 653D is preferably fabricated from cast iron, but a material such as steel, fiberglass composite, or aluminum can be used provided it meets the structural requirements and does not initiate galvanic corrosion. The exhaust hole plug 653D may be cast as an integral unit but, alternatively, may be assembled from the individual components (e.g., by welding or brazing in the case of steel or aluminum). It is preferred that the exhaust hole plug 653D is a monolithic structure wherein the respective cap 654 is integral with the support member 656.

Optional Vent Hole Plug

Referring to FIG. 8A, like the exhaust hole plug 653D, the vent hole plug 652D is configured to at least partially limit or prevent ingress of undesirable liquids, mainly water, and solids including snow and slush into the vault 12 (see FIGS. 1, 3-4B, 9A, 18, 19, 21A, 21B, 26A, and 32). The vent hole plug 652D may be configured for insertion into any suitably shaped hole formed in a manhole cover. For the sake of brevity, the vent hole plug 652D is described below as being used with the manhole cover 230D and configured for insertion into one of the vent holes 252D (see FIGS. 8D, 8E, 8H and 8I).

Figure 16:
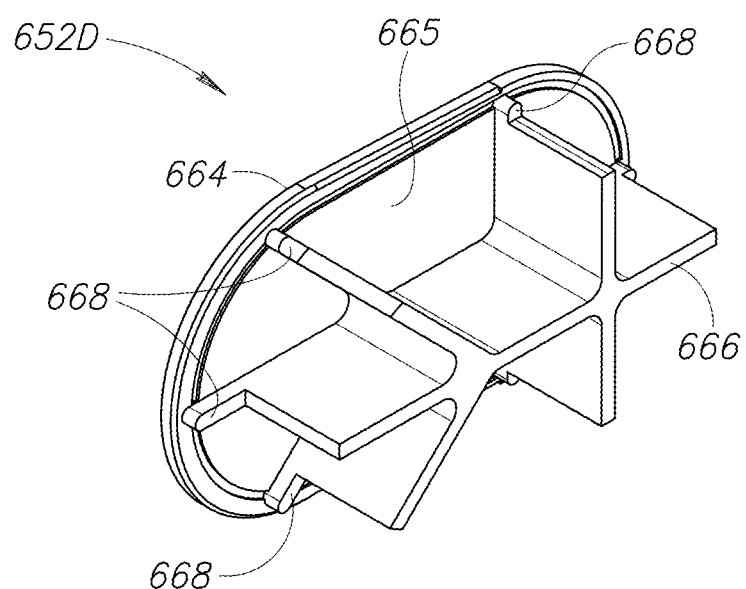
FIG. 16 is a detailed isometric view of the vent hole plug for use with the implementation of the first embodiment of the ventilation system depicted in FIG. 8A.

In the embodiment illustrated in FIGS. 8H and 8I, the vent hole plug 652D is substantially similar to the exhaust hole plug 653D (see FIGS. 8A-8C, 8F, 8G, 9A, 15, and 19) but is configured for insertion into one of the vent holes 252D, instead of one of the exhaust holes 253D (see FIGS. 8E-8G). Referring to FIG. 16, the vent hole plug 652D includes a vent hole cap 664 and a support member 666. The support member 666 is attached to and extends away from a bottom surface 665 of the cap 664. The support member 666 may have multiple spacer portions or steps 668 that are spaced apart from one another and positioned along the periphery of the vent hole cap 664. As mentioned above, referring to FIG. 8C, the section 8F-8F is taken slightly (about 1/16 inch) off center, so in FIG. 8I the support member 666 appears to be unsupported, but subsequent illustrations and discussion clarify the positioning of this element.

Referring to FIG. 8I, the steps 658 (see FIG. 16) are configured to limit the depth to which the support member 666 can be inserted into the vent hole 252D. The steps 668 (see FIG. 16) of the support member 666 position the vent hole cap 664 above the top surface 232D of the manhole cover 230D. Thus, a gap 669 is defined between the bottom surface 665 of the exhaust hole cap 654 and the top surface 232D of the manhole cover 230D. The gap 669 allows make-up air to enter the vault 12 (through the vent hole 252D). A different vent hole plug 652D is positioned in each of the vent holes 252D with the vent hole cap 664 positioned above the top surface 232D of the manhole cover 230D so as to leave the gap 669 through which air may flow into the vault 12 while limiting entry of rain water and debris.

The vent hole plug 652D may be press (or interference) fit into one of the vent holes 252D in the manhole cover 230D. In such embodiments, the dimensions of the support member 666 may be slightly oversized with respect to the internal size of the vent holes 252D to hold the support member 666 in place by friction inside the vent hole 252. During this pressing operation, the multiple steps 668 (best seen in FIG. 16) of the support member 666 limit the travel thereof into the vent hole 252D as the steps 668 seat or rest on the top surface 232D of the manhole cover 230D.

The vent hole plug 652D is preferably fabricated from cast iron, but a material such as steel, fiberglass composite, or aluminum can be used provided it meets the structural requirements and does not initiate galvanic corrosion. The vent hole plug 652D may be cast as an integral unit but, alternatively, may be assembled from the individual components (e.g., by welding or brazing in the case of steel or aluminum). It is preferred that vent hole plug 652D is a monolithic structure wherein the cap 664 is integral with the support member 666.

Alternate Embodiment of Vent Hole Plug

FIG. 10A illustrates the vent hole plug 652F for use with the manhole cover 230F. The vent hole plug 652F is configured to be inserted into one of the vent holes 252F. The vent hole plug 652F may be constructed from any materials suitable for constructing the vent hole plugs 652D (see FIGS. 8A-8D, 8H, 8I, and 16).

Figure 17A:
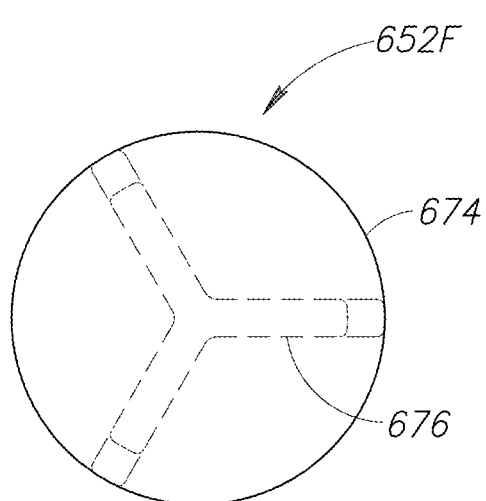
FIG. 17A is a top view of the vent hole plug for use with the implementation of the first embodiment of the ventilation system depicted in FIG. 10A.
Figure 17B:
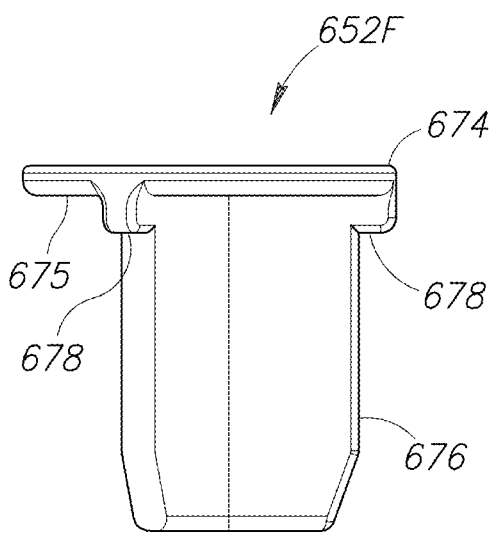
FIG. 17B is a side view of the round vent hole plug of FIG. 17A.
Figure 17C:
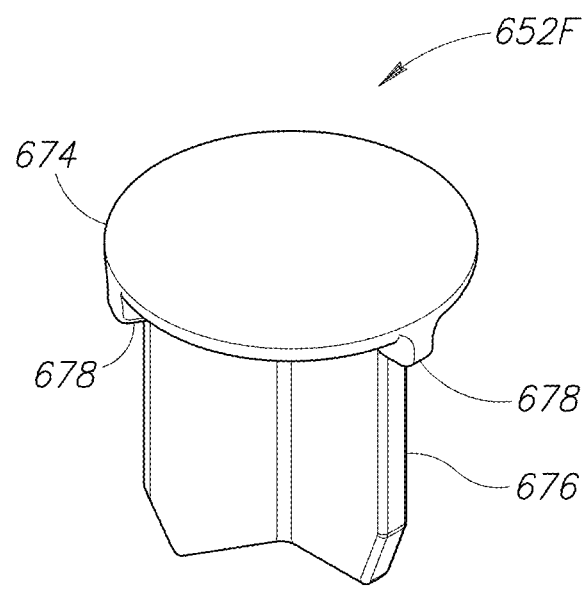
FIG. 17C is an isometric view of the round vent hole plug of FIG. 17A.

Referring to FIGS. 17A-17C, the vent hole plugs 652F each includes a round vent hole cap 674 and a support member 676. Referring to FIG. 17B, the support member 676 is attached to and extends away from a bottom surface 675 (see FIG. 17B) of the cap 674. It is preferred that vent hole plug 652F is a monolithic structure wherein the cap 674 is integral with the support member 676. Like the support member 666 (see FIGS. 8I and 16) of the vent hole plug 652D (see FIGS. 8A-8D, 8H, 8I, and 16), the support member 676 includes multiple spacer portions or steps 678 that are spaced apart from one another and positioned along the periphery of the vent hole cap 674.

Referring to FIG. 10F, the steps 678 (see FIGS. 17B and 17C) are configured to limit the insertion depth of the support member 676 into the vent hole 252F. The steps 678 (see FIGS. 17B and 17C) of the support member 676 position the vent hole cap 664 above the annular ledge 296. Thus, a gap 679 is defined between the bottom surface 675 of the exhaust hole cap 654 and the annular ledge 296. The gap 679 allows discharge of the dangerous gaseous composition 106 shown in FIG. 3 (through the vent hole 252F). Referring to FIG. 10F, a different vent hole plug 652F is positioned in each of the vent holes 252F with the vent hole cap 664 positioned above the annular ledge 296 so as to leave the gap 679 through which gas may flow while limiting entry of rain water and debris.

The exhaust hole plug 653D (see FIGS. 8A-8C, 8F, 8G, 9A, 15, and 19), the vent hole plug 652D (see FIGS. 8A-8D, 8H, 8I, and 16), and/or the vent hole plug 652F (see FIGS. 10A, 10B, 10D-10F, and 17A-17C) may be adapted or retrofitted for use with existing manhole covers (e.g., the manhole cover 70 depicted in FIG. 2) having vent holes (e.g., the vent holes 72 depicted in FIG. 2). In such a manhole cover, some preexisting holes may be selected for exhaust and others for vents. Optionally, an appropriate manifold (e.g., one of the manifolds 246A, 246D, and 460 illustrated in FIGS. 7, 8A, and 11A, respectively) may be used.

Second Embodiment of Ventilation System

FIG. 18 depicts a second embodiment of a ventilation system 710 installed in the vault 12. Like the ventilation system 210 (see FIGS. 4A-5B, 6A, 7-8C, 9A, and 9B), the ventilation system 710 is an exemplary implementation of the ventilation system 100 (see FIG. 3). As mentioned above, referring to FIG. 3, instead of effecting the air exchange (represented by the arrows A1 and A2), across the interface 92 formed by the manhole cover 130, at least part of the air exchange (represented by the arrows A1' and A2') may occur within alternative channels or ducts (e.g., the ventilation stack 132) connected to the main chamber 52. For example, referring to FIG. 18, the ventilation pipe 400 may be fluidly connected directly to the vent stack 132. In such embodiments, the air moving assembly 240 may move internal air into the vent stack 132, which exits therefrom (represented by the arrow A2' in FIG. 3) into the external atmosphere 102 (see FIG. 3). In such embodiments, external air may enter the vault 12 through other means, such as through one or more vent holes 752 formed in a manhole cover 730 (represented by the arrow A1 in FIG. 3).

FIG. 18 depicts the vent stack 132 displaced from the manhole cover 730 by (typically) more than one foot to about three feet. In this case, the first open end 440 of ventilation pipe 400 is sealably connected to the vent stack 132 at a point where the latter penetrates one of the sidewall(s) 54 of the main chamber 52 of the vault 12. Since the duct diameter associated with the vent stack 132 is typically larger than that of the ventilation pipe 400, a transition connector or annular plug 732 may be used to couple these two features together using methods well known in the art. The ventilation pipe 400 extends into the main chamber 52 of the vault 12 and may position at least one second opening 448 proximal to the second open end 442 of the ventilation pipe 400 at a vertical level of less than or equal to about 3 feet above the floor 58 of the main chamber 52.

As discussed above, the ventilation pipe 400 may include the one or more second openings 448. For example, the ventilation pipe 400 may include a plurality of second openings 448 (e.g., the holes 449 depicted in FIG. 9A) formed in the wall(s) 430 (see FIGS. 5A, 5B, 19, and 20). The second openings 448 may be configured to allow ventilation to occur even as water level rises in the vault 12. The second openings 448 may have a uniform size and shape or be graduated (or variegated) to draw air from (or push air through) larger holes located lower in the vault 12. Further, one or more of the second openings 448 may be a slit or include a flap portion (like the flap portion 447 illustrated in FIG. 20) configured to remain closed until the water level rises.

The ventilation pipe 400 may be positioned away from the sidewall(s) 54 as shown in FIG. 18. An alternative configuration and positioning of the ventilation pipe 400 is shown using dashed lines. In the alternative configuration, the ventilation pipe 400 hugs at least one of the sidewall(s) 54 of the main chamber 52 and may optionally be fastened thereto.

As mentioned above, the manhole cover 730 may include at least one vent hole 752 (similar to the vent hole 252A shown in FIGS. 5A and 5B or the vent holes 72 shown in FIG. 2) configured to allow make-up air to enter the vault 12. Alternatively, make-up air may be drawn from the conduits 20A-20C (see FIGS. 1 and 32), as well as from unavoidable air leaks into the vault 12. Optionally, when the intent is to draw contaminated gases from the conduits 20A-20C (see FIG. 1) entering and/or leaving the vault 12, the vent hole(s) 752 in the manhole cover 730 may be appropriately plugged.

Optionally, a second vent stack (not shown) substantially identical to the vent stack 132 may be connected to the main chamber 52 and configured to provide make-up air to the vault 12. In this case, the second vent stack (not shown) may be displaced from the (first) vent stack 132. Additionally, the manhole cover 730 no longer requires the vent hole(s) 752. The second vent stack (not shown) may be installed during initial construction of the vault 12 or added at a later time.

The ventilation system 710 may be readily converted to the ventilation system 210 (described above and illustrated in FIGS. 4A-5B, 6A, 7-8C, 9A, and 9B) by fluidly connecting the first open end 440 of the ventilation pipe 400 to one or more exhaust holes or vent holes formed in the manhole cover 730 (or a different manhole cover) optionally using a manifold (e.g., the manifold 246A depicted in FIGS. 7, 9B, and 19, the manifold 246D depicted in FIGS. 8A, 8B, 8D, 8F, and 8H, or the manifold 460 depicted in FIGS. 11A-11C). For example, referring to FIG. 9B, the first open end 440 of the ventilation pipe 400 may be connected to the port 330A of the manifold 246A which is connected the exhaust holes 253E of the manhole cover 230E (see FIGS. 9A and 9B, respectively).

Third Embodiment of Ventilation System

FIG. 19 depicts a third embodiment of a ventilation system 810 installed in the vault 12. Like the ventilation system 210 (see FIGS. 4A-5B, 6A, 7-8C, 9A, and 9B), the ventilation system 810 is an exemplary implementation of the ventilation system 100 (see FIG. 3). However, the ventilation system 810 omits the ventilator 410 (see FIGS. 4A, 4B, 8A, 8B, 18, 21A, 21B, and 26). Instead, the ventilation pipe 400 acts alone as a passive ventilator using the chimney (stack) effect (described above). Therefore, the ventilator 410 is not required.

In FIG. 19, the ventilation pipe 400 extends into the vault 12 such that at least one of the second openings 448 is located at most about three feet above the floor 58. In the embodiment illustrated, the ventilation pipe 400 includes a plurality of the second openings 448 (e.g., the holes 449 depicted in FIG. 9A) formed in the wall(s) 430. The second openings 448 may be configured to allow ventilation to occur even as water level rises in the vault 12. The second openings 448 may have a uniform size and shape or be graduated (or variegated) to draw air from (or push air through) larger holes located lower in the vault 12. Further, one or more of the second openings 448 may be a slit or include a flap portion (like the flap portion 447 illustrated in FIG. 20) configured to remain closed until the water level rises.

As mentioned above, the vault 12 may partially flood from time to time due to heavy precipitation. In FIG. 19, the vault 12 is illustrated partially filled with the water 80. The highest water level 812 above the floor 58 is designated herein as an "effective floor" because the ventilation pipe 400 cannot draw any of the internal atmosphere 104 (e.g., the gaseous composition 106 depicted in FIG. 3) from a location below this vertical level.

A line 814 illustrates an ignition level that is (e.g., about 6 inches) above a lowest non-submerged source of ignition 816. It should be clear that a submerged ignition source would not initiate a fire or explosion. By way of non-limiting examples, one or more of the following sources of ignition may be present in the vault 12:

1. an exposed conductor on a live-front termination of underground equipment (e.g., transformer and/or switchgear) located in the vault 12;
2. a termination of dead-front underground equipment;
3. secondary cables;
4. joints; and
5. T-bodies that connect together two pieces of medium voltage or low voltage secondary cables that are usually mounted on the sidewall(s) 54 of the vault 12 above the floor 58.

The effective floor concept may be used to determine how far the ventilation pipe 400 should extend into the vault 12 such that the vertical height of at least one of the second openings 448 is between the line 814 representing the ignition level and the effective floor 812. Although the level of the effective floor 812 is somewhat predictable from past experience in the immediate vicinity of the vault 12, the level of the effective floor 812 cannot be precisely known or guaranteed. However, the float assembly 412 shown in FIG. 12 follows the level of the water 80 and therefore, the level of the effective floor 812. The float assembly 412 allows only air that flows between the floats 690 to enter the bellows 682 (and the second openings 448 positioned inside the bellows 682). Thus, the level of the openings 692 between the floats 690 is an effective intake level that is determined by the level of the water 80 (see FIGS. 3 and 19). In this manner, the float assembly 412 may be used to automatically adjust the height of the effective intake level so as to maintain it above the effective floor 812.

This approach to determining the effective intake level may be applied to any other embodiment described, regardless of whether the exhaust is active (e.g., the ventilator 410 is used) or passive (e.g., only the ventilation pipe 400 is used).

Fourth Embodiment of Ventilation System

FIG. 21A illustrates a fourth embodiment of a ventilation system 910. Like the ventilation system 210 (see FIGS. 4A-5B, 6A, 7-8C, 9A, and 9B), the ventilation system 910 is an exemplary implementation of the ventilation system 100 (see FIG. 3). The ventilation system 910 may be configured to move (or draw) at least a portion of the external atmosphere 102 (see FIG. 3) into the main chamber 52, which causes a portion of the internal atmosphere 104 (see FIG. 3) to exit (or exhaust) from the main chamber 52. Alternatively or additionally, the ventilation system 910 may be configured to push (or blow) at least a portion of the internal atmosphere 104 (see FIG. 3) from the main chamber 52 into the external atmosphere 102 (see FIG. 3). In this embodiment, the interface 92 (see FIG. 3) is implemented as a manhole cover 230G and the air moving assembly 90 (see FIG. 3) is implemented as an air moving assembly 914. The ventilation system 910 may include the ventilation stack 132 (see FIG. 3). However, this is not a requirement and the ventilation stack 132 (see FIG. 3) has been omitted from FIG. 21A.

Figure 26A:
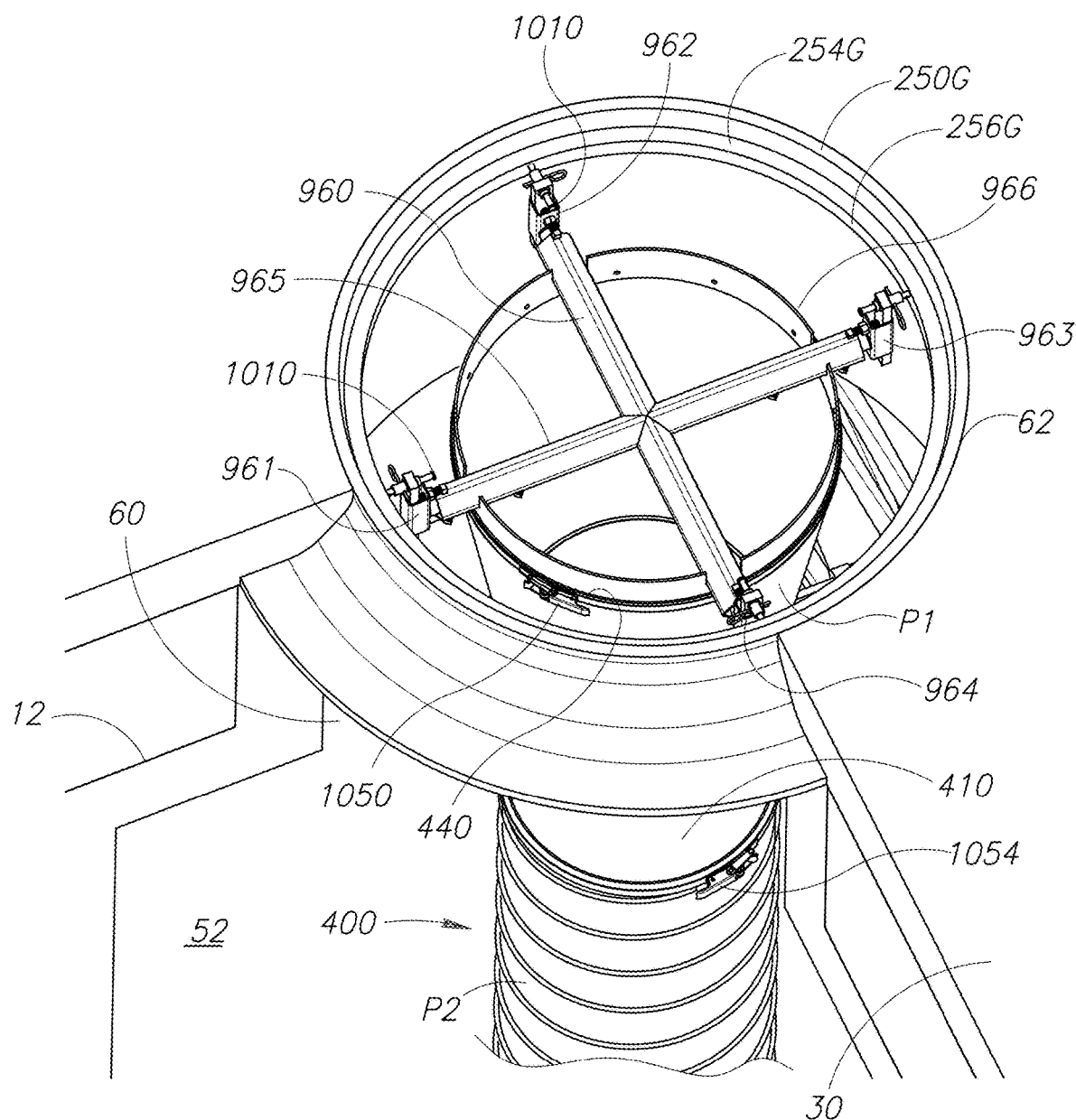
FIG. 26A is a perspective view into the manhole vault with the manhole cover of the implementation depicted in FIG. 21A removed.

Optionally, referring to FIG. 21A, the ventilation system 910 may include the ring support 250G. In the implementation illustrated, the manhole cover 230G is supported by the ring support 250G configured to provide the same functionality as the ring supports 250A and 250B illustrated in FIGS. 5A and 6A, respectively. Referring to FIG. 21A, the ring support 250G may include a ledge 254G (see FIG. 26A) that is substantially identical to the ledge 254A (see FIGS. 5A, 5B, and 9B) and upon which the manhole cover 230G rests. Referring to FIG. 26A, the ring support 250G also has an inside surface 256G positioned below the ledge 254G that faces into the neck 60. The ring support 250G may be configured to include at least one dam 582 (see FIGS. 6A-6C) and/or at least one moat 586 (see FIGS. 6A-6C). Further, at least one moat 590 (see FIGS. 6A-6C) may be formed in the surface 30 alongside the manhole cover 230G. Optionally, a waterproof seal (like the seal 251 illustrated in FIG. 5C) may be positioned between the manhole cover 230G and the ring support 250G. The seal (not shown) is configured to help prevent water intrusion between the manhole cover 230G and the ring support 250G. The seal (not shown) may be implemented as a gasket, an O-ring, putty, caulk, a combination thereof, and the like.

Manhole Cover

Figure 22A:
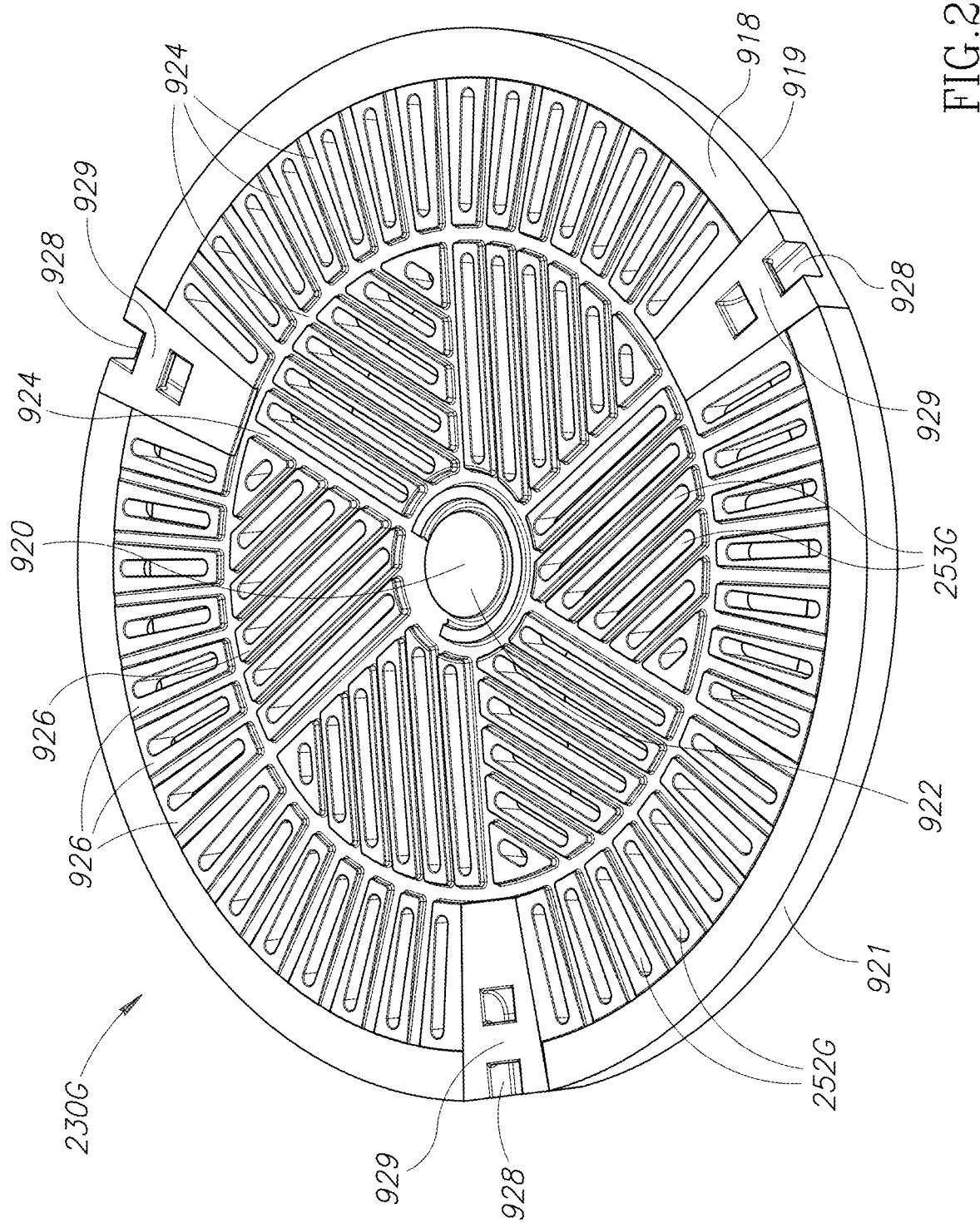
FIG. 22A is a perspective view of a top side of the manhole cover of the implementation depicted in FIG. 21A.
Figure 22B:
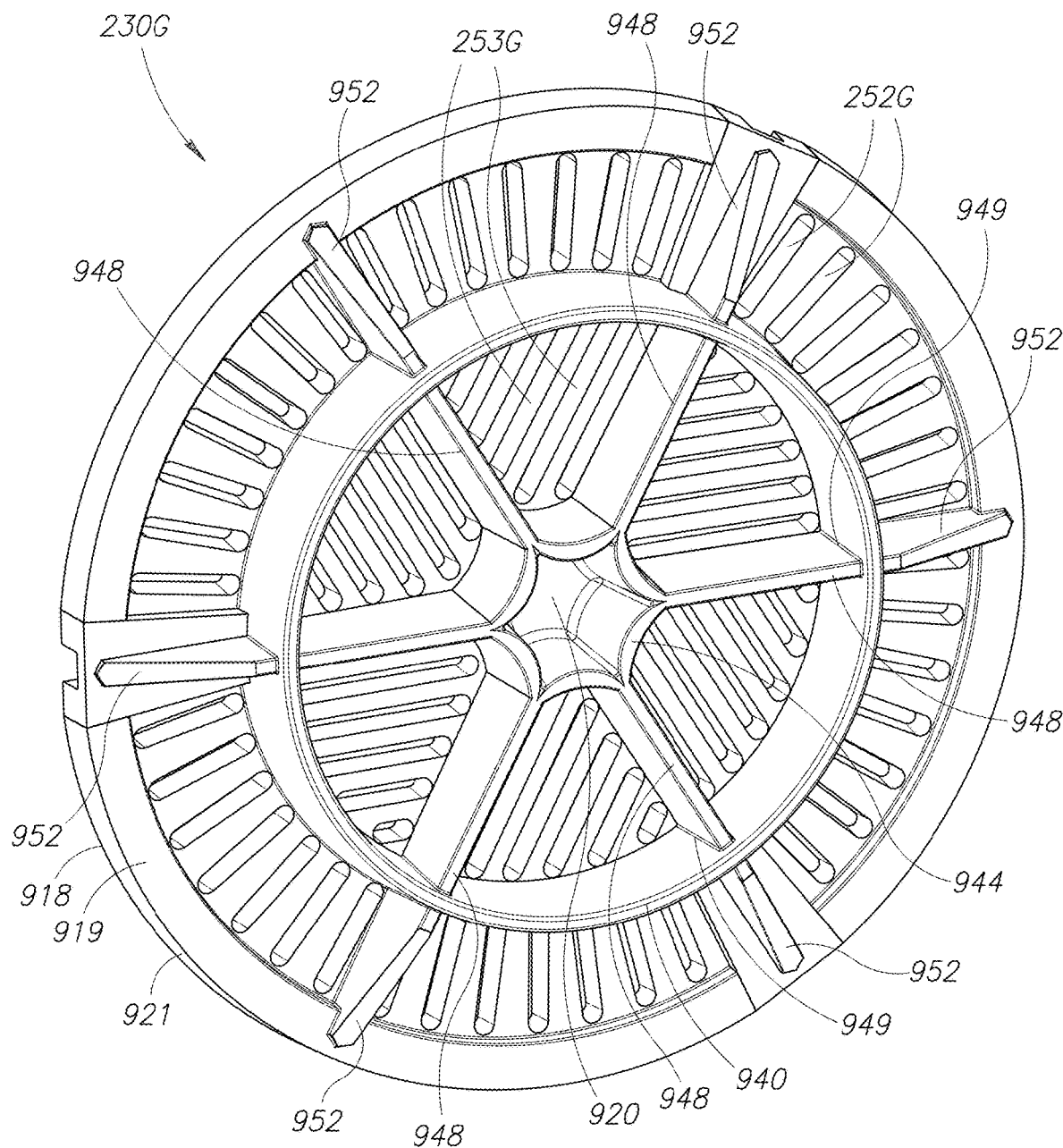
FIG. 22B is a perspective view of a bottom side of the manhole cover of the implementation depicted in FIG. 21A.

Referring to FIGS. 22A and 22B, the manhole cover 230G has an outwardly facing top side 918 opposite an inwardly facing bottom side 919. Referring to FIG. 22A, the manhole cover 230G has a center portion 920 surrounded by a peripheral edge 921. Although the manhole cover 230G has been illustrated as having a traditional round manhole cover shape, the manhole cover 230G may have an alternate shape, such as rectangular.

A plurality of outlets or exhaust holes 253G are positioned adjacent to the center portion 920 and a plurality of inlets or vent holes 252G are positioned adjacent to the peripheral edge 921. In the embodiment illustrated, the vent and exhaust holes 252G and 253G do not overlap radially. However, this is not a requirement. The vent holes 252G (which are implementations of the vent holes 152 depicted in FIG. 3) allow a portion (represented by the arrow A1 in FIG. 3) of the external atmosphere 102 (see FIG. 3) to flow into the internal atmosphere 104 (see FIG. 3). On the other hand, the exhaust holes 253G (which are implementations of the exhaust holes 153 depicted in FIG. 3) allow a portion (represented by the arrow A2 in FIG. 3) of the internal atmosphere 104 (see FIG. 3) to flow into the external atmosphere 102 (see FIG. 3). However, as explained above, the exhaust holes 253G may be converted to vent holes and the vent holes 252G may be converted to exhaust holes by reversing the direction of the flow therethrough.

Referring to FIGS. 22A and 22B, it may be beneficial to maximize the overall size (area) of the vent and exhaust holes 252G and 253G to reduce flow restrictions posed by the manhole cover 230G. However, as is apparent to those of ordinary skill in the art, the vent and exhaust holes 252G and 253G should be configured such that structural integrity of the manhole cover 230G is adequate to withstand normal usage (e.g., usage specified by OSHA 1926.502, AASHTO-M306, etc.).

Like other manhole covers discussed above (e.g., the manhole covers 230D and 230F shown in FIGS. 8A and 10A, respectively), the manhole cover 230G may include water control features. For example, referring to FIG. 22A, the top side 918 may include channels 924 arranged to provide throughways through which precipitation and surface water may flow. The channels 924 direct surface water away from the vent and exhaust holes 252G and 253G. The channels 924 may define a top surface portion 922 in which information (e.g., branding, logos, etc.) may be displayed.

In the embodiment illustrated, the channels 924 are spaced apart from each of the vent and exhaust holes 252G and 253G and define a dam-like portion 926 that partially or completely surrounds each of the vent and exhaust holes 252G and 253G. These dam-like portions 926 help prevent surface water from entering the vent and exhaust holes 252G and 253G. Because the top side 918 includes the channels 924 instead of elevation walls (like the elevation wall(s) 235D illustrated in FIGS. 8C and 8E or the elevation walls 298 illustrated in FIGS. 10B, 10C, and 10E), less noise may be produced by vehicles driving over the manhole cover 230G.

Optionally, a plurality of the vent hole plugs 652D (see FIGS. 8A-8D, 8H, 8I, and 16) may be inserted one each into some of the vent holes 252G and/or a plurality of the vent hole plugs 652F (see FIGS. 10A, 10B, 10D-10F, and 17A-17C) may be inserted one each into some of the vent holes 252G. Similarly, a plurality of the exhaust hole plugs 653D (see FIGS. 8A-8C, 8F, 8G, 9A, 15, and 19) may be inserted one each into the exhaust holes 253G.

The top side 918 of the manhole cover 230G may have a curved or generally domed shape that is taller near the center portion 920 and curves downwardly toward the peripheral edge 921. This domed shape helps direct water away from the center portion 920 and toward the peripheral edge 921. The domed shape also positions the vent and exhaust holes 252G and 253G above the surface 30 (see FIGS. 1, 3-6C, 9A, 9B, 18, 19, 21A, 26A, and 32) by a predetermined amount (e.g., about ⅛ inch, about ⅜ inches in accordance with requirements specified by Americans with Disabilities Act, at least about ⅛ inches, or about ⅜ inches.

Along its periphery, the manhole cover 230G includes one or more conventional closed end wells 928 configured to be used to lift the manhole cover 230G from the manhole 62. Each of the wells 928 extends radially inward from the peripheral edge 921 toward the center portion 920 and passes under a transverse bridge portion 929. The worker 61

(see FIGS. 1 and 3) may insert a tool (e.g., a pick, not shown) into one of the wells 928, hook onto the bridge portion 929, and lift the manhole cover 230G upwardly and out of the manhole 62.

Optionally, referring to FIG. 22B, the bottom side 919 includes a downwardly extending ring-shaped wall 940 that surrounds the exhaust holes 253G. Implementations that include the ring-shaped wall 940 may omit one of the manifolds 246A (see FIGS. 7, 9B, and 19), 246D (see FIGS. 8A, 8B, 8D, 8F, and 8H), and 460 (see FIGS. 11A-11C). The bottom side 919 may include a downwardly extending structure 944 positioned inside the wall 940. In the embodiment illustrated, the structure 944 is generally hexagonally shaped and positioned at or near the central portion 920 of the manhole cover 230G. A plurality of support walls 948 extend radially outwardly from the structure 944 and pass through rounded fillets 949 formed in the wall 940. Each of the walls 948 has a tapered distal end portion 952 that terminates before reaching the peripheral edge 921. The exhaust holes 253G are positioned between the structure 944 and the wall 940. The vent holes 252G are positioned between the wall 940 and the peripheral edge 921.

The manhole cover 230G may be used instead and in place of the manhole covers 230A-230F in the first three embodiments described above. In such implementations, the vent holes 252G may optionally be used as exhaust holes and the exhaust holes 253G may optionally be used as vent holes. However, this is not a requirement.

While the ventilation system 910 has been described as including the manhole cover 230G, the ventilation system 910 may alternatively include one of the manhole covers 230A-230F illustrated in FIGS. 5A, 6A, 7, 8A, 9B, and 10A, respectively. Furthermore, the manhole cover 230G may be implemented by retrofitting a conventional manhole cover (e.g., the vented manhole cover 70 illustrated in FIG. 2) by creating the vent holes 252G and/or the exhaust holes 253G in an otherwise solid cover, plugging some existing holes (e.g., the vent holes 72 illustrated in FIG. 2), and/or adding the ring-shaped wall 940 to the underside of the manhole cover.

Air Moving Assembly

Figure 21B:
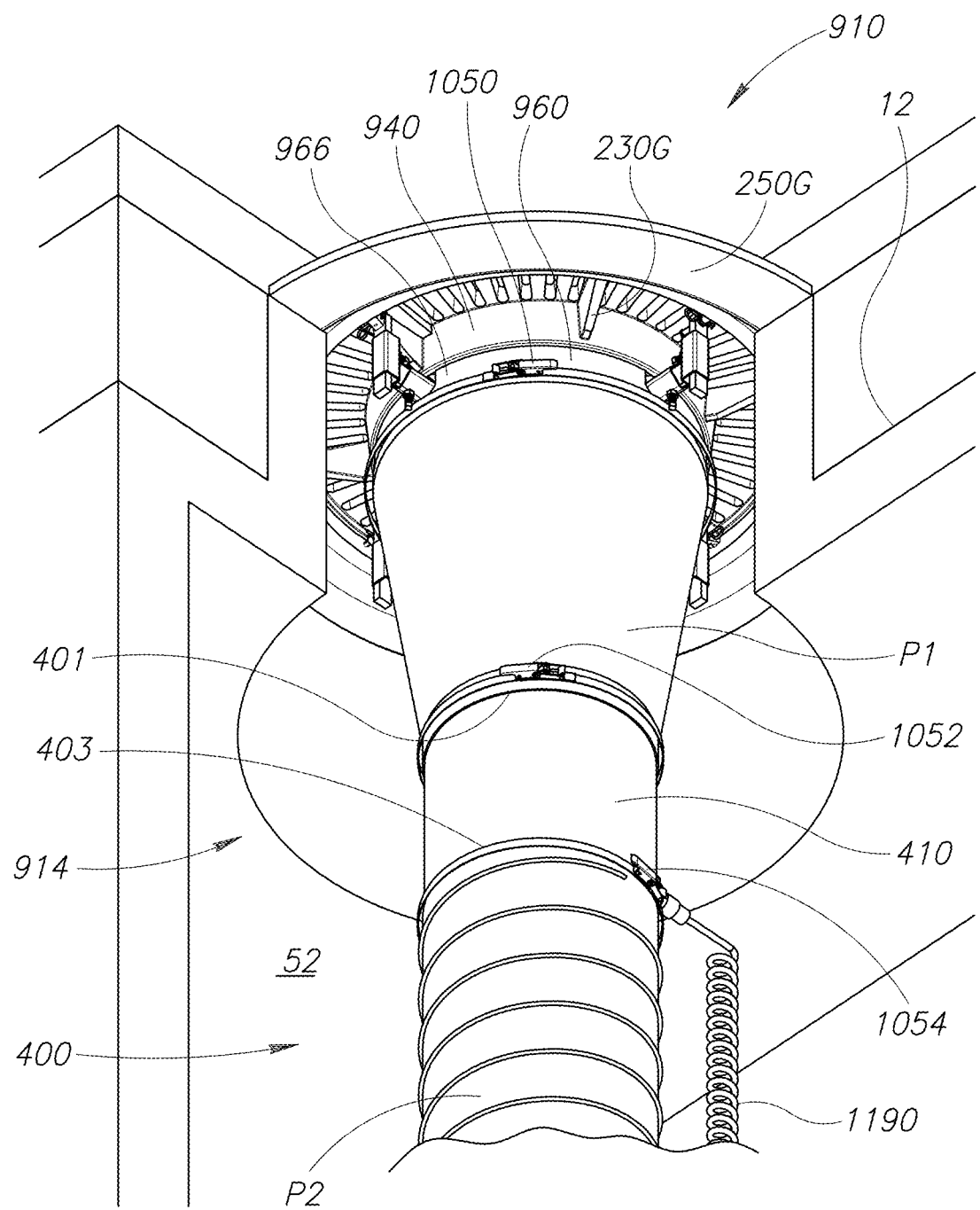
FIG. 21B is a perspective view of an underside of the implementation depicted in FIG. 21A.

Referring to FIG. 21B, the air moving assembly 914 includes the ventilation pipe 400 and the ventilator 410. Optionally, the air moving assembly 914 may include the optional float assembly 412 (see FIG. 12). The air moving assembly 914 may include a support bracket assembly 960 and/or one of the optional manifolds 246A (see FIGS. 7, 9B, and 19), 246D (see FIGS. 8A, 8B, 8D, 8F, and 8H), and 460 (see FIGS. 11A-11C). However, as mentioned above, when the manhole cover 230G is used, a manifold is not necessary. As will be described in further detail below, the ventilator 410 may be implemented as a ventilator assembly 1100 (see FIGS. 27 and 30-32).

Support Bracket Assembly

Figure 23:
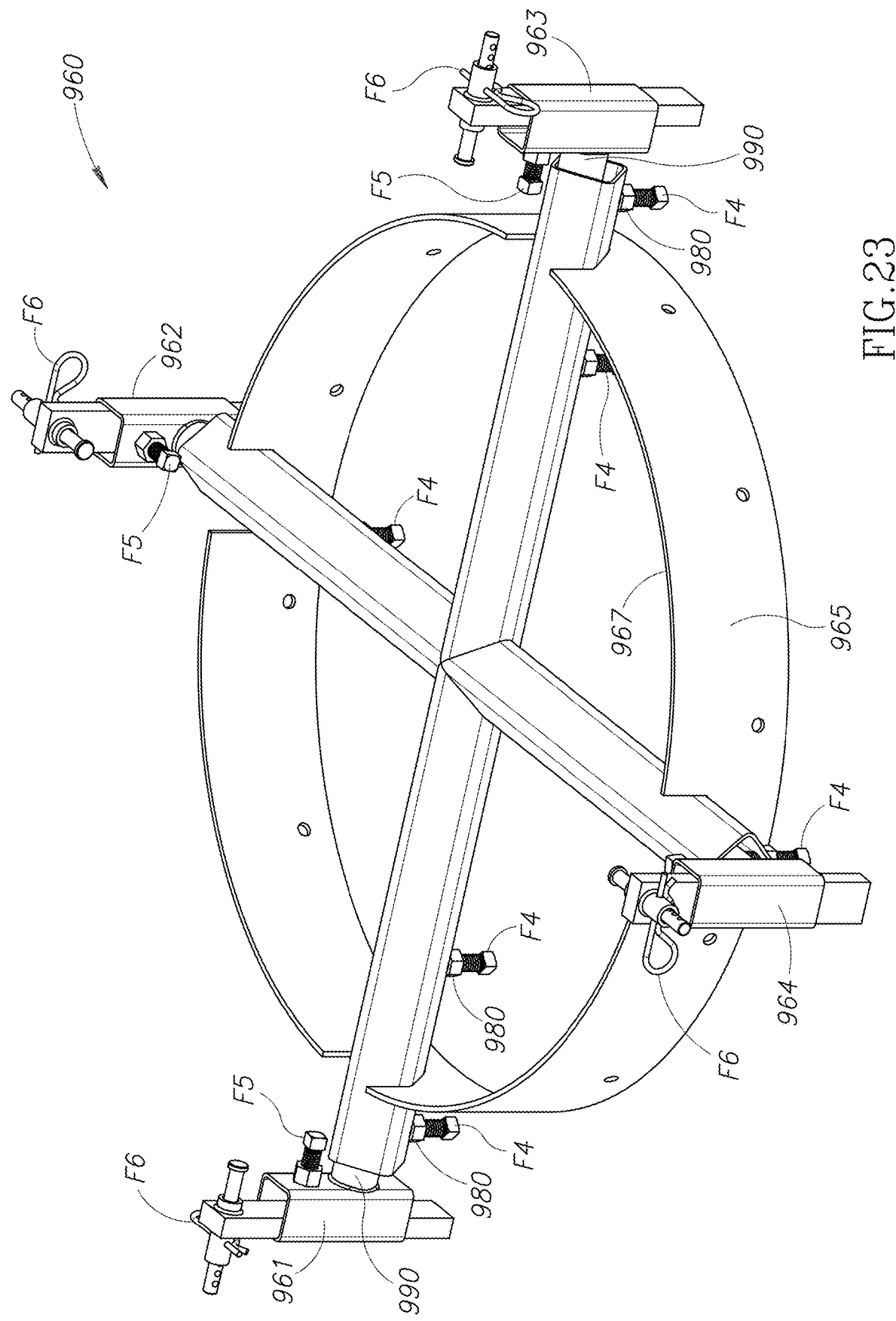
FIG. 23 is a perspective view of the support bracket assembly including a support frame and a plurality of mounting assemblies.
Figure 24:
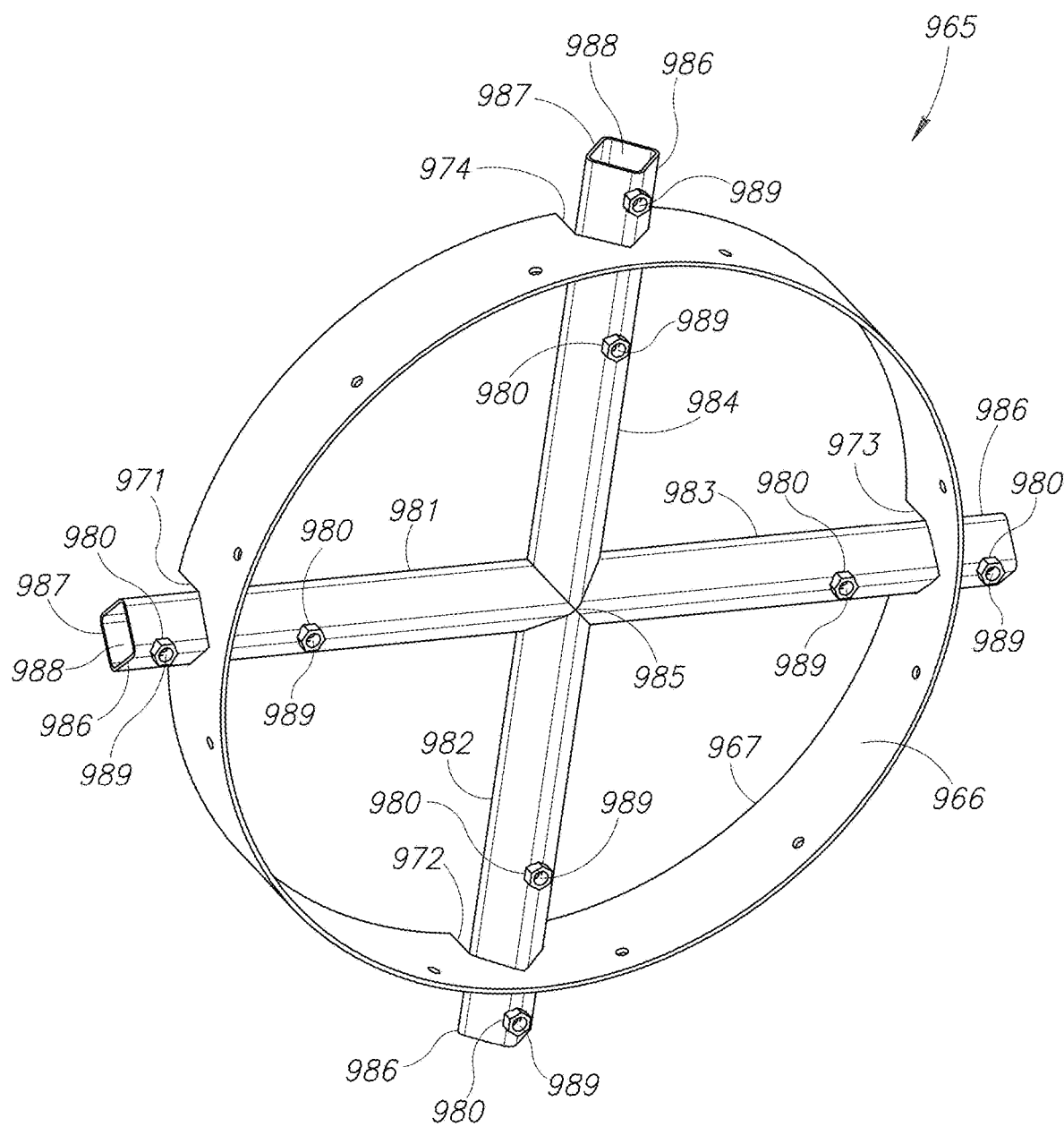
FIG. 24 is a perspective view of an underside of the support frame of the support bracket assembly.

Referring to FIG. 23, the support bracket assembly 960 has a plurality of mounting assemblies 961-964 coupled to a support frame 965. Referring to FIG. 24, the support frame 965 includes a ring-shaped wall 966 having an upper edge portion 967 configured to couple to the ring-shaped wall 940 (see FIGS. 21B and 22B) of the manhole cover 230G (see FIGS. 21A-22B, 31, and 32). Optionally, a seal (not shown) may be positioned between the walls 940 and 966. The ring-shaped wall 966 includes slots or cutouts 971-974 that extend downwardly from the upper edge portion 967.

The support frame 965 includes a plurality of elongated frame members 981-984 that extend outwardly from a center portion 985. The frame members 981-984 are substantially identical to one another. The frame members 981-984 extend from the center portion 985, through the cutouts 971-974, respectively, and are affixed to the ring-shaped wall 966 within the cutouts 971-974, respectively. The frame members 981 and 983 are aligned with one another longitudinally and are therefore collinear with one another. Similarly, the frame members 982 and 984 are aligned with one another longitudinally and are therefore collinear with one another. In the embodiment illustrated, inside angles of approximately 90 degrees are defined between adjacent ones of the frame members 981-984. However, this is not a requirement. Each of the frame members 981-984 has a free distal end 986 with an opening 987 into a longitudinally extending channel 988. Further, each of the frame members 981-984 has one or more transverse through-holes 989 that provide lateral access into the channel 988 of the frame member. Referring to FIG. 23, the through-holes 989 (see FIG. 24) are each configured to receive a fastener F4 (e.g., a set screw). In the embodiment illustrated, an outwardly extending threaded portion 980 surrounds each of the through-holes 989 (see FIG. 24). The threaded portions 980 each have inside threads aligned with the through-hole 989 (see FIG. 24) and configured to mate with outside threads formed on each of the fasteners F4. Thus, the fasteners F4 maybe threaded into and out of the through-holes 989 (see FIG. 24).

Referring to FIG. 23, the mounting assemblies 961-964 are substantially identical to one another. For the sake of brevity, only the mounting assembly 961 will be described in detail below. However, the like reference numerals have been used to identify substantially identical components of the mounting assemblies 961-964.

Figure 25:
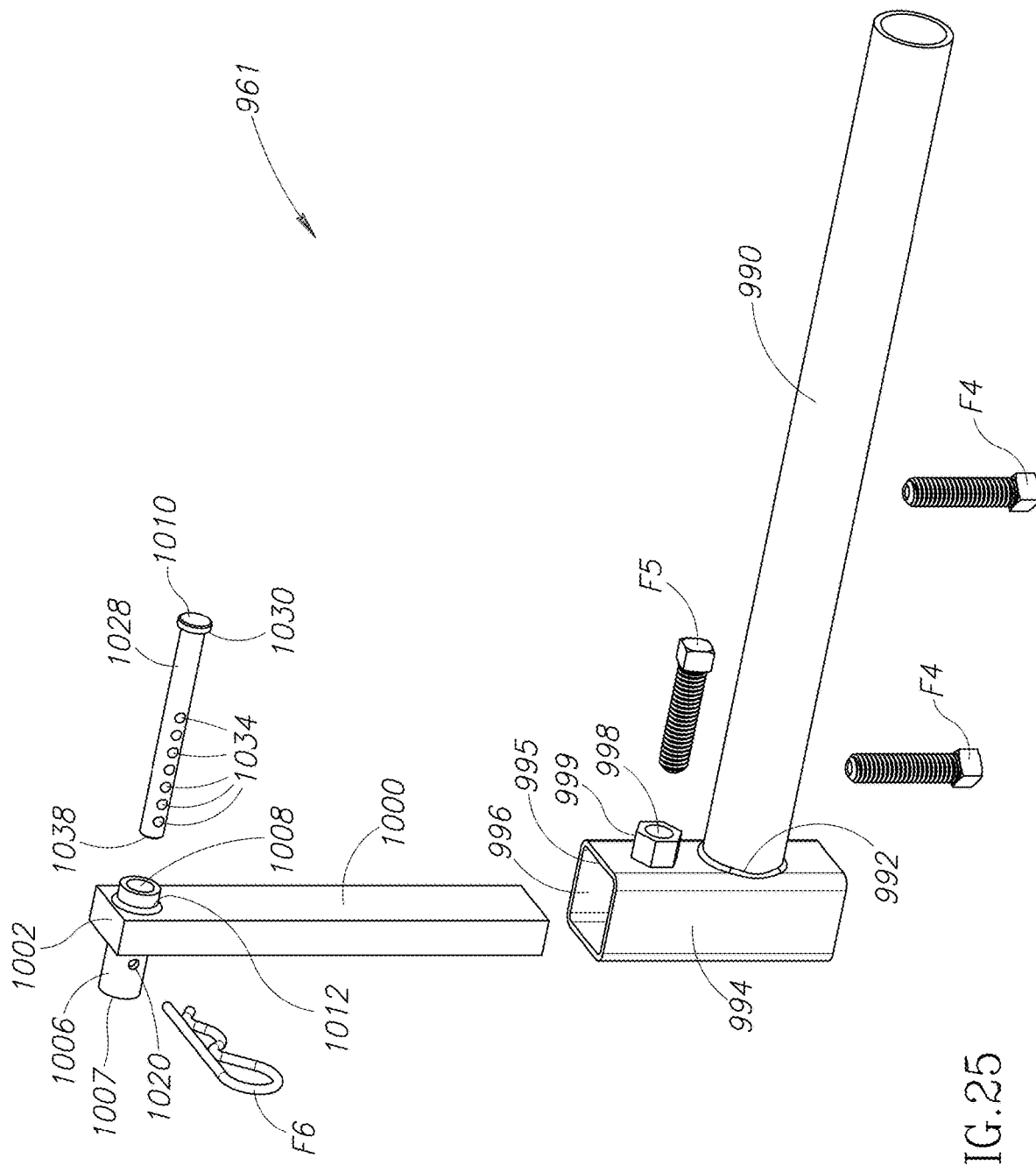
FIG. 25 is an exploded perspective view of one of the mounting assemblies of the support bracket assembly.

Referring to FIG. 25, the mounting assembly 961 has an elongated support member 990 configured to be received inside the channel 988 (see FIG. 24) of the frame member 981 (see FIG. 24) and to slide longitudinally (horizontally) therein. Thus, the support members 990 of the mounting assemblies 961-964 (see FIG. 23) may be characterized as telescoping (horizontally) with respect to the frame members 981-984 (see FIG. 23), respectively. Referring to FIG. 23, the fasteners F4 may be threaded into the through-holes 989 (see FIG. 24) and positioned therein to laterally engage the support members 990 and prevent the support members 990 from sliding within the channels 988 (see FIG. 24). In this manner, referring to FIG. 23, the fasteners F4 lock the (horizontal) position of the support members 990 of the mounting assemblies 961-964 with respect to the frame members 981-984, respectively.

Referring to FIG. 25, the support member 990 has a distal end 992 configured to be positioned outside the channel 988 (see FIG. 24) beyond the free distal end 986 (see FIG. 24) of the frame member 981. An upright support member 994 is coupled to the distal end 992 of the support member 990. The upright support member 994 has one or more sidewalls 995 that define a through-channel 996. At least one transverse through-hole 998 is formed in one of the sidewalls 995 and configured to provide lateral access into the through-channel 996. The through-hole 998 is configured to receive a fastener F5 (e.g., a set screw). In the embodiment illustrated, an outwardly extending threaded portion 999 surrounds the through-hole 998. The threaded portion 999 has inside threads aligned with the through-hole 998 and configured to mate with outside threads formed on the fastener F5. Thus, the fastener F5 may be threaded into and out of the through-hole 998.

The through-channel 996 is configured to receive an upright sliding member 1000 that is configured to slide within the through-channel 996 of the upright support member 994. Thus, the sliding member 1000 may be characterized as telescoping (vertically) with respect to the upright support member 994. The fastener F5 may be inserted into the through-hole 998 and positioned therein to laterally engage the sliding member 1000 and prevent the sliding member 1000 from sliding within the through-channel 996. In this manner, the fastener F5 may be used to lock the (vertical) position of the sliding member 1000 with respect to the upright support member 994.

The sliding member 1000 has an upper end portion 1002 with transverse tube-shaped member 1006 coupled thereto. The tube-shaped member 1006 has a through-channel 1008 formed therein configured to slideably receive a pin 1010. In the embodiment illustrated, the tube-shaped member 1006 traverses a through-hole 1012 formed in the upper end portion 1002 and is welded to the sliding member 1000. The tube-shaped member 1006 has an end face 1007 that faces away from the sliding member 1000. The tube-shaped member 1006 has a transverse through-hole 1020 that passes through the through-channel 1008 between the sliding member 1000 and the end face 1007. The through-hole 1020 provides lateral access into the through-channel 1008 and is configured to receive a fastener F6 (e.g., a cotter pin).

The pin 1010 has a body portion 1028 configured to slide within the through-channel 1008 and a head portion 1030 that is too large to enter and pass through the through-channel 1008. A series of spaced apart through-holes 1034 are formed in the body portion 1028. The pin 1010 may be characterized as telescoping (horizontally) with respect to the tube-shaped member 1006 and the sliding member 1000. As the body portion 1028 of the pin 1010 slides within the through-channel 1008 of the tube-shaped member 1006, a different one of the through-holes 1034 may be selectively aligned with the transverse through-hole 1020. Then, the fastener F6 may be inserted through the transverse through-hole 1020 and into the selected through-hole 1034 formed in the pin 1010. In this manner, the fastener F6 may be used to lock the position of the pin 1010 with respect to the tube-shaped member 1006 and the sliding member 1000. The body portion 1028 of the pin 1010 has a free distal end 1038 configured to be inserted into a hole 1040 (see FIG. 26B) drilled to sufficient depth (e.g., ¾ inch) in the inside surface 256G (see FIGS. 26A and 26B) of the ring support 250G (see FIGS. 21A, 21B, and 26).

Figure 26B:
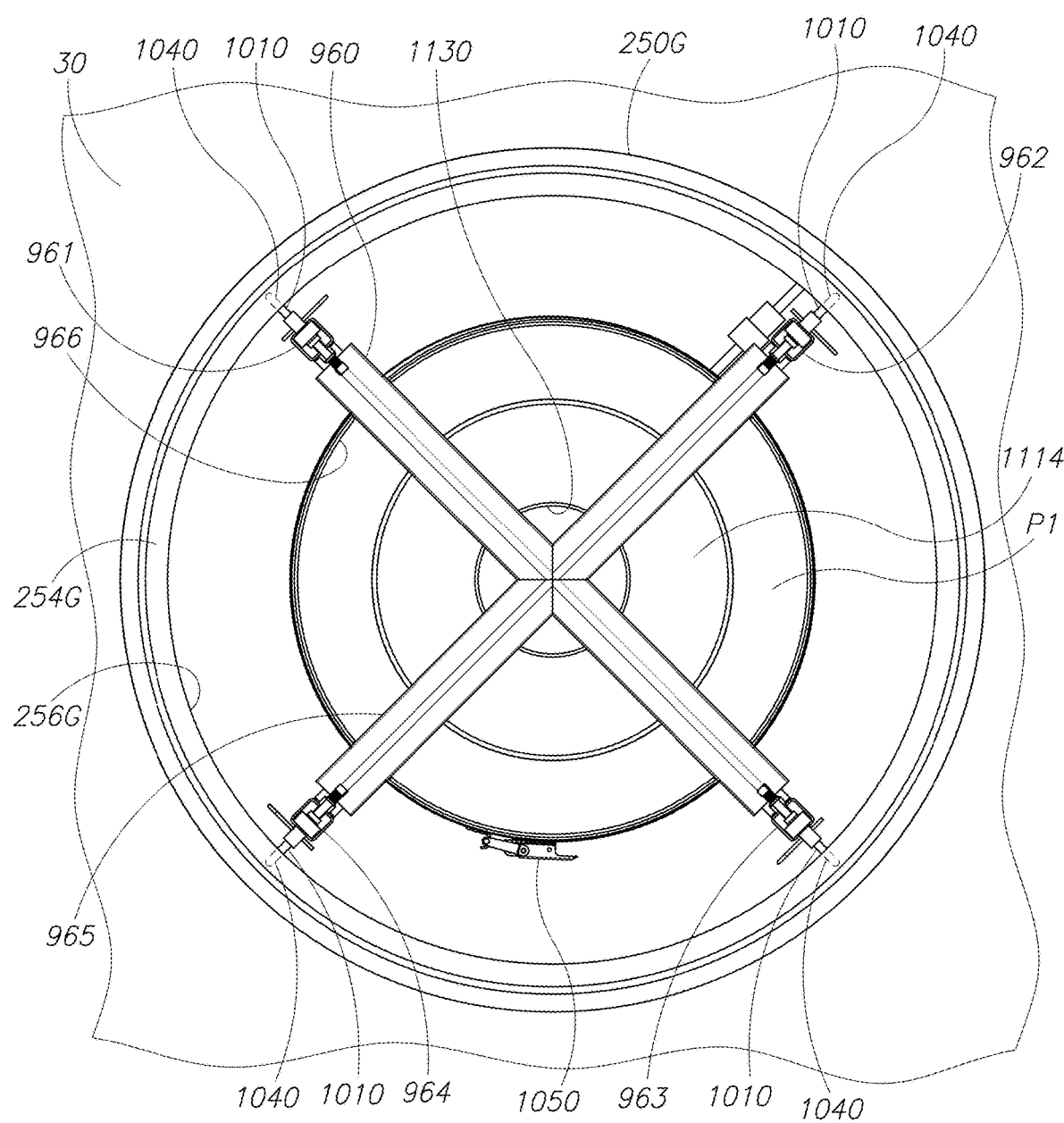
FIG. 26B is a top view of the fourth embodiment of the ventilation system with the manhole cover removed.

Referring to FIG. 26B, the support bracket assembly 960 is coupled to the ring support 250G by positioning the free distal ends 1038 (see FIG. 25) of the pins 1010 of the mounting assemblies 961-964 within the holes 1040 drilled in the inside surface 256G of the ring support 250G. Referring to FIG. 25, the fasteners F4-F6 may be loosened and/or removed and the positions of the support members 990, the sliding members 1000, and the pins 1010, respectively, adjusted so that the free distal ends 1038 of the pins 1010 mate with the holes 1040 (see FIG. 26B) drilled in the inside surface 256G of the ring support 250G. In this manner, the pins 1010 maintain the ring-shaped wall 966 centered within a diameter of the ledge 254G and locate the support bracket assembly 960 at a given height within the ring support 250G. By adjusting the positioning of the support members 990, the sliding members 1000, and the pins 1010 with respect to the support frame 965 (see FIGS. 23, 24, and 26), the support bracket assembly 960 may be configured for use with ring supports (like the ring support 250G) having different inside shapes and sizes as well as to conform to the holes 1040 (see FIG. 26B) that may be hand drilled and not be precisely located. This adjustability also allows the ring-shaped wall 966 to be centered, leveled, and/or height adjusted so that when the manhole cover 230G is installed, the upper edge portion 967 of the ring-shaped wall 966 is in contact or in near proximity with the ring-shaped wall 940.

The support bracket assembly 960 may be easy to install, operate, and remove. On initial installation, the telescoping features are utilized by an installation craftsmen (e.g., the worker 61 illustrated in FIGS. 1 and 3) to correctly position the ring-shaped wall 996 for mating with the ring-shaped wall 940. For example, the worker 61 (see FIGS. 1 and 3) may grasp one of the frame members 981-984, insert the support bracket assembly 960 into the ring support 250G via the manhole 62. Then, the worker 61 (see FIGS. 1 and 3) may adjust the support member 990 and the sliding members 1000 to place the end face 1007 of the tube-shaped members 1006 in contact with the inside surface 256G at each of the four holes 1040 (see FIG. 26B) drill therein. Then, the fasteners F4 and F5 (e.g., set screws) are tightened. The pins 1010 are slid into the holes 1040 (see FIG. 26B) as far as they will go and affixed with the fasteners F6 (e.g., cotter pins). To remove the support bracket assembly 960, all the fasteners F4 and F5 (e.g., set screws) may be left fully tightened such that the support bracket assembly 960 remains essentially rigid and fixed in configuration. Then, the fasteners F6 (e.g., cotter pins) and the pins 1010 may be removed freeing the support bracket assembly 960.

It may be beneficial to identity the rotational positional of the support bracket assembly 960 within the ring support 250G (e.g., by spray painting one of the frame members 981-984 and its immediate surroundings) before removing the support bracket assembly 960. This allows the support bracket assembly 960 to be installed without performing system alignment.

The support bracket assembly 960 may be configured to be durable. By way of non-limiting examples, the support bracket assembly 960 may be constructed from aluminum alloys, plated steel, stainless steel, fiberglass, etc.

Ventilation Pipe

As mentioned above, referring to FIG. 21B, the air moving assembly 914 includes the ventilation pipe 400. In the implementation illustrated, the ventilation pipe 400 includes the sections P1 and P2. However, alternate arrangements, such as those described above, may be used. In the implementation illustrated, the ventilator 410 is positioned between the sections P1 and P2. The section P1 may have a tapered shape and may be constructed from a rigid material (e.g., metal, fiberglass, PVC, and the like).

The section P2 may have a generally cylindrical shape. In the implementation illustrated, the section P2 is flexible and optionally configured to collapse (or function like a bellows) to be compacted (or collapsed) during installation, transport, and/or removal. For example, referring to FIG. 21A, the portion P2 may be collapsed to a relatively short length by hooking onto the second open end 442 (e.g., using a hook attached to a line or pole) and lifting the second open end 442 upwardly. The section P2 may be constructed from a durable fabric (e.g., neoprene coated polyester) that is chemically resistant, UV resistant, steam resistant, non-conductive, and/or water proof. The section P2 may be durable enough to withstand being dragged across the surface 30 and dropped thereupon.

In this embodiment, referring to FIG. 26A, the first open end 440 (which is positioned on an upper end of the section P1) is coupled to the support bracket assembly 960 (that is attached to the ring support 250G). In the embodiment illustrated, the first open end 440 is clamped (e.g., by a band or pipe clamp 1050) to the support bracket assembly 960.

In this embodiment, the section P1 omits the lower flange 402 (see FIGS. 8A and 8B). Similarly, the section P2 omits the upper flange 404 (see FIGS. 8A and 8B). Instead, the lower end 401 of the section P1 and the upper end 403 of the section P2 are both coupled to the ventilator 410. Referring to FIG. 21B, in the embodiment illustrated, the lower end 401 of the section P1 may be clamped (e.g., by a band or pipe clamp 1052) to the ventilator 410 and the upper end 403 of the section P2 may be clamped (e.g., by a band or pipe clamp 1054) to the ventilator 410.

Referring to FIG. 21A, the second open end 442 may be positioned near (e.g., at a predetermined distance from) the floor 58. In this manner, the ventilator 410 may expel air into and/or remove air from the vault 12 near the floor 58, which will circulate a portion of the internal atmosphere 104 (see FIG. 3) near the floor 58.

As discussed above, the ventilation pipe 400 may include the one or more second openings 448. For example, the section P2 may include a plurality of second openings 448 (e.g., the holes 449 depicted in FIG. 9A) formed in the wall(s) 430 (see FIGS. 5A, 5B, 19, and 20). The second openings 448 may be configured to allow ventilation to occur even as water level rises in the vault 12. The second openings 448 may have a uniform size and shape or be graduated (or variegated) to draw air from (or push air through) larger holes located lower in the vault 12. Further, one or more of the second openings 448 may be a slit or include a flap portion (like the flap portion 447 illustrated in FIG. 20) configured to remain closed until the water level rises.

Optionally, the ventilation pipe 400 may include the float assembly 412 (see FIG. 12). For example, the flange 680 (see FIG. 12) of the optional float assembly 412 (see FIG. 12) may be attached to or near the upper end 403 of the section P2 and the bellows 682 (see FIG. 12) may extend downwardly along the section P2. The second open end 442 may be positioned on the support block 686 (see FIG. 12). In such embodiments, one or more second openings 448 may be formed in the wall(s) 430 (see FIGS. 5A, 5B, 19, and 20) of the section P2 within the bellows 682. Referring to FIG. 20, each of the one or more second openings 448 may include the flap portion 447.

Alternatively, referring to FIG. 21A, the float subassembly 684 (see FIG. 12) without the other components of the float assembly 412 (see FIG. 12) may be coupled to the second open end 442. In such embodiments, the second open end 442 is not positioned on the support block 686 (see FIG. 12). Instead, the float subassembly 684 (see FIG. 12) raises and lowers the second open end 442 as the level of the flood water changes within the vault 12. In this manner, the float subassembly 684 maintains at least one second opening 448 above the water and in fluid communication with the internal atmosphere 104 (see FIG. 3) inside the vault 12. Referring to FIG. 20, each of the one or more second openings 448 may include the flap portion 447.

Figure 30:
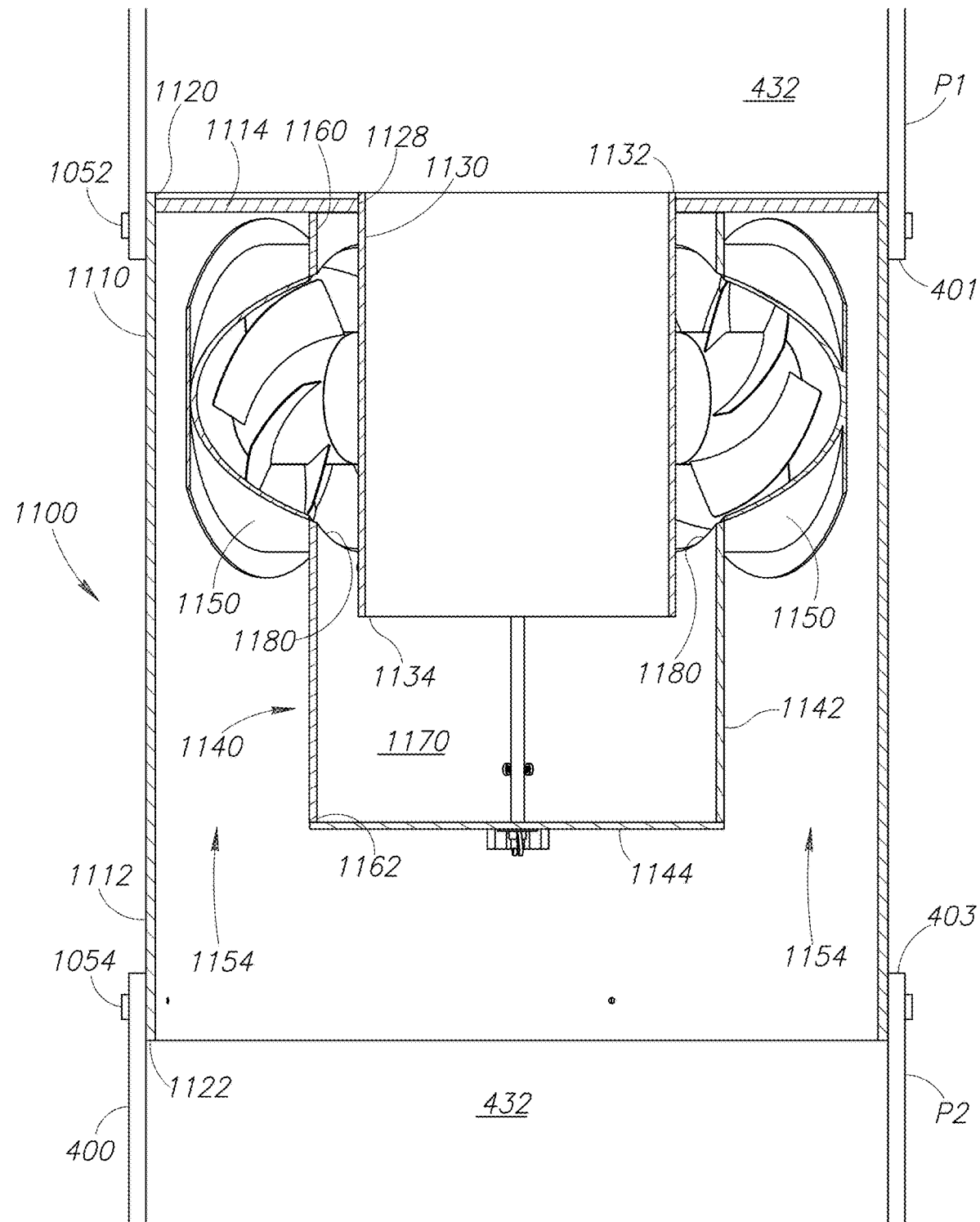
FIG. 30 is a cross-sectional view of the ventilator assembly taken through a line 30-30 in FIG. 27.

Referring to FIG. 30, the through-channel 432 of the ventilation pipe 400 is large enough to move a desired amount of air. As in other embodiments, referring to FIG. 21A, the ventilation pipe 400 may be configured to deliver air to and/or remove air from any location within the vault 12. For example, multiple second openings 448 may be formed in the ventilation pipe 400 at desired locations.

Ventilator Assembly

Figure 27:
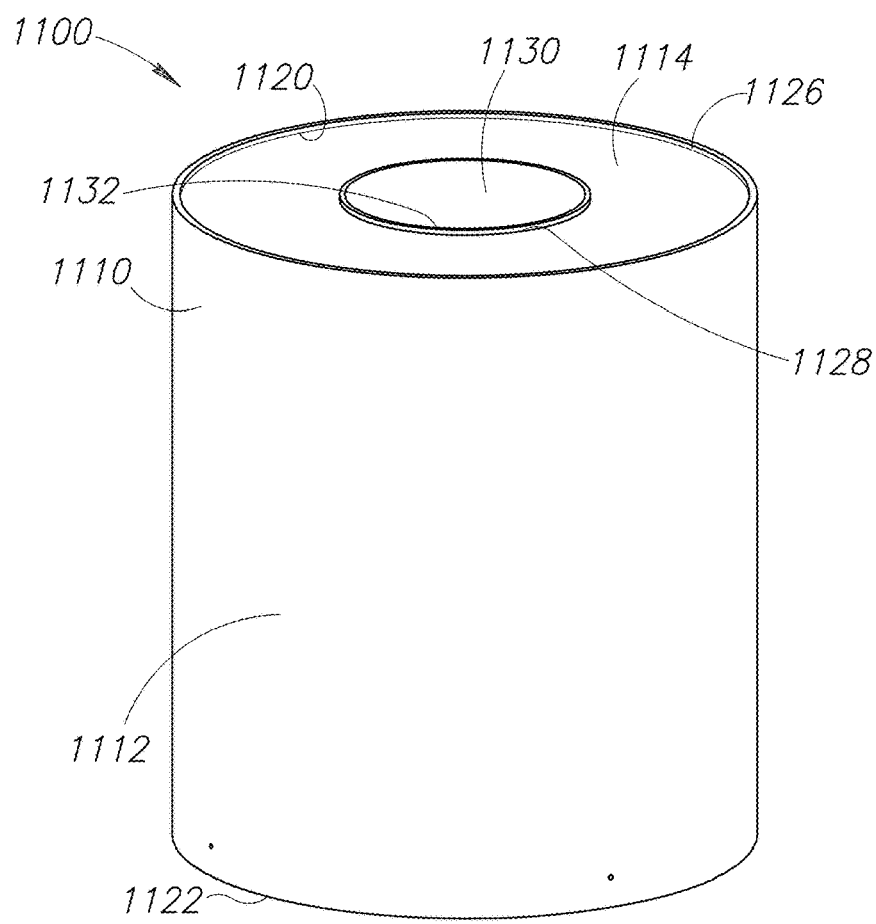
FIG. 27 is a perspective view of the ventilator assembly of the implementation depicted in FIG. 21A.

Referring to FIG. 21A, as mentioned above, in the ventilation system 910, the ventilator 410 may be implemented as the ventilator assembly 1100 illustrated in FIG. 27. Referring to FIG. 27, the ventilator assembly 1100 may be oriented to blow air from the external atmosphere 102 (see FIG. 3) into the internal atmosphere 104 (see FIG. 3) or vice versa.

As shown in FIG. 27, the ventilator assembly 1100 has an outer housing 1110 formed by a substantially hollow outer housing body 1112 and a housing cover 1114. The outer housing body 1112 has an open first end 1120 opposite an open second end 1122. Referring to FIG. 30, the open first and second ends 1120 and 1122 (see FIGS. 27 and 30) are each connected to the ventilation pipe 400 and in fluid communication with the interior through-channel 432 of the ventilation pipe 400. The open first end 1120 may be inserted inside the lower end 401 of the section P1 and coupled thereto by the pipe clamp 1052. Similarly, the open second end 1122 may be inserted inside the upper end 403 of the section P2 and coupled thereto by the pipe clamp 1054. In the embodiment illustrated, the outer housing body 1112 has a generally cylindrical outer shape with a generally circular cross-sectional shape.

Referring to FIG. 27, in the embodiment illustrated, the housing cover 1114 is generally planar and ring shaped. The housing cover 1114 is coupled to and partially closes the open first end 1120 of the outer housing body 1112. An airtight seal may be formed along a peripheral edge 1126 of the housing cover 1114 between the housing cover 1114 and the open first end 1120 of the outer housing body 1112. The housing cover 1114 has a central opening 1128.

An inner housing body 1130 extends into the outer housing body 1112 from the housing cover 1114. Referring to FIG. 30, the inner housing body 1130 has an open first end 1132 positioned inside the central opening 1128 of the housing cover 1114 and an open second end 1134 opposite the open first end 1132 positioned inside the outer housing body 1112. An airtight seal may be formed between the open first end 1132 of the inner housing body 1130 and the housing cover 1114 along the central opening 1128. In the embodiment illustrated, the inner housing body 1130 has a generally cylindrical outer shape with a generally circular cross-sectional shape. The open first end 1132 is in fluid communication with the interior through-channel 432 of the ventilation pipe 400.

Figure 28:
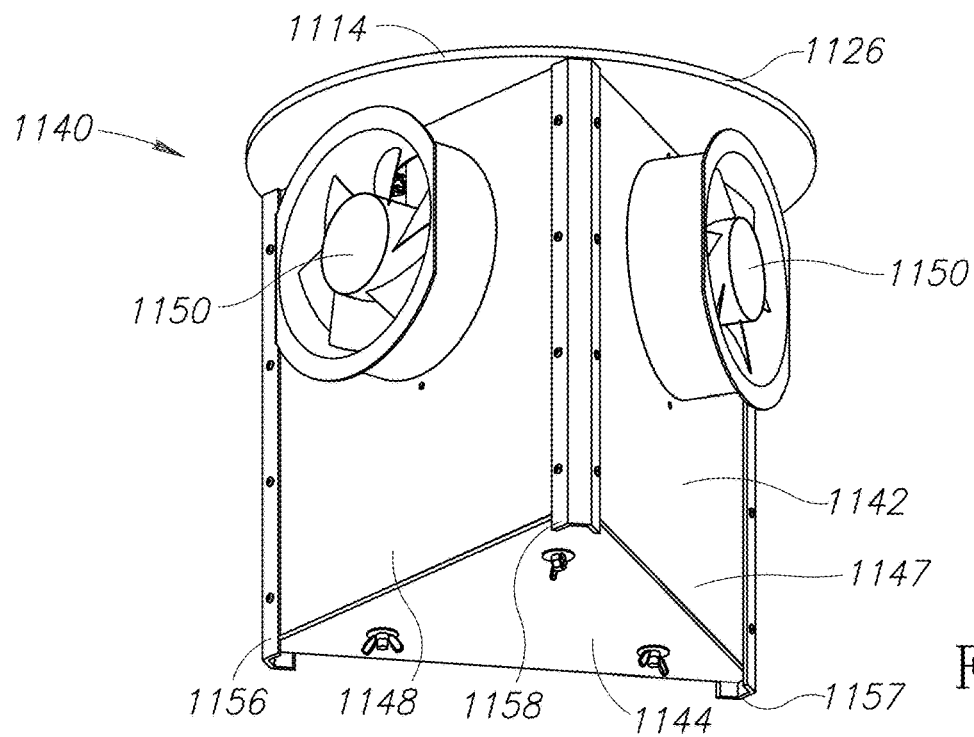
FIG. 28 is a perspective view of a fan assembly of the ventilator assembly of FIG. 27.

The ventilator assembly 1100 has a fan assembly 1140 housed inside the outer housing 1110. The fan assembly 1140 may be configured to generate sufficient airflow to completely replace the internal atmosphere 104 (see FIG. 3) with a portion of the external atmosphere 102 (see FIG. 3) within a predetermined amount of time (e.g., one day or one hour). Referring to FIG. 28, the fan assembly 1140 includes a fan housing 1142, a cover 1144, and one or more fan(s) 1150.

Figure 29:
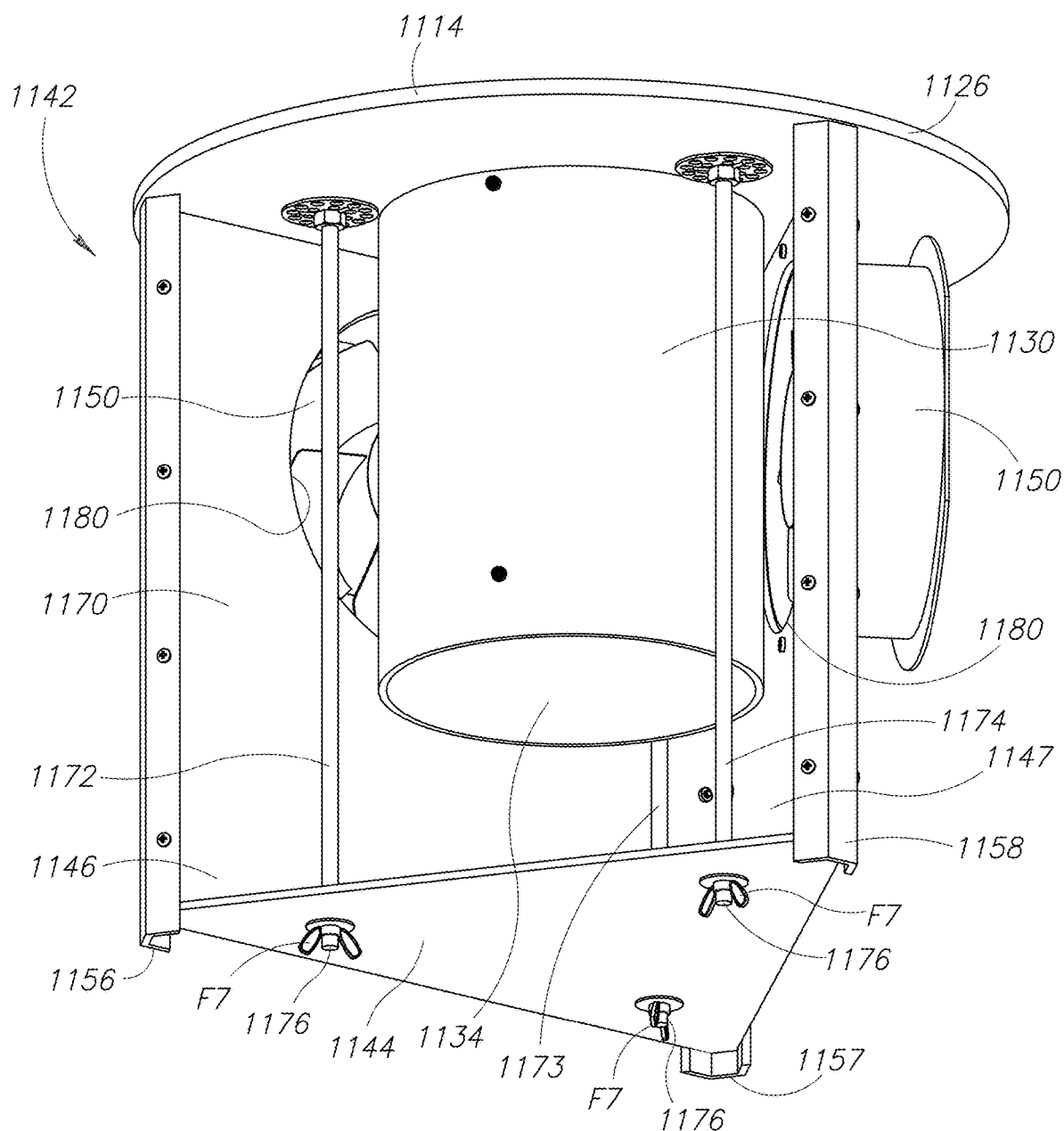
FIG. 29 is a perspective view of the fan assembly of FIG. 28 with one of its panels removed to reveal structures inside the fan assembly.

Referring to FIG. 30, the fan housing 1142 is positioned inside the outer housing body 1112 with one or more vertical air channels 1154 defined therebetween. Referring to FIG. 29, in the embodiment illustrated, the fan housing 1142 has a generally triangular cross-sectional shape defined by substantially planar panels 1146, 1147, and 1148 (see FIG. 28) coupled together along their edges by brackets 1156, 1157, and 1158. Referring to FIG. 30, as mentioned above, the outer housing body 1112 may have a circular cross-sectional shape. Thus, in the embodiment illustrated, the fan housing 1142 has a different cross-sectional shape than the outer housing body 1112. However, this is not a requirement.

The fan housing 1142 has an open first end 1160 opposite an open second end 1162. The open first end 1160 may be immediately adjacent the housing cover 1114. The housing cover 1114 protects or shields the fan(s) 1150 from debris and water falling through the ventilation pipe 400 from above the ventilator assembly 1100.

The inner housing body 1130 extends downwardly through the open first end 1160 part way through the fan housing 1142. The cover 1144 is coupled to and closes the open second end 1162 of the fan housing 1142. Thus, an internal chamber 1170 is defined within the fan housing 1142. The outer housing body 1112 extends beyond the inner housing body 1130 to position the open second end 1122 of the outer housing body 1112 away from the cover 1144.

Referring to FIG. 29, in the embodiment illustrated, rods 1172-1174 extend downwardly from the housing cover 1114 and through the internal chamber 1170. Distal ends 1176 of the rods 1172-1174 pass through the cover 1144. Fasteners F7 (e.g., wingnuts) are attached to (e.g., threaded onto) the distal ends 1176 and removably couple the cover 1144 in place.

One or more through-holes 1180 are formed in the fan housing 1142 between its open first and second ends 1160 and 1162. In the embodiment illustrated, a different through-hole 1180 has been provided for each fan 1150. Referring to FIG. 30, each fan 1150 is mounted on the fan housing 1142 and positioned to blow air into (or from) the internal chamber 1170 through the through-hole(s) 1180. In other words, referring to FIG. 30, the fan(s) 1150 effect an air exchange between the air channels 1154 and the internal chamber 1170. This air exchange causes air to flow into (or from) the open second end 1134 of the inner housing body 1130, which causes air exchange between the inner housing body 1130 and the interior through-channel 432 of the ventilation pipe 400 (via the open first end 1132 of the inner housing body 1130).

When the fan assembly 1140 is blowing air into the vault 12 (see FIGS. 1, 3-4B, 9A, 18, 19, 21A, 21B, 26A, and 32), that air travels from the external atmosphere 102 (see FIG. 3) through the manhole cover 230G (see FIGS. 21A-22B, 31, and 32) and into the ventilation pipe 400 (e.g., the section P1). Next, the air enters the open first end 1132 of the inner housing body 1130, flows through the inner housing body 1130, and exits therefrom into the internal chamber 1170. The fan(s) 1150 blow air through the through-hole(s) 1180 from the internal chamber 1170, through the air channels 1154, and out the open second end 1122 of the outer housing body 1112. The air exiting the open second end 1122 (see FIGS. 27 and 30) enters the ventilation pipe 400 (e.g., into the upper end 403 of the section P2). Referring to FIG. 21B, the ventilation pipe 400 conducts the airflow to the second opening 448 and the airflow enters the vault 12 via the second opening 448.

On the other hand, referring to FIG. 21A, when the fan assembly 1140 (see FIGS. 28 and 30) is blowing air (as exhaust) from the main chamber 52 of the vault 12, a portion ("exhausted air") of the internal atmosphere 104 (see FIG. 3) inside the main chamber 52 is pulled into the second opening 448 of the ventilation pipe 400. Referring to FIG. 30, the exhausted air flows into the open second end 1122 of the outer housing body 1112 from the ventilation pipe 400 (e.g., via the upper end 403 of the section P2), travels through the air channels 1154, and is blown by the fan(s) 1150 through the through-holes 1180 into the internal chamber 1170. Next, the exhausted air enters the open second end 1134 of the inner housing body 1130, flows therethrough, and exits its open first end 1132 into the ventilation pipe 400 (e.g., into the lower end 401 of the section P1). From that point, referring to FIG. 21A, the exhausted air travels through the manhole cover 230G and into the external atmosphere 102 (see FIG. 3).

Referring to FIG. 30, the ventilator assembly 1100 illustrated may be characterized as implementing a diving bell that helps protect the fan(s) 1150 when the vault 12 (see FIGS. 1, 3-4B, 9A, 18, 19, 21A, 21B, 26A, and 32) is at least partially filled with water. Air inside the outer housing body 1112 may exit therefrom through either the inner housing body 1130 or the open second end 1122 of the outer housing body 1112. Thus, when both the open second end 1122 of the outer housing body 1112 and the open second end 1134 of the inner housing body 1130 are submerged in water, any air trapped between the housing cover 1114, the inner housing body 1130, and the outer housing body 1112 cannot escape from inside the ventilator assembly 1100. Because the open second end 1134 of the inner housing body 1130 is positioned below the fan(s) 1150, the fan(s) 1150 are positioned within the trapped air and protected from being fully submerged in the event of a flood. Thus, expensive submersible fans are not required to implement the ventilator assembly 1100. Also, a complicated control system is not needed to shut-off the fan(s) 1150 during a flood event when the water reaches the ventilator assembly 1100.

While the ventilator assembly 1100 has been illustrated as including multiple fans 1150, some implementation may include a single fan. Further, while each fan 1150 has been illustrated as being an axial fan that uses blades (or propellers) to move air, alternate types of fans (e.g., centrifugal fans, radial fans, in-line radial fans, etc.) could be used. The fan(s) 1150 may be selected based on compatibility with the operating environment (which may include water, salt, steam, freezing temperatures, petrochemical exposure, life expectancy, spark-less motor, explosion proof, etc.) inside the vault 12 (see FIGS. 1, 3-4B, 9A, 18, 19, 21A, 21B, 26A, and 32). The fan(s) 1150 may be IP55 rated, dust protected, and/or water-jet protected. It may be desirable to implement the fan(s) 1150 with fans configured to have a working lifespan of at least a predetermined duration (e.g., about 50,000 hours) and/or to operate within a predetermined temperature range (e.g., about −30° C. to about 80° C.).

The fan(s) 1150 may be powered by alternating current ("AC"). By way of non-limiting examples, the fan(s) 1150 may be configured to operate within a voltage range of 100 VAC to 120 VAC, 200 VAC to 240 VAC, or 440 VAC to 480 VAC. When the fan assembly 1140 includes multiple fans 1150, they may be implemented as redundant fans powered by alternating current ("AC") in parallel. Alternatively, direct current ("DC") or three-phase AC power may be used to power the fan(s) 1150.

Figure 31:
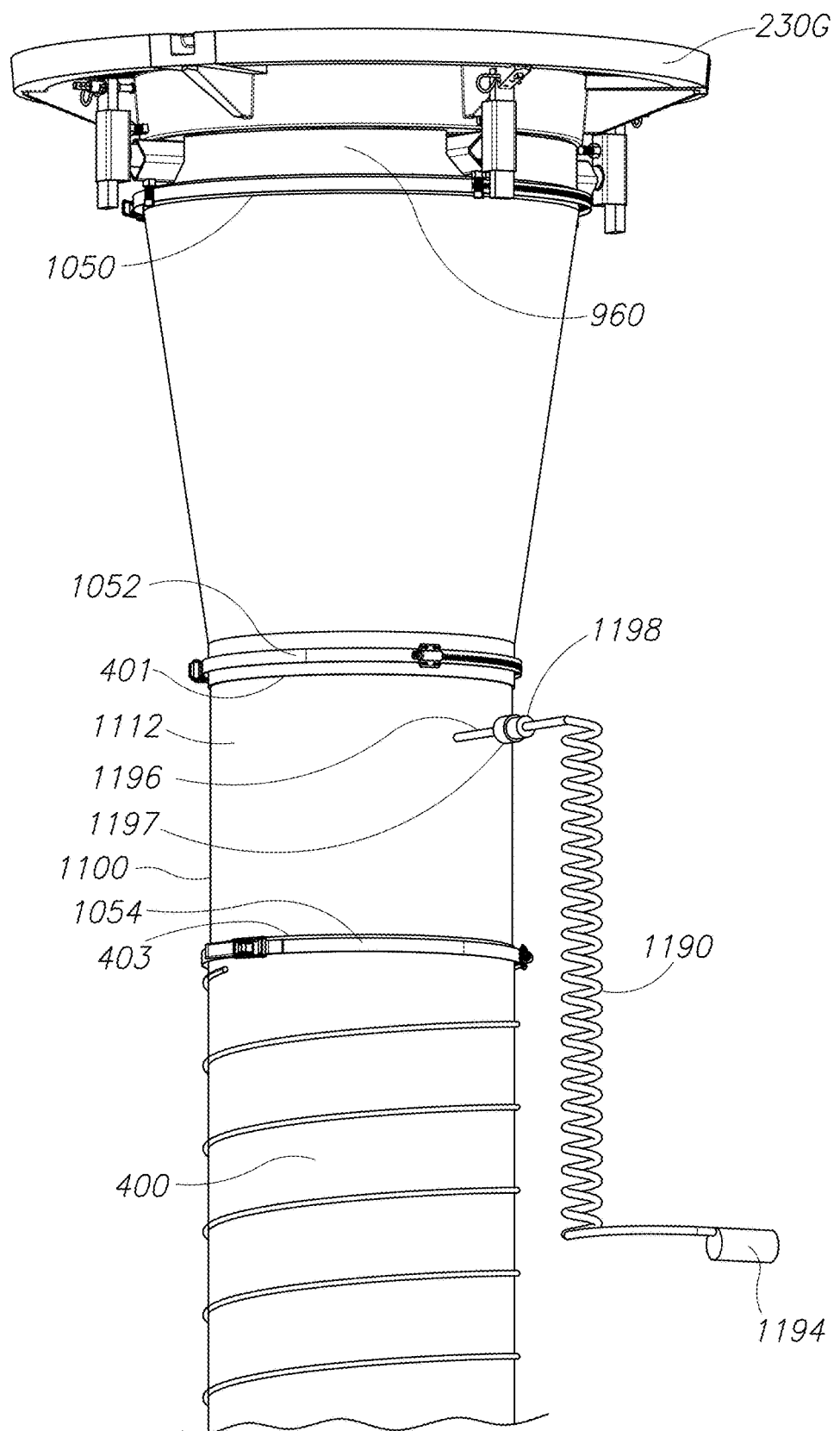
FIG. 31 is a side view of the implementation of the ventilation system depicted in FIG. 21A.

Referring to FIG. 31, power may be supplied to the ventilator assembly 1100 by a connection 1190 to a power source. The power source may be the cable 110 (see FIGS. 3, 21A, and 32), which may be configured to deliver 120 VAC, 240 VAC, or 480 VAC. In such implementations, the connection 1190 may include a splice 1194 onto the cable 110 (see FIGS. 3, 21A, and 32) or an inductive coil positioned alongside the cable 110. Alternatively, referring to FIG. 21A, if the vault 12 includes the wall plug/receptacle 1192, the connection 1190 (see FIGS. 21B and 31) may simply include a conventional power cord with a plug configured to mate with and receive power from the plug/receptacle 1192. By way of another non-limiting example, referring to FIG. 21B, the connection 1190 may draw parasitic power if no service voltage is available in the vault 12. Optionally, referring to FIG. 32, an inductive charging plate 1193 may be installed in the vault 12 (e.g., on the floor 58) and the connection 1190 (see FIGS. 21B and 31) may include an antenna 1195 configured to receive power from the inductive charging plate 1193. The antenna 1195 may extend (e.g., along the ventilation pipe 400) from the ventilator assembly 1100 toward the inductive charging plate 1193. The outer housing body 1112 (see FIGS. 27, 30, and 31) may provide connection points for the connection 1190 (see FIGS. 21B and 31).

In the embodiment illustrated in FIG. 31, the fan(s) 1150 (see FIGS. 28-30 and 33) are connected to and receive power via a wire or cord 1196 that extends outwardly from the outer housing body 1112 and terminates at a plug or power receptacle 1197. Alternatively, the cord 1196 may be housed inside the outer housing body 1112 and the power receptacle 1197 may be mounted on the outer housing body 1112. The connection 1190 has a plug 1198 configured to mate with and supply power to the power receptacle 1197. The connection 1190 receives power from the splice 1194 connected to the cable 110 as shown in FIG. 21A.

Referring to FIG. 31, the worker 61 (see FIGS. 1 and 3) may manually connect the plug 1198 of the connection 1190 to the power receptacle 1197. Optionally, one or both of the plug 1198 and the power receptacle 1197 may be magnetic to help maintain the connection therebetween and facilitate connecting the two components together.

Figure 32:
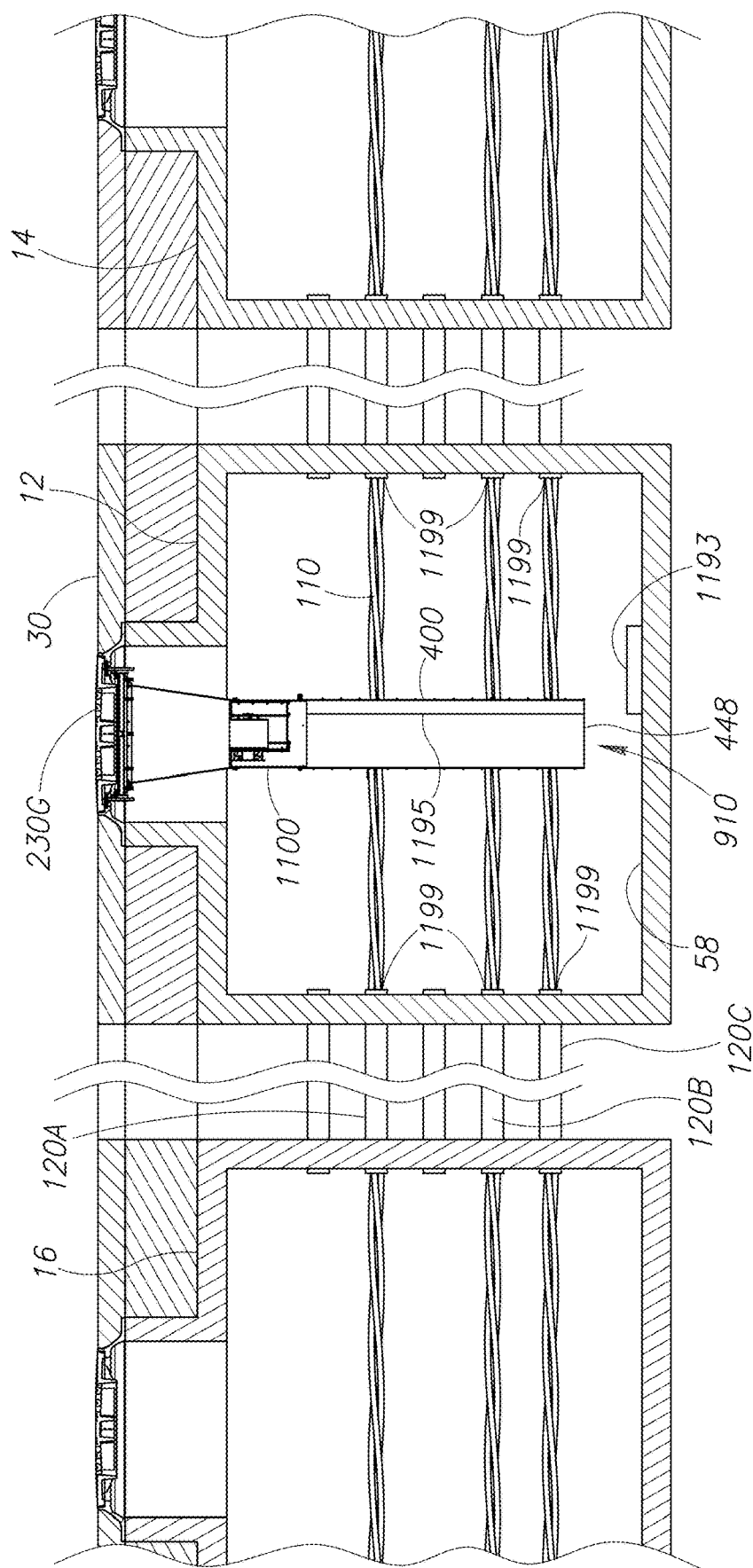
FIG. 32 is a side view of the implementation of the ventilation system depicted in FIG. 21A installed in one of a plurality of manhole vaults interconnected by a plurality of conduits.

FIG. 32 illustrates the ventilation system 910 installed in the vault 12. As shown in this figure, the ventilation system 910 may be used to pull air from neighboring vaults 14 and 16 (via the conduits 20A-20C) and/or push air into the neighboring vaults 14 and 16 (via the conduits 20A-20C). Thus, the ventilation system 910 need not be installed in every vault within a system (e.g., the system 10 illustrated in FIG. 1) to reduce manhole events. One or more second openings 448 may be positioned near the conduits 20A-20C. For example, the conduits 20A-20C may each have one or more openings 1199 into the vault 12 and one or more second openings 448 may be positioned near the opening(s) 1199 of one or more of the conduits 20A-20C.

Referring to FIG. 21A, while the ventilator 410 of the ventilation system 910 has been illustrated as being implemented by the ventilator assembly 1100 (see FIGS. 27 and 30-32), the ventilator 410 may alternatively be implemented by the in-line heater 500 (see FIGS. 8A, 8B, 9A, and 13A-13C) or the in-line fan 550 (see FIGS. 14A-14C). By way of additional non-limiting examples, the ventilator 410 may be implemented as a forced convection device, a powered bellows, a compressor, a piston pump, a piston ventilator, an in-line pump, a fan, a blower, a cartridge heater, a coil heater, or a heat-generating device configured to provide passive heating, such as a transformer, generator, compressor, and the like. It is also contemplated that a redundant system employing more than one type of air moving device (e.g., both the in-line fan 550 and the in-line heater 500) may be advantageous in particularly critical applications. Further, more than one air moving device of the same type may be used.

While the ventilator assembly 1100 (see FIGS. 27 and 30-32) has been illustrated as being a component of the ventilation system 910, the ventilator assembly 1100 may alternatively be used to implement the ventilator 410 of the ventilation system 210 illustrated in FIG. 4A or the ventilation system 710 illustrated in FIG. 18.

Optional Debris Catcher

Figure 33:
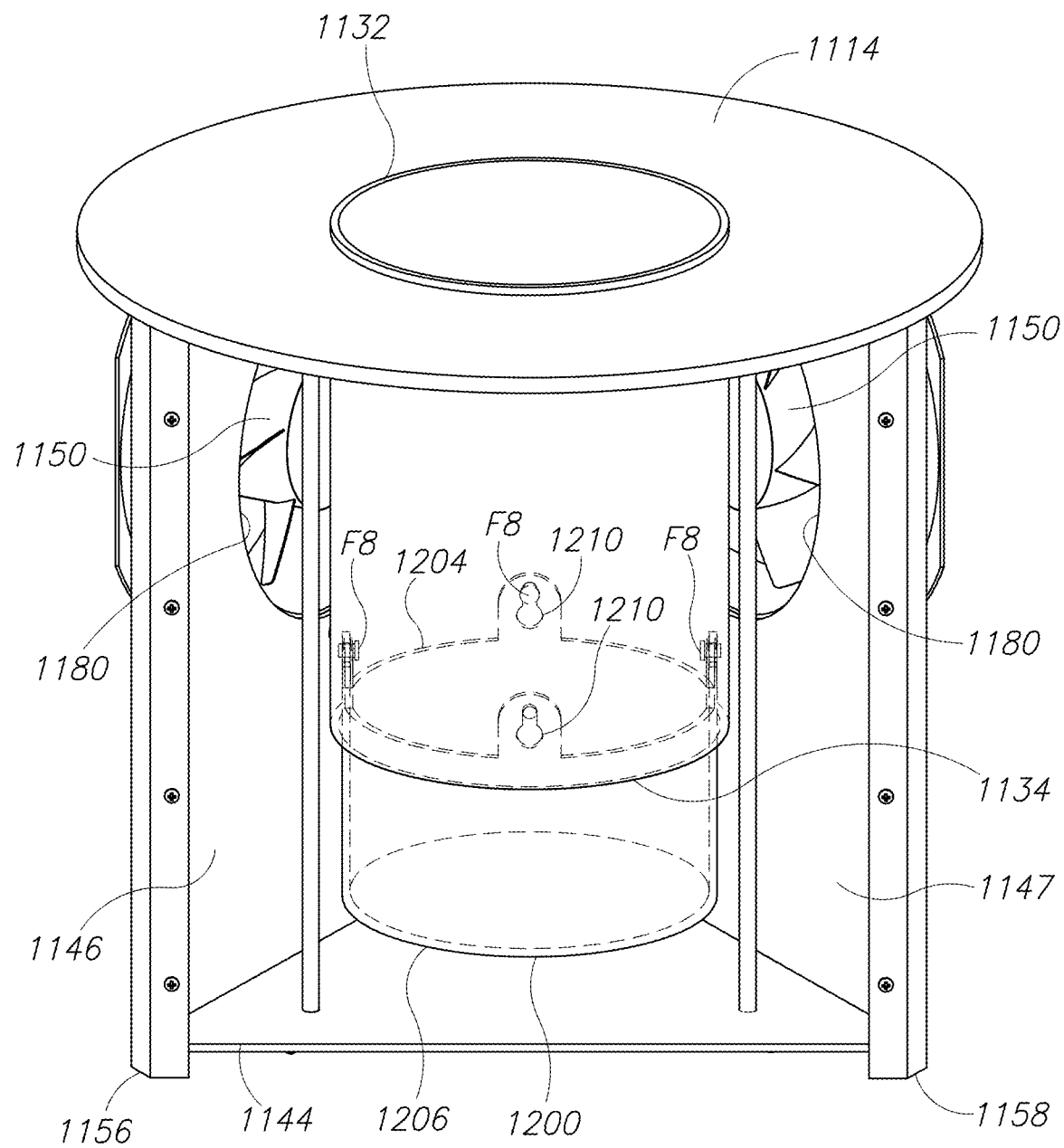
FIG. 33 is a perspective view of the fan assembly of FIG. 28 with one of its panels removed including an optional debris catcher.

Referring to FIG. 33, an optional debris catcher 1200 may be coupled to the inner housing body 1130 and positioned to catch debris falling from the open second end 1134 of the inner housing body 1130. The debris catcher 1200 is configured to catch and store dirt, garbage, and other debris that enters the ventilation system 910 (see FIGS. 21A, 21B, and 32) from the surface 30 (see FIGS. 1, 3-6C, 9A, 9B, 18, 19, 21A, 26A, and 32). In the embodiment illustrated, the debris catcher 1200 is generally bucket shaped and has an open first end 1204 opposite is closed second end 1206. The open first end 1204 is positioned to receive debris falling from the open second end 1134 of the inner housing body 1130. The debris catcher 1200 may include through-holes 1210 configured to receive fasteners F8 (fasteners) that removably couple the debris catcher 1200 to the inner housing body 1130. The worker 61 (see FIGS. 1 and 3) may empty the debris catcher 1200 whenever the ventilator assembly 1100 is removed from the vault 12 (see FIGS. 1, 3-4B, 9A, 18, 19, 21A, 21B, 26A, and 32).

Experimental

In a first series of experiments, several vented manhole cover configurations were evaluated with respect to ability to clear a contaminated gaseous composition from a simulated manhole vault, as follows.

Test Apparatus

Figure 34:
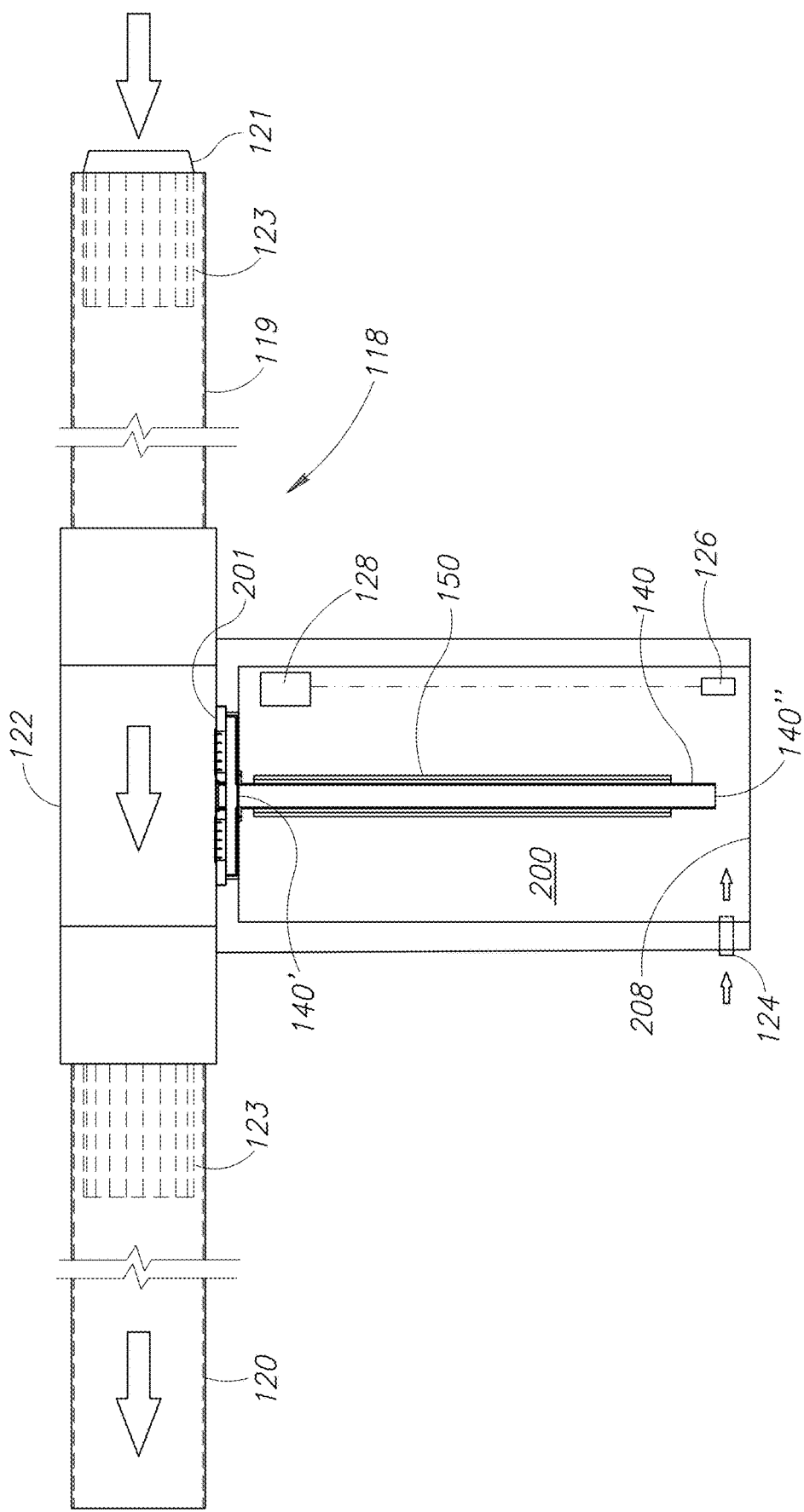
FIG. 34 is a section view of a test apparatus used to evaluate various manhole cover designs.

A test apparatus simulating a typical manhole vault was first fabricated and is shown in schematic fashion in FIG. 34. This figure illustrates the case wherein a heated exhaust pipe and a manifold were employed, as in Assembly 4, described below. A wind tunnel 118 comprising a first duct 119 having a diameter of 20 inches and containing a plurality of 2 inch-diameter cardboard tubes 123 disposed therein in a close-packed configuration with all axes in parallel, was connected to the entrance side of a 2 foot tall manhole test chamber 122. Air was forced through the first duct 119 by a variable speed fan 121, as indicated by the large left-pointing arrow. A similar second duct 120, which also contained the small tubes 123, was connected to the exit side of the test chamber 122. In each case, tubes 123 assured an essentially laminar air flow within chamber 122. Test chamber 122 was mounted atop a plywood manhole vault 200 having the dimensions 4 feet wide, 4 feet long, and 8 feet tall, wherein joints were covered with caulk and tape to prevent gas from escaping in an uncontrolled manner.

Air flow from fan 121 provided a simulated wind, which passed over the surface of a 32 inch diameter test manhole cover 201, wherein the latter rested on a ledge in an opening at the bottom of the test chamber 122. In some of the experiments, a first end 140' of a 4" Sch. 10 steel exhaust pipe 140 was sealably connected to a corresponding port in the test manhole cover 201 (i.e., either directly, or with the aid of a manifold as illustrated). When used, the exhaust pipe 140 was wrapped with electrical heating tape substantially along its entire length (with an overlayer of fiberglass insulation; not shown) to provide an in-line heater 150. The second (intake) end 140" of the pipe 140 was positioned approximately 9 inches above the floor 208 of vault 200. A 4-inch diameter gas inlet pipe 124 near the bottom of vault 200 was used to introduce a heavier-than-air gaseous composition into the vault. Concentration of this simulated contaminant was quantitatively monitored with the aid of a helium-neon laser source 126, mounted at floor level, and a light meter 128, mounted near the ceiling of the vault 200 and in alignment with the laser source 126.

Procedure

In order to evaluate the ventilation efficiency of various manhole cover designs the above described manhole vault 200 was filled with a heavier-than-air gaseous composition and the time required to clear essentially all of this composition from the vault was determined under different simulated wind conditions, the shortest clearing time being most preferred. In these tests, the gaseous composition consisted of a commercial "Halloween Fog," made from a solution of a glycol and water, this being delivered via gas inlet pipe 124 by a commercial household fog machine following the manufacturer's instructions. During a typical test, the voltage output signal of the light meter 128 was recorded continuously by a data acquisition unit, this value being inversely proportional to the fog density or directly proportional to the atmospheric clarity. As the fog cleared, this signal gradually increased until it stabilized for about 10 minutes at a maximum reading, this being designated as a cleared vault condition, which was also verified visually. Using the above described apparatus, four different manhole cover assembly configurations were evaluated with respect to vault clearing time, wherein each manhole cover was a wooden mock-up of the particular design being tested:

Assembly 1 (control) was the conventional vented manhole cover 70 employed by ConEd of NY (see Background of the Invention). As shown in FIG. 2, this cover 70 had twelve vent holes 72 circumferentially disposed every 30 degrees near the periphery thereof, and twelve such holes 72 disposed closer to the center of the cover, also every 30 degrees. Each hole 72 had a diameter of 1⅛ inch. This control did not include a manifold, the exhaust pipe 140, or heater 150.

Assembly 2 was the same as Assembly 1 but included the heated exhaust pipe (i.e., pipe 140 and heater 150) connected to a manifold attached to the underside of the manhole cover 70, the manifold encompassing the inner holes 72 shown in FIG. 2.

Assembly 3 was essentially the design depicted in FIGS. 10A-10F (i.e., including the manhole cover 230F, the round vent hole caps 652F, and the exhaust passage cap 280), which also included the exhaust pipe 140 with heater 150.

Assembly 4 was essentially the design depicted in FIGS. 8A-8I (i.e., including the manhole cover 230D, the vent hole caps 652D and the exhaust hole caps 653D), which also includes the heated exhaust pipe.

In experiments wherein the exhaust pipe 140 was fluidly connected to the manhole cover being tested, it was heated by passing 110V electric current through a heating cable (heater 150) wrapped around the exhaust pipe 140 which was overlaid with fiberglass blanket insulation, as described above. The temperature of the pipe was controlled at 30° C. above ambient temperature before each test was started.

Figure 35:
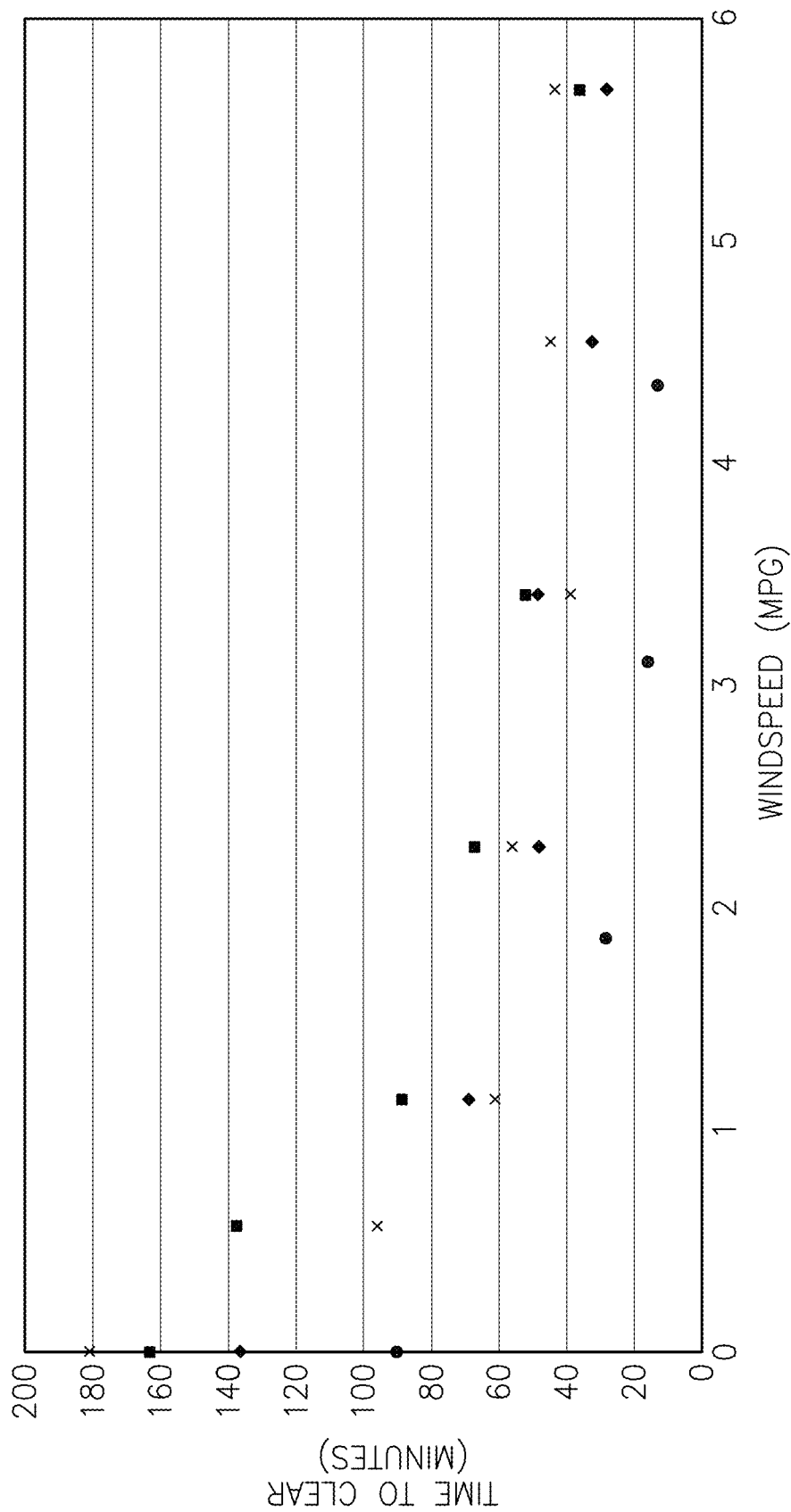
FIG. 35 is a plot of the time needed to clear a heavier-than-air vapor from the vault of the apparatus shown in FIG. 34 as a function of wind speed over various manhole cover designs.

The results of evaluations of the artificial fog clearing efficiency of the above assemblies at various wind speeds is shown in FIG. 35, wherein the following symbols are used: x=Assembly 1; ♦=Assembly 2; ■=Assembly 3; and •=Assembly 4. From this figure, it can be seen that, even though Assembly 1 (the control vented manhole cover without the heated pipe) can sometimes clear the vault in less time than the other systems evaluated when wind velocity is increased, all the assemblies which also employed the heated pipe according to the present invention provided significantly shorter clearing times in still air (i.e., wind speed=0). It is particularly noted that Assembly 4 according to the first preferred embodiment of the manhole cover had a "still air" clearing time about half that of the control.

Figure 36:
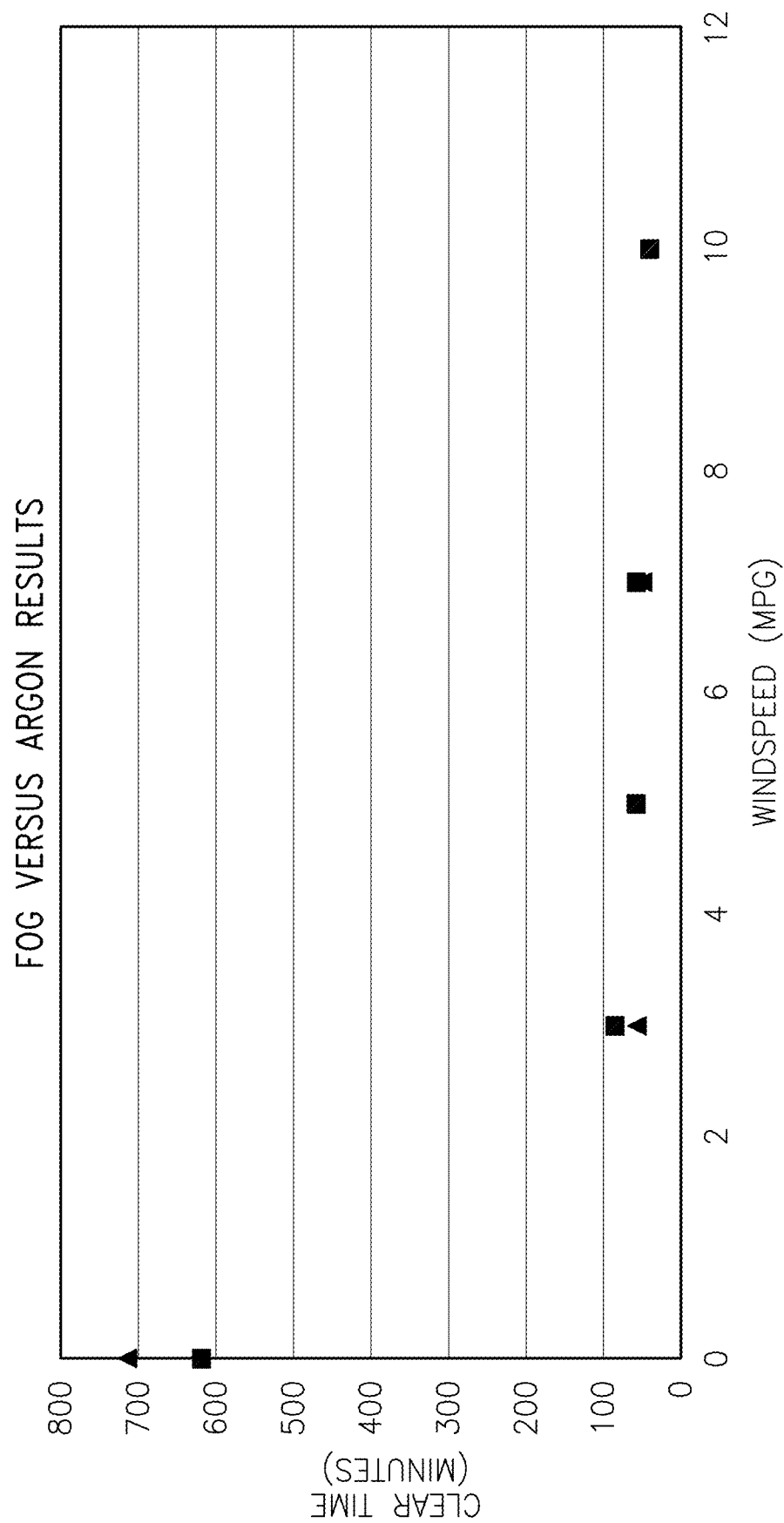
FIG. 36 is a plot comparing clearing times for argon and artificial fog in the apparatus shown in FIG. 34 as a function of wind speed over manhole cover Assembly 2.

As a verification that the above mentioned laser source 126 and light meter 128 produced reliable measures of the concentration of a heavier-than-air gas, separate evaluations using argon as the test gas were carried out wherein the concentration of oxygen was detected with electronic oxygen sensors placed at various points in the vault. In these tests, exhaust pipe 140 was not heated and the openings of cover Assembly 2 were first covered with tape. Argon was fed into the vault 200 through gas inlet pipe 124 until the oxygen concentration was below two volume percent at a sensor mounted on a wall approximately 1 inch above the floor. At time zero of the test, the test manhole cover was unsealed (i.e., the tape was removed from all holes in the manhole cover) and the ventilation system was engaged. The test was terminated when the oxygen concentration reached 20.9%, consistent with the atmosphere outside the chamber. FIG. 36 compares clearing times for argon gas (▲) and the above-described fog (■) using the cover of Assembly 2. It can be seen that the trend of the two tests is similar, but the argon clearing time without external wind is somewhat greater than that of the fog test, again demonstrating the difficulty of removing heavier-than-air gases in a windless environment. These evaluations confirm that the artificial fog is a good surrogate for argon and other heavier-than-air gases.

In a second series of experiments, the above described plywood manhole vault 200 was fitted with a wooden test manhole cover similar to the vented manhole cover 70 shown in FIG. 2, but having a 4 inch diameter central hole in addition to the twenty-four 1⅛ inch holes already present. The cover was cut into two semi-circular halves to allow a 2 foot-long heated (and insulated) aluminum pipe section having a flange at each end thereof, as shown in FIGS. 13A-13C (i.e., in-line heater 500) to be clamped within the central hole when the two halves of the cover were pushed together. The in-line heater 500 was thus supported from the cover by its top flange. Four-inch diameter PVC exhaust pipe sections having various lengths were connected to the lower flange of the in-line heater 500, and centered in the vault 200 to provide assemblies in which the exhaust pipe inlet height above the floor 208 of the vault 200 was set at the values indicated in the left column of Table 1, below. In this table, "zero" height above the floor indicates that the intake end 140" rested on the floor 208 and an approximately 1/16 inch gap for gas remained between this end and the floor due to the rough cut of exhaust pipe 140. Provision was made for the introduction of argon gas into the vault via a tube which distributed the gas to diffusers placed on the floor of the vault at various locations. A fuel cell-based oxygen sensor (Class R-17S, Teledyne Analytical Instruments) was placed in a corner of the vault approximately one inch above floor level and a signal therefrom was directed to an oxygen meter (MiniOx® I, MSA Medical Products) which displayed the oxygen concentration directly. A webcam recorded the oxygen meter's reading every second, and saved the resulting video to a computer.

In a typical procedure, a particular length of exhaust pipe was attached to the in-line heater and tested as follows. The vault was closed, the in-line heater 500 temperature was set and maintained at 60° C., and the webcam was turned on. All these tests were carried out without the above described simulated wind (i.e., with still air above the test manhole cover). Argon was fed into the vault until the oxygen sensor indicated 1.5% oxygen, whereupon gas flow was stopped and a ventilation test begun (time=0). Ventilation of the vault 200 via the exhaust pipe/in-line heater combination was continued until the oxygen concentration indicated by the sensor reached at least 20.5%, after which the webcam video was screened manually, with data being transcribed every 15 minutes. In addition to these ventilation tests using various lengths of the exhaust pipe, two control tests were also run wherein only the in-line heater was suspended from the manhole cover, but the latter was not heated. In the first control (CO), the central hole of the manhole cover was blocked while the 24 smaller holes remained open. This configuration is similar to the above mentioned vented manhole cover employed by ConEd. In the second control (CC), both the central hole as well as all of the smaller holes were covered with a rubber mat.

The oxygen concentration was plotted as a function of time for each pipe length tested, as well as for the two controls. The end point of the test was the time at which the oxygen concentration was above 20.5% and the derivative of the concentration-time curve was essentially zero. The ventilation results so obtained were then ranked based on the calculated area under the concentration-time curve for each condition tested, wherein the open control (CO) result served as a basis for comparison. Thus, the ratio of the area under the (CO) control curve to the area under the curve for a given exhaust pipe length was calculated and designated the "Clearing Ratio." This ratio is reported in the right column of Table 1, wherein higher values indicate more effective removal of the heavier-than-air argon from the lower regions of the vault. It should be apparent that the clearing ratio for the open control (CO) is 1.00 by definition.

From Table 1 it is seen that the preferred pipe inlet height for clearing the argon most efficiently was 6 inches off the floor and the preferred range is 0 to 36 inches off the floor, wherein the clearing ratio is greater than 1 (i.e., the open control). Surprisingly, vent systems wherein the exhaust pipe inlet was 48 to 72 inches above floor level were even less effective than the open control, indicating that some venting systems can actually hinder ventilation of heavier-than-air gases.

TABLE 1

| Height of Exhaust Pipe Inlet Above Floor (inches) | Clearing Ratio |
|---|---|
| "0" | 2.00 |
| 3 | 2.01 |
| 6 | 3.16 |
| 9 | 2.42 |
| 12 | 2.11 |
| 24 | 2.13 |
| 36 | 1.32 |
| 48 | 0.58 |
| 60 | 0.65 |
| 72 | 0.68 |
| Closed Control | 0.74 |
| Open Control | 1.00 |

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A system for use with a manhole vault and an external atmosphere outside the manhole vault, the manhole vault having an interior and a manhole opening providing access to the interior from outside the manhole vault, the interior containing an internal atmosphere, at least one undesired gas, and an alternating current ("AC") power source, the system comprising:

a manhole cover configured to be positioned within the manhole opening, the manhole cover having top and bottom surfaces with one or more through-holes extending therebetween, each of the one or more through-holes being in fluid communication with the external atmosphere at the top surface;

a ventilation pipe having a first opening, a second opening, and an interior through-channel that extends between the first and second openings, the first opening being positioned proximal to at least a selected one of the one or more through-holes at the bottom surface of the manhole cover when the manhole cover is positioned within the manhole opening and the ventilation pipe is positioned inside the manhole vault, the second opening being positionable in the interior of the manhole vault, the interior through-channel being configured to provide fluid communication between the internal atmosphere and the at least one selected through-hole in the manhole cover; and an air moving device connectable to the AC power source in the interior of the manhole vault, the system being separate from the AC power source, the air moving device being configured to operate in a manhole environment when the air moving device is positioned entirely inside the interior of the manhole vault and is powered by AC power drawn from the AC power source, the manhole vault having a neck connected to a main chamber, the neck comprising the manhole opening that provides access to the interior from outside the manhole vault, the main chamber comprising a ceiling, the air moving device being connected to the ventilation pipe at a location that positioned the air moving device at least partially below the ceiling of the main chamber when the air moving device is operating inside the interior of the manhole vault, operation of the air moving device inside the interior of the manhole vault creating a flow comprising a portion of a first atmosphere of the interior and external atmospheres, the flow flowing through the interior through-channel of the ventilation pipe toward a different second atmosphere of the interior and external atmospheres, the flow causing a portion of the at least one undesired gas to exit the interior and enter the external atmosphere.

2. The system of claim 1, wherein the one or more through-holes comprise an exhaust hole,
the first atmosphere is the internal atmosphere,
the second atmosphere is the external atmosphere, and
the operation of the air moving device inside the interior of the manhole vault causing the portion of the internal atmosphere to enter the second opening of the ventilation pipe, flow through the interior through-channel of the ventilation pipe toward the external atmosphere, and exit the interior through-channel through the first opening, the portion exiting the first opening of the ventilation pipe entering the exhaust hole, traveling therethrough, and entering the external atmosphere.

3. The system of claim 2, wherein the one or more through-holes comprise a vent hole, and
the vent hole is configured to allow a portion of the external atmosphere to enter the interior of the manhole vault through the vent hole.

4. The system of claim 1, wherein the one or more through-holes comprise a vent hole,
the first atmosphere is the external atmosphere,
the second atmosphere is the internal atmosphere, and
the operation of the air moving device inside the interior of the manhole vault causing the portion of the external atmosphere to enter the vent hole, travel therethrough, and enter the first opening of the ventilation pipe, the portion entering the first opening of the ventilation pipe flowing through the interior through-channel of the ventilation pipe toward the internal atmosphere, exiting the interior through-channel through the second opening, and entering the internal atmosphere.

5. The system of claim 4, wherein the one or more through-holes comprise an exhaust hole, and
the exhaust hole is configured to allow a portion of the internal atmosphere to exit from the interior of the manhole vault through the exhaust hole.

6. The system of claim 1, wherein the one or more through-holes comprise a plurality of vent holes and a plurality of exhaust holes,
the plurality of vent holes are configured to allow a portion of the external atmosphere to enter the interior of the manhole vault through the plurality of vent holes, and
the plurality of exhaust holes are configured to allow a portion of the internal atmosphere to exit from the interior of the manhole vault through the plurality of exhaust holes.

7. The system of claim 6, wherein the top surface has a total surface area, and
at least 5% of the total surface area is occupied by the plurality of vent holes.

8. The system of claim 6, wherein the top surface has a total surface area, and
at least 5% of the total surface area is occupied by the plurality of exhaust holes.

9. The system of claim 1, wherein the air moving device comprises a heating device or a fan, or the heating device and the fan.

10. The system of claim 1, wherein the ventilation pipe comprises a plurality of different sections, and the air moving device is installable between two of the plurality of different sections.

11. The system of claim 1, further comprising:
a hole plug corresponding to each of the one or more through-holes, a fluid flow path being defined between each the hole plug and the top surface.

12. The system of claim 1, wherein the ventilation pipe has a first end comprising the first opening, and
the system further comprises a coupler configured to releasably connect the first end of the ventilation pipe to the bottom surface of the manhole cover.

13. The system of claim 1, wherein the ventilation pipe has a first end comprising the first opening, and
the system further comprises a manifold that is attachable to the bottom surface of the manhole cover, the manifold comprising a port configured to be in fluid communication with the at least one selected through-hole, the first end of the ventilation pipe being releasably connectable to the manifold with the first opening being in fluid communication with the port.

14. The system of claim 1, wherein the manhole cover comprises a central concave portion with a plurality of support ribs,
the at least one selected through-hole is formed in the concave portion, and
the system further comprises a hole cap configured to be coupled to the plurality of support ribs to define flow passages between the concave portion and the hole cap, openings into the flow passages being defined between the hole cap and the manhole cover when the hole cap is coupled to the plurality of support ribs, the flow passages being in fluid communication with the at least one selected through-hole.

15. The system of claim 1, wherein the manhole cover comprises an elevation wall surrounding at least one of the one or more through-holes.

16. The system of claim 1, wherein the manhole cover comprises a plurality of elevation walls, and
each elevation wall at least partially surrounds at least one of the one or more through-holes.

17. The system of claim 1 for use with the manhole opening being formed in a surface having a grade, wherein the manhole cover comprises an elevation wall that at least partially surrounds at least one of the one or more through-holes and is configured to be aligned with the grade of the surface.

18. The system of claim 1 for use with the manhole vault being a first manhole vault connected to a second manhole vault by at least one conduit, wherein the air moving device is configured to cause airflow between the first and second manhole vaults via the at least one conduit.

19. The system of claim 1 for use with the manhole vault being a first manhole vault connected to a second manhole vault by a conduit having an opening in the first manhole vault, wherein the second opening of the ventilation pipe is positionable alongside the opening of the conduit.

20. The system of claim 1 for use with the manhole vault being interconnected by at least one conduit with a plurality of manhole vaults, wherein the one or more through-holes comprise an exhaust hole and a vent hole,
   the air moving device is configured to draw air into the internal atmosphere from one or more of the plurality of manhole vaults via the at least one conduit and exhaust the portion of the internal atmosphere into the external atmosphere via the exhaust hole,
   the vent hole is configured to allow a portion of the external atmosphere to enter the interior of the manhole vault,
   the exhaust hole has a total open area available for gas egress,
   the vent hole has a total open area available for gas ingress, and
   the total open area available for gas ingress is less than the total open area available for gas egress.

21. The system of claim 1, wherein the ventilation pipe comprises at least one sidewall defining at least a portion of the interior through-channel, and
   the ventilation pipe comprises a plurality of lateral through-holes formed in the at least one sidewall.

22. The system of claim 21, wherein the ventilation pipe has a second end comprising the second opening, and
   the plurality of lateral through-holes decrease in size as their distance from the second end of the ventilation pipe increases.

23. The system of claim 21, wherein the ventilation pipe has a different flap portion that partially blocks each of the plurality of lateral through-holes.

24. The system of claim 1 for use with the manhole vault having a floor, wherein the ventilation pipe has a second end comprising the second opening, and
   the second end of the ventilation pipe is positionable less than 24 inches above the floor.

25. The system of claim 1, wherein the ventilation pipe has a second end comprising the second opening,
   the system further comprises a float assembly configured to be coupled to the second end,
   the float assembly is configured to float upon water in the manhole vault, and
   the float assembly positions the second opening above a surface level of the water in the manhole vault when the float assembly is coupled to the second end.

26. The system of claim 1, wherein the ventilation pipe comprises a second end and at least one sidewall defining at least a portion of the interior through-channel,
   the ventilation pipe comprises a plurality of lateral through-holes formed in the at least one sidewall, and
   the system further comprises a float assembly that comprises:
   (a) a cylindrical bellows configured to cover a portion of the ventilation pipe proximal to the second end thereof, selected ones of the plurality of lateral through-holes being formed in the covered portion of the ventilation pipe, the bellows having a lower portion with an aperture providing fluid communication between the selected lateral through-holes and the internal atmosphere when the float assembly is inside the manhole vault and the bellows is covering the covered portion; and
   (b) a float attached to the lower portion of the bellows, the float being configured to float upon water in the manhole vault, and rise with a level of the water as more water enters the manhole vault, the float compressing the bellows as the level of the water rises and raising the aperture as the float rises with the level of the water.

27. The system of claim 1, further comprising:
   a ring support positionable within the manhole opening; and
   a seal positionable between the ring support and the manhole cover.

28. The system of claim 1 for use with the manhole opening being formed in a surface, the system further comprising:
   a ring support positionable within the manhole opening, the ring support having a ledge configured to support the manhole cover within the manhole opening and an external portion configured to be adjacent the surface when the ring support is positioned within the manhole opening, the external portion having a water control feature comprising a partial dam or a partial moat.

29. The system of claim 28 for use with the surface having a slope, wherein the water control feature has a midpoint,
   the manhole cover has a center, and
   a direction from the midpoint to the center of the manhole cover is alignable with the slope of the surface.

30. The system of claim 1 for use with the manhole opening being formed in a surface having a slope, wherein a partial moat is formed in the surface alongside the manhole opening,
   the partial moat has a midpoint,
   the manhole cover has a center, and
   a direction from the midpoint to the center of the manhole cover is alignable with the slope of the surface.

31. The system of claim 1, further comprising:
   a timer configured to control operation of the air moving device.

32. The system of claim 1, wherein the top surface of the manhole cover is domed.

33. The system of claim 1, wherein the top surface of the manhole cover is domed,
   the domed top surface has a center portion with a first height,
   the domed top surface curves downwardly toward a peripheral edge having a second height, and
   the first height is at least ⅛ inches taller than the second height.

34. The system of claim 1, wherein the air moving device comprises a housing and at least one fan,
   the housing is configured to trap air therein when submerged in water, and
   the at least one fan is positioned inside the trapped air when the housing is submerged in the water.

35. The system of claim 34, wherein the housing comprises:

an outer housing body having an open first end opposite an open second end;

an inner housing body having an open first end opposite an open second end, the inner housing body extending from the open first end of the outer housing body partway toward the open second end of the outer housing body; and a housing cover extending between the open first end of the outer housing body and the open first end of the inner housing body, the air being trapped between the outer and inner housing bodies.

36. The system of claim 1, wherein the air moving device is configured to generate airflow that completely replaces the internal atmosphere within one day.

37. The system of claim 1, wherein the air moving device is configured to generate airflow that completely replaces the internal atmosphere within one hour.

38. The system of claim 1, wherein the air moving device comprises a plurality of fans or a plurality of heaters to provide redundancy.

39. The system of claim 1, wherein the air moving device comprises a heater configured to provide an output greater than 100 Watts or greater than 400 Watts.

40. The system of claim 1, wherein the flow is configured by the air moving device to clear the at least one undesired gas from the interior of the manhole vault within a predetermined amount of time.

41. The system of claim 1, wherein the manhole environment comprises explosive gas, flammable gas, moisture, and water.

42. The system of claim 41, wherein the manhole environment includes a petrochemical, steam, hazardous liquids, road salt, or a combination thereof.

43. The system of claim 41, wherein the manhole environment includes trash, human waste, vermin, hypodermic syringes, or a combination thereof.

44. The system of claim 41, wherein the manhole environment includes freezing temperatures.

45. The system of claim 1 for use with a plurality of interconnected manhole vaults comprising the manhole vault and at least one neighboring manhole vault, wherein the flow reduces frequency at which manhole events occur in at least one of the plurality of interconnected manhole vaults, the flow reduces severity of any manhole events that occur in the at least one interconnected manhole vault, and each manhole event comprises smoke generation, a fire, an explosion, or a combination thereof.

46. The system of claim 1 for use with a plurality of interconnected manhole vaults comprising the manhole vault and at least one neighboring manhole vault, wherein the flow reduces frequency or severity of a manhole event, occurring in in at least one of the plurality of interconnected manhole vaults, and the manhole event comprises smoke generation, a fire, an explosion, or a combination thereof.

47. A system for use with a manhole vault, a manhole cover, and an external atmosphere outside the manhole vault, the manhole vault having an interior and a manhole opening providing access to the interior, the manhole cover being configured to be positioned within the manhole opening, the manhole cover having top and bottom surfaces with one or more through-holes extending therebetween, each of the one or more through-holes being in fluid communication with the external atmosphere at the top surface when the manhole cover is portioned within the manhole opening, the interior containing an internal atmosphere, at least one undesired gas, and an electrical cable carrying alternating current ("AC"), the system comprising:

a ventilation pipe having a first opening, a second opening, and an interior through-channel that extends between the first and second openings, the first opening being positionable proximal to at least a selected one of the one or more through-holes at the bottom surface of the manhole cover, the second opening being positionable in the interior of the manhole vault, the interior through-channel being configured to provide fluid communication between the internal atmosphere and the at least one selected through-hole in the manhole cover; and an air moving device comprising a connection configured to receive AC power from a splice that is connected to the electrical cable inside the interior of the manhole vault, the air moving device being configured to operate in a manhole environment when the air moving device is positioned entirely inside the interior of the manhole vault and is powered by the AC power drawn from the electrical cable, operation of the air moving device inside the interior of the manhole vault creating a flow comprising a portion of a first atmosphere of the interior and external atmospheres, the flow flowing through the interior through-channel of the ventilation pipe toward a different second atmosphere of the interior and external atmospheres, the flow causing a portion of the at least one undesired gas to exit the interior and enter the external atmosphere.

48. A system for use with a manhole vault, a manhole cover, and an external atmosphere outside the manhole vault, the manhole vault having an interior and a manhole opening providing access to the interior, the manhole cover being configured to be positioned within the manhole opening, the manhole cover having top and bottom surfaces with one or more through-holes extending therebetween, each of the one or more through-holes being in fluid communication with the external atmosphere at the top surface when the manhole cover is portioned within the manhole opening, the interior containing an internal atmosphere, at least one undesired gas, and an electrical cable carrying alternating current ("AC"), the system comprising:

a ventilation pipe having a first opening, a second opening, and an interior through-channel that extends between the first and second openings, the first opening being positionable proximal to at least a selected one of the one or more through-holes at the bottom surface of the manhole cover, the second opening being positionable in the interior of the manhole vault, the interior through-channel being configured to provide fluid communication between the internal atmosphere and the at least one selected through-hole in the manhole cover;

an inductive coil configured to be positioned inside the interior of the manhole vault and alongside the electrical cable; and an air moving device connectable to the inductive coil inside the interior of the manhole vault, the air moving device being configured to operate in a manhole environment when the air moving device is positioned entirely inside the interior of the manhole vault and is powered by AC power drawn from the inductive coil, operation of the air moving device inside the interior of the manhole vault creating a flow comprising a portion of a first atmosphere of the interior and external atmospheres, the flow flowing through the interior through-channel of the ventilation pipe toward a different second atmosphere of the interior and external atmospheres, the flow causing a portion of the at least one undesired gas to exit the interior and enter the external atmosphere.

49. A system for use with a manhole vault, a manhole cover, and an external atmosphere outside the manhole vault, the manhole vault having an interior and a manhole opening providing access to the interior, the manhole cover being configured to be positioned within the manhole opening, the manhole cover having top and bottom surfaces with one or more through-holes extending therebetween, each of the one or more through-holes being in fluid communication with the external atmosphere at the top surface when the manhole cover is portioned within the manhole opening, the interior containing an internal atmosphere, at least one undesired gas, and an electrical cable carrying alternating current ("AC"), the system comprising:

a ventilation pipe having a first opening, a second opening, and an interior through-channel that extends between the first and second openings, the first opening being positionable proximal to at least a selected one of the one or more through-holes at the bottom surface of the manhole cover, the second opening being positionable in the interior of the manhole vault, the interior through-channel being configured to provide fluid communication between the internal atmosphere and the at least one selected through-hole in the manhole cover;

an inductive charging device configured to be installed inside the interior of the manhole vault; and an air moving device comprising an antenna that is configured to receive power from the inductive charging device when the inductive charging device is installed inside the interior of the manhole vault, the air moving device being configured to be positioned entirely inside the interior of the manhole vault and to be powered by the power received from the inductive charging device, operation of the air moving device inside the interior of the manhole vault creating a flow comprising a portion of a first atmosphere of the interior and external atmospheres, the flow flowing through the interior through-channel of the ventilation pipe toward a different second atmosphere of the interior and external atmospheres, the flow causing a portion of the at least one undesired gas to exit the interior and enter the external atmosphere.

50. The system of claim 49, wherein the inductive charging device is an inductive charging plate configured to be installed on a floor of the manhole vault.

51. The system of claim 50, wherein the antenna is configured to extend along the ventilation pipe toward the inductive charging plate when the inductive charging plate is installed on the floor of the manhole vault.

* * * * *